United States Patent
Hume et al.

(10) Patent No.: US 11,270,431 B2
(45) Date of Patent: Mar. 8, 2022

(54) SYSTEMS AND METHODS FOR HIGH THROUGHPUT FOAM ANALYSIS

(71) Applicant: Just, Inc., San Francisco, CA (US)

(72) Inventors: Jasmin Hume, San Francisco, CA (US); Chuan Wang, San Francisco, CA (US); Diane Wiener, San Francisco, CA (US)

(73) Assignee: Just, Inc., San Francisco, CA (US)

( * ) Notice: Subject to any disclaimer, the term of this patent is extended or adjusted under 35 U.S.C. 154(b) by 181 days.

(21) Appl. No.: 16/647,830

(22) PCT Filed: Sep. 13, 2018

(86) PCT No.: PCT/US2018/050936
§ 371 (c)(1),
(2) Date: Mar. 16, 2020

(87) PCT Pub. No.: WO2019/055693
PCT Pub. Date: Mar. 21, 2019

(65) Prior Publication Data
US 2021/0366090 A1      Nov. 25, 2021

Related U.S. Application Data

(60) Provisional application No. 62/560,096, filed on Sep. 18, 2017.

(51) Int. Cl.
*G01N 21/51* (2006.01)
*G06T 7/00* (2017.01)
(Continued)

(52) U.S. Cl.
CPC .............. *G06T 7/001* (2013.01); *G01N 1/38* (2013.01); *G01N 21/51* (2013.01); *G06T 7/11* (2017.01);
(Continued)

(58) Field of Classification Search
None
See application file for complete search history.

(56) References Cited

U.S. PATENT DOCUMENTS

| 2006/0210139 A1 | 9/2006 | Carroll et al. |
| 2009/0088485 A1 | 4/2009 | Van Dijk et al. |
| 2011/0045037 A1 | 2/2011 | Tamarkin et al. |

FOREIGN PATENT DOCUMENTS

| CA | 2245464 A1 | 2/1999 |
| EP | 2950081 A1 | 12/2015 |

(Continued)

*Primary Examiner* — Shadan E Haghani
(74) *Attorney, Agent, or Firm* — Morgan, Lewis & Bockius LLP

(57) ABSTRACT

A system for high throughput foam analysis includes a foam generation system, an illumination source, a detection system and an analysis system. A foam generation system includes a first plurality of foaming units, each foaming unit including a foaming chamber and a gas induction mechanism. The illumination source provides an illumination to the foaming chamber of each foaming unit. The detection system includes a first camera configured to temporally record the foaming process in each foaming unit, thereby producing a first plurality of frames. The analysis system includes: at least one processor, and a memory including instructions for (i) obtaining a first respective frame in the first plurality of frames; (ii) segmenting the first respective frame into a first plurality of segmented images, and (iii) extracting, from each segmented image, one or more characteristics of the foam, thereby facilitating high throughput foam analysis of the first plurality of solutions.

18 Claims, 26 Drawing Sheets

(51) Int. Cl.
*G01N 1/38* (2006.01)
*H04N 5/247* (2006.01)
*G06T 7/11* (2017.01)
*H04N 5/225* (2006.01)

(52) U.S. Cl.
CPC ......... *H04N 5/2256* (2013.01); *H04N 5/247* (2013.01); *G01N 2001/387* (2013.01); *G06T 2207/20021* (2013.01); *G06T 2207/30128* (2013.01)

(56) References Cited

FOREIGN PATENT DOCUMENTS

| | | | | |
|---|---|---|---|---|
| JP | 2006090743 A | * | 4/2006 | |
| WO | WO-2004065000 A1 | * | 8/2004 | ............. B82Y 30/00 |
| WO | WO-2004077008 A2 | * | 9/2004 | ......... G01N 35/0099 |

* cited by examiner

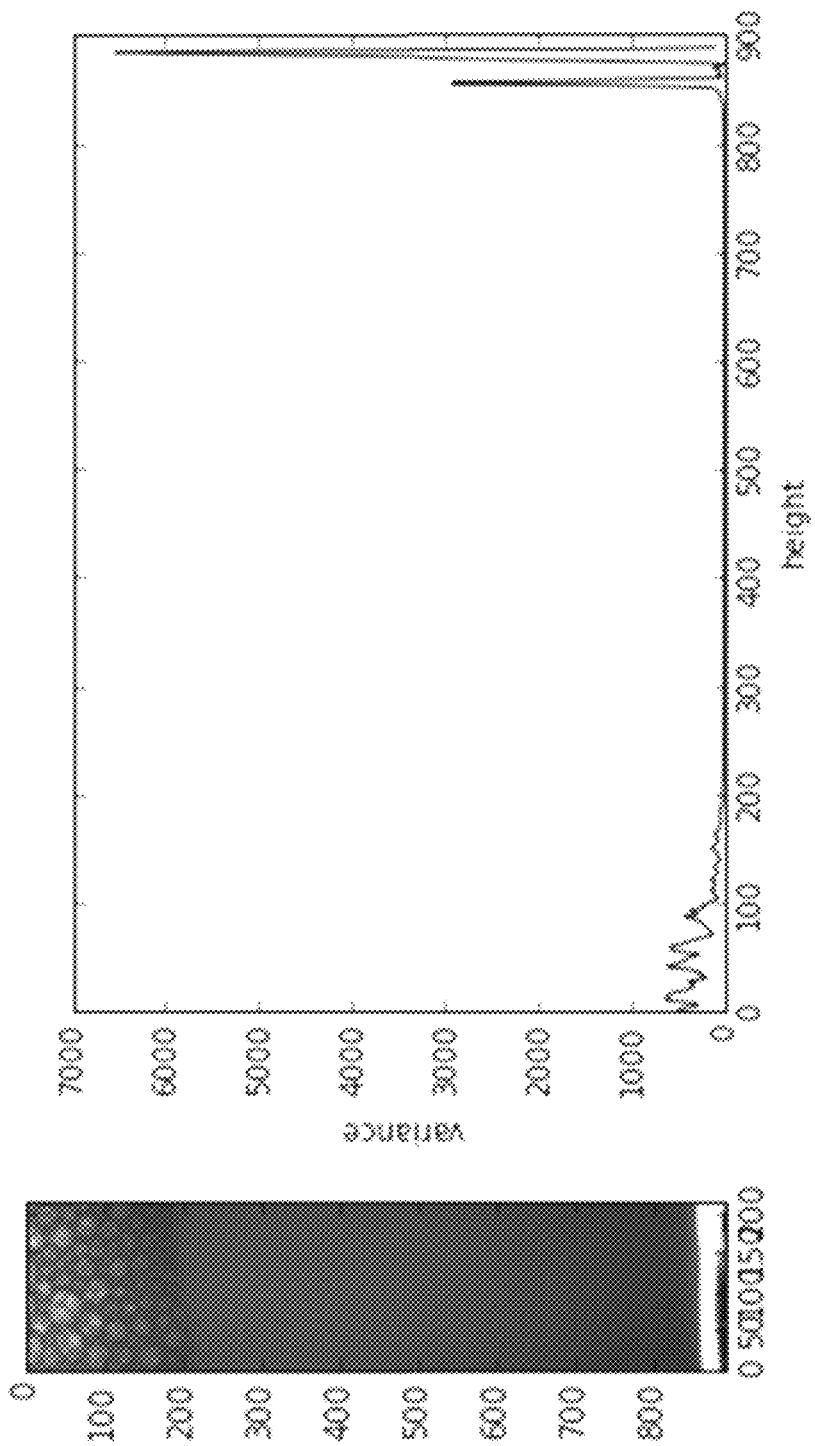

SYSTEMS AND METHODS FOR HIGH THROUGHPUT FOAM ANALYSIS

CROSS-REFERENCE TO RELATED APPLICATIONS

This application is a National Stage of International Patent Application No. PCT/US2018/050936 filed Sep. 13, 2018 and published as WO 2019/055693 A1, which claims priority to U.S. Provisional Application No. 62/560,096 filed Sep. 18, 2017, the entire contents of which applications is incorporated herein for all purposes by this reference.

TECHNICAL FIELD

The invention is directed to systems and methods for foam analysis, and more particularly, for non-invasive methods for foam analysis based on imaging.

BACKGROUND

Foams have a wide variety of applications across many industries. There is a constant interest for discovering and testing new foaming materials (e.g., foaming agents), both liquid and solid, as well as controlling quality or studying properties of known foaming products and materials. There is a demand of non-invasive systems and methods for studying foams and foaming processes in a reproducible and precise manner.

As an example, foaming is an important aspect of food engineering, and essential for producing many consumable food products. Characteristics of foaming (e.g., a height of a foam, bubble sizes, bubble shapes, a bubble solidity, etc.) and foaming stability are among the properties of interest when considering new compositions for possible use as food ingredients. Current food development methods fail to make use of satisfactory ways for efficiently analyzing foaming properties of a vast array of compositions in food and plants.

Therefore, there is a need for systems and methods for foam analysis that are non-invasive, reproducible and provide precise results efficiently for a large amount of test entities. Such high throughput systems and methods could be applied for surveying the vast space of possible entities from plants, and for identifying desirable entities from such sources for food applications.

SUMMARY

The present disclosure addresses the need in the art for analyzing the foaming of the vast space of entities obtained from plants and selecting desired entities from such sources for food applications.

In accordance with some embodiments of the current invention, a system for high throughput foam analysis includes a foam generation system, an illumination source, a detection system and an analysis system.

The foam generation system includes a first plurality of foaming units. Each foaming unit in the first plurality of foaming units includes a foaming chamber, configured to independently accommodate a respective solution in a first plurality of solutions, and a gas induction mechanism configured to introduce a gas into the respective solution in the foaming chamber as part of a foaming process that generates a foam in the foaming chamber.

The illumination source provides an illumination to the foaming chamber of each foaming unit in the first plurality of foaming units.

The detection system includes a first camera configured to temporally record the foaming process in the foaming chamber of each foaming unit in the first plurality of foaming units. The detection system thereby produces a first plurality of frames, where each respective frame in the first plurality of frames is representative of the foaming process in the foaming chamber of each foaming unit in the first plurality of foaming units at a corresponding discrete time point in a plurality of discrete time points.

The analysis system is in communication with the detection system. The analysis system includes at least one processor and a memory addressable by the at least one processor and stores at least one program for execution by the at least one processor. The at least one program includes instructions for obtaining a first respective frame in the first plurality of frames. The at least one program further includes instructions for segmenting the first respective frame into a first plurality of segmented images. Each respective segmented image in the first plurality of segmented images is representative of a corresponding foaming chamber, together with the respective solution and/or the foam in the corresponding foaming chamber of a respective foaming unit in the first plurality of foaming units. The at least one program further includes instructions for extracting, from each segmented image in the first plurality of segmented images, one or more characteristics of the foam generated in the corresponding foaming chamber of each foaming unit in the first plurality of foaming units, thereby facilitating high throughput foam analysis of the first plurality of solutions.

In some embodiments, the foam generation system further includes a second plurality of foaming units. Each foaming unit in the second plurality of foaming units includes a foaming chamber configured to independently accommodate a respective solution in a second plurality of solutions, and a gas induction mechanism configured to introduce a gas into the respective solution in the foaming chamber as part of a foaming process that generates a foam in the foaming chamber. The illumination source provides an illumination to the foaming chamber of each foaming unit in the second plurality of foaming units. The detection system further includes a second camera configured to temporally record the foaming process in the foaming chamber of each foaming unit in the second plurality of foaming units. The detection system thereby produces a second plurality of frames, each respective frame in the second plurality of frame representative of the foaming process in the foaming chamber of each foaming unit in the second plurality of foaming units at a corresponding discrete time point in the plurality of discrete time points. The at least one program of the analysis system further includes instructions for (i) obtaining a second respective frame in the second plurality of frames, (ii) segmenting the second respective frame into a second plurality of segmented images, each respective segmented image in the second plurality of segmented images representative of a corresponding foaming chamber, together with the respective solution and/or the foam in the corresponding foaming chamber of a respective foaming unit in the second plurality of foaming units, and (iii) extracting from each segmented image in the second plurality of segmented images, one or more characteristics of the foam generated in the corresponding foaming chamber of each foaming unit in the second plurality of foaming units, thereby facilitating high throughput foam analysis of the second plurality of solutions.

In some embodiments, the at least one program of the analysis system further includes instructions for (i) obtaining a third respective frame in the first plurality of frames, (ii)

segmenting the third respective frame into a third plurality of segmented images, each respective segmented image in the third plurality of segmented images representative of a corresponding foaming chamber, together with the respective solution and/or the foam in the corresponding foaming chamber of a respective foaming unit in the first plurality of foaming units, and (iii) extracting, from each segmented image in the third plurality of segmented images, one or more characteristics of the foam generated in the corresponding foaming chamber of each foaming unit in the first plurality of foaming units, thereby facilitating high throughput foam analysis of the first plurality of solutions.

In some embodiments, the at least one program of the analysis system further includes instructions for (i) obtaining a fourth respective frame in the second plurality of frames, (ii) segmenting the fourth respective frame into a fourth plurality of segmented images, each respective segmented image in the fourth plurality of segmented images representative of a corresponding foaming chamber, together with the respective solution and/or the foam in the corresponding foaming chamber of a respective foaming unit in the second plurality of foaming units, and (iii) extracting from each segmented image in the fourth plurality of segmented images, one or more characteristics of the foam generated in the corresponding foaming chamber of each foaming unit in the second plurality of foaming units, thereby facilitating high throughput foam analysis of the second plurality of solutions.

In another aspect, a system for high throughput foam analysis includes the illumination source, the detection system and the analysis system, as described above, and a foam generation system. The foam generation system includes a first plurality of foaming units, each foaming unit in the first plurality of foaming unit including a foaming chamber configured to independently accommodate a respective solution in a first plurality of solutions. Each solution in each foaming unit in the first plurality of foaming units undergoes an independent foaming process, thereby generating a respective foam in the foaming chamber of each foaming unit in the first plurality of foaming units. In some embodiments, the foam generation system further includes a second plurality of foaming units, each foaming unit in the second plurality of foaming units including a foaming chamber configured to independently accommodate a respective solution in a second plurality of solutions. Each solution in each foaming unit in the second plurality of foaming units undergoes an independent foaming process, thereby generating a respective foam in the foaming chamber of each foaming unit in the second plurality of foaming units.

In another aspect, a system for high throughput foam analysis includes the foam generation system, the illumination system and the detection system, as described above. In some embodiments, the further includes the analysis system in communication with the detection system.

In some embodiments, the foaming chamber of each foaming unit in all or a subset of the first plurality of foaming units is characterized by a substantially rectangular cross section.

In some embodiments, the first plurality of foaming units is in an integrated block.

In some embodiment, each respective foaming unit in all or a subset of the first plurality of foaming units includes a porous member that separates the foaming chamber of the respective foaming unit into a first portion and a second portion. The respective solution of the respective foaming unit is received in the second portion of the foaming chamber. The gas induction mechanism of the respective foaming unit includes a vacuum source in fluid communication with the second portion of the foaming chamber to pull the gas from the first portion to the second portion, thereby introducing the gas into the respective solution and generating the foam in the foaming chamber of the respective foaming unit.

In some embodiments, the gas induction mechanism of each respective foaming unit in all or a subset of the first plurality of foaming units includes a porous sparger disposed in the foaming chamber of the respective foaming unit. The porous sparger is in fluid communication with a gas supply to introduce the gas into the respective solution of the respective foaming unit, thereby generates the foam in the foaming chamber of the respective foaming unit.

In some embodiments, each respective foaming unit in a first subset of the first plurality of foaming units includes a porous member that separates the foaming chamber of the respective foaming unit into a first portion and a second portion. The respective solution of the respective foaming unit is received in the second portion of the foaming chamber. The gas induction mechanism of the respective foaming unit includes a vacuum source in fluid communication with the second portion of the foaming chamber to pull the gas from the first portion to the second portion, thereby introducing the gas into the respective solution and generating the foam in the foaming chamber of the respective foaming unit in the first subset of the first plurality of foaming units. The gas induction mechanism of each respective foaming unit in a second subset of the first plurality of foaming units includes a porous sparger disposed in the foaming chamber of the respective foaming unit. The porous sparger is in fluid communication with a gas supply to introduce the gas into the respective solution of the respective foaming unit, thereby generates the foam in the foaming chamber of the respective foaming unit in the second subset of the first plurality of foaming units.

In some embodiments, the porous member is a frit, and the frit has a pore size range between 10 μm and 20 μm, between 20 μm and 30 μm, or between 30 μm and 40 μm. In some embodiments, the frit has an average pore size that is between 10 μm and 20 μm, between 20 μm and 30 μm, or between 30 μm and 40 μm.

In some embodiments, each respective porous sparger has an active porous length and a pore size range between 2 μm and 5 μm, between 5 μm and 10 μm, between 10 μm and 15 μm, or between 15 μm and 20 μm. The sparger is configured such that the active porous length of the respective sparger is submerged in the corresponding solution before generating the foam.

In some embodiments, the foaming chamber of each respective foaming unit in all or a subset of the first plurality of foaming units has linear dimensions between 25 mm and 100 mm, between 100 mm and 400 mm, or between 400 mm and 900 mm.

In some embodiments, the corresponding solution for each respective foaming unit in all or a subset of the first plurality of foaming units has a volume ranging between 1 ml and 2.5 ml, between 2.5 ml and 10 ml, or between 10 ml and 20 ml.

In some embodiments, at each respective foaming unit in all or a subset of the first plurality of foaming units, the gas introduced into the respective solution is approximately 1 times, 1.5 times, 2 times, 2.5 times, or 3 times that of the volume of solution in the foaming chamber of the respective foaming unit.

In some embodiments, at each respective foaming unit in all or a subset of the first plurality of foaming units, the gas is introduced into the solution at a flow rate lower than 200 ml/sec, lower than 150 ml/sec, lower than 100 ml/sec, or lower than 50 ml/sec.

In some embodiments, each respective foaming unit in all or a subset of the first plurality of foaming units further includes a meter to control a flow rate of the gas or a total amount of the gas introduced into the respective solution.

In some embodiments, at each respective foaming unit in all or a subset of the first plurality of foaming units, the gas is selected from the group consisting essentially of air, nitrogen, carbon dioxide, and noble gas.

In some embodiments, the gas introduced into the solution at each respective foaming unit in a first subset of the first plurality of foaming units is different than the gas introduced into the solution at each respective foaming unit in a second subset of the first plurality of foaming units.

In some embodiments, at each respective foaming unit in all or a subset of the first plurality of foaming units, the corresponding solution contains a protein, a concentration thereof ranging between 1% and 9%, or between 1% and 15%.

In some embodiments, at each respective foaming unit in all or a subset of the first plurality of foaming units, the corresponding solution comprises one or more plant proteins.

In some embodiments, in the first plurality of solutions, at least two solutions are different from each other (e.g., in terms of concentrations).

In some embodiments, at one or each respective foaming unit in the first plurality and/or the second plurality of foaming units, the corresponding solution is prepared by mixing (i) a protein and (ii) an additive.

In some embodiments, the foam generation system further includes a first sample rack to hold all or a subset of the first plurality of forming units.

In some embodiments, the foam generation system further includes a first sample rack to hold the first and second pluralities of forming units.

In some embodiments, all or a subset of the first plurality of forming units are monolithically made of one unit.

In some embodiments, the foam generation system is disposed between the illumination source and the detection system.

In some embodiments, the illumination source includes a light-emitting diode (LED) panel, and the first plurality of foaming units of the foam generation system are arranged in a line parallel to the LED panel. In some embodiments, the LED is configured to emit a green light, or to emit a light with a wavelength of approximately 530 nm.

In some embodiments, the detection system further includes a first telecentric lens optically disposed between the first plurality of foaming units and the first camera, and optically coupled with the first camera. The first telecentric lens produces an orthogonal projection of the first plurality of foaming units to the first camera, thereby reducing distortion and improving resolution of each respective frame in the first plurality of frames.

In some embodiments, the detection system includes the first lens and further includes a second telecentric lens optically disposed between the second plurality of foaming units and the second camera, and optically coupled with the second camera. The second telecentric lens produces an orthogonal projection of the second plurality of foaming units to the second camera, thereby reducing distortion and improving resolution of each respective frame in the second plurality of frames.

In some embodiments, the first camera includes a first built-in telecentric lens configured to produce an orthogonal projection of the first plurality of foaming units to a first sensor of the first camera, thereby reducing distortion and improving resolution of each respective frame in the first plurality of frames.

In some embodiments, the first camera includes the first built-in telecentric lens, and the second camera includes a second built-in telecentric lens configured to produce an orthogonal projection of the second plurality of foaming units to a second sensor of the second camera, thereby reducing distortion and improving resolution of each respective frame in the second plurality of frames.

In some embodiments, the one or each time interval of two adjacent time points in the plurality of discrete time points is 5 seconds, 6 seconds, 7 seconds, 8 seconds, 9 seconds, 10 seconds, 12 seconds, 15 seconds, or 20 seconds. In some embodiments, the first plurality of frames is a first video, and the first video has a duration that is up to 5 minutes, 10 minutes, 15 minutes, or 20 minutes.

In some embodiments, the extracted one or more characteristics of the foam includes one or more of the following: a height of the foam, bubble sizes, a distribution of bubble sizes, bubble shapes, bubble center coordinates, a bubble area, equivalent diameters of bubbles, perimeters of bubbles, a bubble circularity, a bubble solidity, a first bubble aspect ratio, a second bubble aspect ratio, a third bubble aspect ratio, a first bubble extent, a second bubble extent, a third bubble extent and a fourth bubble extent.

In some embodiments, the segmenting of the first respective frame into the first plurality of segmented images includes creating a binary image from the first frame, selecting a plurality of contours from the binary image, each contour in the plurality of contours corresponding to an outline of the foaming chamber of the foaming unit corresponding to the first frame, and partitioning the respective frame in accordance with the plurality of contours, thereby producing the plurality of segmented images.

In some embodiments, the creating of the binary image includes converting the first frame into a grayscale image, and using a threshold to binarize the grayscale image, thereby creating the binary image.

In some embodiments, the segmenting of the respective frame into the plurality of segmented images further includes one or more of the following: removing, subsequent to the creating of the binary image and prior to the selecting of the plurality of contours, noises from the binary image; and cropping each respective segmented image in all or a subset of the plurality of segmented images along a width direction of the respective segmented image from a first side and a second side of the respective segmented image to reduce impact of a first side wall and a second side wall of the corresponding chamber on subsequent image analysis. The cropping is up to 5%, 10%, 15%, 20%, 25%, or 30%.

In some embodiments, for each respective segmented image in all or a subset of the plurality of segmented images, the extracting of the one or more characteristics of the foam includes one or more of the following: extracting one or more dimensions of the foam, and extracting one or more properties of bubbles in the foam.

In some embodiments, each respective segmented image in all or a subset of the plurality of segmented images includes a plurality of first subregion types, each first subregion type in the plurality of first subregion types including a plurality of contiguous pixels, and each pixel in the plurality of pixels has a pixel value representative of a brightness of the pixel. For the respective segmented image in the plurality of segmented images, the extracting of the one or more dimensions of the foam includes calculating a pixel value variance of each first subregion type in the plurality of first subregion types, and determining whether the calculated pixel value variance of each first subregion type in the plurality of first subregion types and cutoff values is between a first cutoff value and a second cutoff value, or between the second and a third cutoff value (e.g., the first cutoff value is up to 2 or up to 5; the second cutoff value is up to 30, or up to 50, and the third cutoff value is up to 800, or up to 1000. The extracting of the one or more dimensions of the foam also includes identifying one or more boundaries. The one or more boundaries includes a solution-foam boundary between the respective solution and the foam in the corresponding foaming chamber at the corresponding discrete time point. The first subregion types with the pixel value variances between the first cutoff value and the second cutoff value represent the solution, and first subregion types with the pixel value variances between the second cutoff value and the third cutoff value represent the foam. The extracting of the one or more dimensions of the foam also includes height of the foam in the corresponding chamber at the corresponding discrete time point by counting the number of first subregion types from the solution-foam boundary to a top of the segmented image. Optionally or additionally, the extracting of the one or more dimensions of the foam also includes determining a height of the solution in the corresponding chamber at the corresponding discrete time point by counting the number of first subregion types from a bottom of the segmented image to the solution-foam boundary.

In some embodiments, the one or more boundaries further includes a foam-gas boundary between the gas and the foam in the corresponding foaming chamber at the corresponding discrete time point, and a solution-chamber boundary between the solution and the corresponding foaming chamber at the corresponding discrete time point. The first subregion types with the pixel value variances less than the first cutoff value represent the gas. A first subregion type at the foam-gas boundary has the pixel value exceeding the third cutoff value. A first subregion type at the solution-chamber boundary has the pixel value exceeding the third cutoff value. The height of the foam in the corresponding chamber at the corresponding discrete time point is determined by counting the number of first subregion types from the solution-foam boundary to the foam-gas boundary. The height of the solution in the corresponding chamber at the corresponding discrete time point is determined by counting the number of first subregion types from the solution-chamber boundary to the solution-foam boundary.

In some embodiments, each respective segmented image in all or a subset of the plurality of segmented images includes a plurality of first subregion types. Each first subregion type in the plurality of first subregion types includes a plurality of contiguous pixels, and each pixel in the plurality of pixels has a pixel value representative of a brightness of the pixel. For the respective segmented image, the extracting of the one or more dimensions of the foam includes calculating a pixel value variance of each first subregion type in the plurality of first subregion types, generating a graphic with the calculated pixel value variances as a function of the first subregion types of the segmented image, and graphically determining a height of the foam and/or a height of the solution at the corresponding discrete time point, using one or more of first, second and third cutoff values.

In some embodiments, each respective segmented image in all or a subset of the plurality of segmented images includes a plurality of first subregion types, each first subregion type in the plurality of first subregion types includes a plurality of contiguous pixels, and each pixel in the plurality of pixels has a pixel value representative of a brightness of the pixel. For the respective segmented image in the plurality of segmented images, the extracting of the one or more dimensions of the foam includes determining an image gradient for the one or more corresponding grayscale images of the partially foamed liquid and determining the number of directional changes for each first subregion type and each second subregion type in the image gradient. The extracting also includes classifying the first subregion types of pixels in the one or more corresponding binary images of the partially foamed liquid as corresponding to a solution phase or a foam, thereby identifying the location of a solution phase and a foam phase of the first material contained within the first chamber. A height of the foam in the corresponding chamber at the corresponding discrete time point is determined by counting the number of first subregion types corresponding to the foam phase. Optionally or additionally, A height of the solution in the corresponding chamber at the corresponding discrete time point is determined by counting the number of first subregion types corresponding to the solution phase.

In some embodiments, the pixel value of each pixel is stored as an 8-bit integer having a value ranging from 0 to 255, where in 0 represents black in the segmented image, and 255 represents white in the segmented image.

In some embodiments, the extracting of the one or more properties of bubbles in the foam further includes for each respective segmented image in all or a subset of the plurality of segmented images, cropping the respective segmented image along a height direction of the respective segmented image to remove pixels below the solution-foam boundary and/or above the foam-gas boundary, thereby producing a foam regional image.

In some embodiments, the extracting of the one or more properties of bubbles in the foam further includes converting, if the foam regional image is not a grayscale image, the foam regional image into a grayscale foam regional image. Optionally or additionally, the extracting of the one or more properties of bubbles in the foam further includes removing noises from the foam regional image or from the grayscale foam regional image, and creating a binary foam regional image from the foam regional image or from the grayscale foam regional image. The binary foam regional image includes a plurality of blobs. Each blob in the plurality of blobs includes one or more pixels, and each pixel in the one or more pixels of each blob has a first pixel value.

In some embodiments, the noises are removed by Gaussian blurring, median blurring, bilateral filtering, box filtering, or any combination thereof. In some embodiments, the Gaussian blurring is performed using a 3×3 kernel, or a 5×5 kernel.

In some embodiments, the binary foam regional image is created by an Otsu's method, an adaptive mean thresholding method, an adaptive Gaussian thresholding method, or a thresholding method with a manually set threshold.

In some embodiments, the extracting of the one or more properties of bubbles in the foam further includes (i) determining whether a size of a respective blob in the plurality of blobs is smaller than a minimum blob size representative of a minimum bubble size; (ii) discarding the respective blob if it is determined that its size is smaller than the minimum blob size; (iii) repeating (i) and (ii) for each blob in the plurality of blobs, thereby producing a subset of blobs. Each blob in the subset of blobs has the size equal to or larger than the minimum blob size; and (iv) eroding the binary foam regional image to obtain center coordinates of each blob in the subset of blobs. In some embodiments, the eroding of the binary foam regional image to obtain the center coordinates of each blob in the subset of blobs includes (i) shrinking the sizes of the blobs in the subset of blobs; (ii) determining whether the size of a respective shrunken blob in the subset of blobs is smaller than the minimum blob size; (iii) recording a position of the respective shrunken blob as its center coordinates, if it is determined that the size of the respective shrunken blob in the subset of blobs is smaller than a minimum blob size; and (iv) repeating steps (i)-(iii) until none of the shrunken blobs in the subset of blobs has the size exceeding the minimum size. In some embodiments, the eroding of the binary foam regional image to obtain the center coordinates of each blob in the subset of blobs is performed using a 3×3 kernel or a 5×5 kernel. In some embodiments, the minimum size is up to 8 pixels in radius, up to 10 pixels in radius, or up to 15 pixels in radius.

In some embodiments, the extracting of the one or more properties of bubbles in the foam further includes using a distance transformation to locate a plurality of local maxima, and designating the plurality of local maxima as the center coordinates of the plurality of blobs.

In some embodiments, a center of each blob in all or a subset of plurality of blobs is represented by a circle having a radius up to 3 pixels in radius, up to 5 pixels in radius, or up to 8 pixels in radius.

In some embodiments, the extracting of the one or more properties of bubbles in the foam further includes determining a peripheral boundary of each blob in the plurality of blobs or in the subset of the plurality of blobs, and generating a blob segmentation image in accordance with the determined peripheral boundary of each blob in the plurality of blobs or in the subset of the plurality of blobs.

In some embodiments, the determining of the peripheral boundary of each blob in the plurality of blobs or in the subset of the plurality of blobs includes: (i) calculating a distance of each pixel in the binary foam regional image to its nearest pixel that has a second pixel value, thereby producing a distance transformed image; (ii) using the obtained center coordinates of each blob in the plurality of blobs or in the subset of the plurality of blobs as a starting point to watershed the distance transformed image, thereby producing a plurality of watershed regions, where each watershed region in the plurality of watershed regions has a boundary; (iii) assigning the boundaries of the plurality of watershed regions as ridges of the plurality of watershed regions; and (iv) determining the peripheral boundary of each blob in the plurality of blobs or in the subset of the plurality of blobs in accordance with the ridges of the plurality of watershed regions.

In some embodiments, the at least one program further includes instructions for: (i) determining whether two adjacent blobs in the blob segmentation image are overlapped; (ii) merging the two adjacent blobs into one blob, if it is determined that the two adjacent blobs in the blob segmentation image are overlapped; and (iii) optionally or additionally, repeating (i) and (ii), thereby producing a modified blob segmentation image.

In some embodiments, the two adjacent blobs in the blob segmentation image are determined to be overlapped, if a criteria of d<min(r1, r2) is met, and where r1 and r2 stand for radii of minimum bound circles of the two adjacent blobs, and d stands for a distance between centers of the minimum bound circles of the two adjacent blobs.

In some embodiments, the merging of the two adjacent blobs into one blob is conducted by dilating each of the two adjacent blobs.

In some embodiments, the extracting of the one or more properties of bubbles in the foam further includes: for each respective blob in all or a subset of the blob segmentation image or in the modified blob segmentation image, calculating one or more of the following: an area A surrounded by the peripheral boundary of the respective blob; an equivalent diameter of the respective blob using a formula of sort (4×A/π); a perimeter C of the peripheral boundary of the respective blob; a circularity of the respective blob using a formula of 4×π×A/C²; a solidity of the respective blob using a formula of A/HA, HA stands for a convex hull area; a first aspect ratio of the respective blob using a formula of min(a1, b1)/max(a1, b1), where a1 and b1 stand for width and height of a bounding rectangle, respectively; a second aspect ratio of the respective blob using a formula of min(a2, b2)/max (a2, b2), where a2 and b2 stand for width and height of a minimum bounding rectangle, respectively; a third aspect ratio of the respective blob using a formula of min(a3, b3)/max(a3, b3), where a3 and b3 stand for lengths of two axes of a fitted ellipse, respectively; a first extent of the respective blob using a formula of A/BRA, where BRA stands for an area of a bounding rectangle; a second extent of the respective blob using a formula of A/mBRA, where mBRA stands for an area of a minimum bounding rectangle; a third extent of the respective blob using a formula of A/mBCA, where mBCA stands for an area of a minimum bounding circle; and a fourth extent of the respective blob using a formula of A/EA, where EA stands for an area of a fitted ellipse.

In some embodiments, the at least one program further includes instructions for clustering the blobs in the blob segmentation image or in the modified blob segmentation image into two or more clusters.

In some embodiments, the blobs are clustered in accordance with one or more properties selected from the circularity, solidity, first aspect ratio, second aspect ratio, third aspect ratio, first extent, second extent, third extent and fourth extent of each blob in the blob segmentation image or in the modified blob segmentation image.

In some embodiments, a principle component analysis is performed to select the one or more properties selected from the circularity, solidity, first aspect ratio, second aspect ratio, third aspect ratio, first extent, second extent, third extent and fourth extent of each blob in the blob segmentation image or in the modified blob segmentation image.

In some embodiments, the clustering of the blobs is performed using a K-means clustering algorithm to minimize a within-cluster sum of squares:

$$\frac{\arg\min}{s} \sum_{i=1}^{k} \sum_{x \in S_i} \|x - u_i\|^2$$

where,
each $x_i$ in $(x_1, x_2, \ldots, x_n)$ is a blob,
k is the number of clusters,
each $S_i = \{S_1, S_2, \ldots, S_k\}$ is a set of blobs clustered into each cluster set, and each $u_i$ in $(u_1, u_2, \ldots, u_k)$ is a centroid of a corresponding cluster.

In some embodiments, the at least one program further includes instructions for: classifying the blobs in the blob segmentation image, the blobs in the modified blob segmentation image, or the blobs in a first cluster that has a larger or a largest number of blobs among the two or more clusters, into bubble blobs and non-bubble blobs, by one or more of the following: classifying the blobs manually, and classifying the blobs using a bubble model. The at least one program further includes instructions for generating a final set of blobs including each blob of the subset blobs in the blob segmentation image, the subset blobs in the modified blob segmentation image, or the subset blobs in a first cluster that has a larger or a largest number of blobs among the two or more clusters classified as a bubble blobs.

In some embodiments, the at least one program further includes instructions for: selecting a first cluster that has a larger or a largest number of blobs from the two or more clusters, designating the blobs in the first cluster as a final set of blobs representative of the bubbles in the foam, and optionally or additionally, discarding remaining clusters in the two or more clusters.

In some embodiments, the at least one program further includes instructions for: selecting a first cluster that has a larger or a largest number of blobs from the two or more clusters; comparing the blobs in the first cluster with the bubbles in the foam to identify one or more bubble blobs, and/or one or more non-bubble blobs, where each bubble blob in the one or more bubble blobs corresponds to a bubble in the foam, and each non-bubble blob in the one or more non-bubble blobs has no corresponding bubble in the foam; constructing a training set including (i) the identified one or more bubble blobs, (ii) the identified one or more non-bubble blobs, and/or (iii) one or more blobs in a second cluster in the two or more clusters as non-bubble blobs; and deriving, using the training set, a bubble model to classify blobs in accordance with the one or more extracted properties of bubbles.

In some embodiments, the at least one program further includes instructions for updating the training set and/or refining the bubble model.

In some embodiments, the at least one program further includes instructions for constructing a training set to classify blobs. The constructing includes one or more of the following: labeling the blobs in the blob segmentation image, the blobs in the modified blob segmentation image, or the blobs in a first cluster that has a larger or a largest number of blobs among the two or more clusters; drawing contours of the blobs in the blob segmentation image, the blobs in the modified blob segmentation image, or the blobs in a first cluster that has a larger or a largest number of blobs among the two or more clusters; and generating one or more data files, each data file in the one or more data files including one or more of the following: the extracted one or more characteristics of the foam in the foaming chamber of each respective foaming unit in all or a subset of the first plurality of foaming units; the final set of blobs; images with labeled blobs and/or drawn contours; and the first plurality of frames and/or the second plurality of frames. At least one frame of the first plurality of frames or the second plurality of frames has labeled blobs and/or drawn contours.

In accordance with some embodiments, a method for high throughput foam analysis includes introducing a gas into a corresponding solution contained in a foaming chamber of each respective foaming unit in a first plurality of foaming units such that the corresponding solution undergoes a foaming process, thereby generating a foam in the foaming chamber of each respective foaming unit in the first plurality of foaming units. The method also includes recording the foaming process in the foaming chamber of each respective foaming unit in the first plurality of foaming units to produce a first plurality of frames, each respective frame in the first plurality of frames representative of the foaming process in the foaming chamber of each foaming unit in the first plurality of foaming units at a corresponding discrete time point in a plurality of discrete time points. The method further includes obtaining a first respective frame in the first plurality of frames, and segmenting the first respective frame into a first plurality of segmented images, each respective segmented image in the first plurality of segmented images representative of a corresponding foaming chamber, together with the respective solution and/or the foam in the corresponding foaming chamber of a respective foaming unit in the first plurality of foaming units at the corresponding discrete time point. The method further includes extracting, from each segmented image in the first plurality of segmented images, one or more characteristics of the foam generated in the corresponding foaming chamber of each foaming unit in the first plurality of foaming units at the corresponding discrete time point, thereby facilitating high throughput foam analysis of the first plurality of solutions.

In some embodiments, the method further includes introducing a gas into a corresponding solution contained in a foaming chamber of each respective foaming unit in a second plurality of foaming units such that the corresponding solution undergoes a foaming process, thereby generating a foam in the foaming chamber of each respective foaming unit in the second plurality of foaming units. The method also includes recording the foaming process in the foaming chamber of each respective foaming unit in the second plurality of foaming units to produce a second plurality of frames, each respective frame in the second plurality of frames representative of the foaming process in the foaming chamber of each foaming unit in the second plurality of foaming units at a corresponding discrete time point in the plurality of discrete time points. The method further includes obtaining a second respective frame in the second plurality of frames, and segmenting the second respective frame into a second plurality of segmented images, each respective segmented image in the second plurality of segmented images representative of a corresponding foaming chamber, together with the respective solution and/or the foam in the corresponding foaming chamber of a respective foaming unit in the second plurality of foaming units at the corresponding discrete time point. The method further includes extracting, from each segmented image in the second plurality of segmented images, one or more characteristics of the foam generated in the corresponding foaming chamber of each foaming unit in the second plurality of foaming units at the corresponding discrete time point, thereby facilitating high throughput foam analysis of the second plurality of solutions.

In some embodiments, the introducing of the gas into the corresponding solution contained in the foaming chamber of each respective foaming unit in the first plurality of foaming units and the introducing of the gas into the corresponding solution contained in the foaming chamber of each respective foaming unit in the second plurality of foaming units are conducted simultaneously. The recording of the foaming process in the foaming chamber of each respective foaming unit in the first plurality of foaming units and the recording of the foaming process in the foaming chamber of each respective foaming unit in the second plurality of foaming units are conducted simultaneously.

In some embodiments, the introducing of the gas into the corresponding solution contained in the foaming chamber of each respective foaming unit in the first plurality of foaming units and the introducing of the gas into the corresponding solution contained in the foaming chamber of each respective foaming unit in the second plurality of foaming units are conducted sequentially. The recording of the foaming process in the foaming chamber of each respective foaming unit in the first plurality of foaming units and the recording of the foaming process in the foaming chamber of each respective foaming unit in the second plurality of foaming units are conducted sequentially.

In some embodiments, the method further includes one or more of the following: preparing the first plurality of solutions; preparing the second plurality of solutions; introducing the first plurality of solutions into the foaming chambers of the first plurality of foaming units; and introducing the second plurality of solutions into the foaming chambers of the second plurality of foaming units.

In accordance with some embodiments, a method for high throughput foam analysis includes obtaining a first respective frame from a first plurality of frames. The first plurality of frames is produced by temporally recording a respective foaming process in each foaming chamber of each foaming unit in a first plurality of foaming units, each respective frame in the first plurality of frames representative of the foaming process in the foaming chamber of each foaming unit in the first plurality of foaming units at a corresponding discrete time point in a plurality of discrete time points. The method also includes segmenting the first respective frame into a first plurality of segmented images, each respective segmented image in the first plurality of segmented images representative of a corresponding foaming chamber, together with the respective solution and/or the foam in the corresponding foaming chamber of a respective foaming unit in the first plurality of foaming units at the corresponding discrete time point. The method further includes extracting, from each segmented image in the first plurality of segmented images, one or more characteristics of the foam generated in the corresponding foaming chamber of each foaming unit in the first plurality of foaming units at the corresponding discrete time point, thereby facilitating high throughput foam analysis of the first plurality of solutions.

In some embodiments, the method also includes obtaining a second respective frame from a second plurality of frames. The second plurality of frames is produced by temporally recording a respective foaming process in each foaming chamber of each foaming unit in a second plurality of foaming units, each respective frame in the second plurality of frames representative of the foaming process in the foaming chamber of each foaming unit in the second plurality of foaming units at a corresponding discrete time point in the plurality of discrete time points. The method also includes segmenting the second respective frame into a second plurality of segmented images, each respective segmented image in the second plurality of segmented images representative of a corresponding foaming chamber, together with the respective solution and/or the foam in the corresponding foaming chamber of a respective foaming unit in the second plurality of foaming units at the corresponding discrete time point. The method further includes, extracting, from each segmented image in the second plurality of segmented images, one or more characteristics of the foam generated in the corresponding foaming chamber of each foaming unit in the second plurality of foaming units at the corresponding discrete time point, thereby facilitating high throughput foam analysis of the second plurality of solutions.

In some embodiments, the segmenting of the respective frame into a plurality of segmented images includes creating a binary image from the respective frame, selecting a plurality of contours from the binary image, each contour in the plurality of contours corresponding to an outline of the foaming chamber of a respective foaming unit in the first or second plurality of foaming units, and partitioning the respective frame in accordance with the plurality of contours, thereby producing the plurality of segmented images.

In some embodiments, the creating of the binary image includes: converting the respective frame into a grayscale image; and using a threshold to binarize the grayscale image, thereby creating the binary image.

In some embodiments, the segmenting of the respective frame into the plurality of segmented images further includes one or more of the following: removing, subsequent to the creating of the binary image and prior to the selecting of the plurality of contours, noises from the binary image; and cropping each respective segmented image in all or a subset of the plurality of segmented images along a width direction of the respective segmented image from a first side and a second side of the respective segmented image to reduce impact of a first side wall and a second side wall of the corresponding chamber on subsequent image analysis. The cropping is up to 5%, 10%, 15%, 20%, 25%, or 30%.

In some embodiments, for each respective segmented image in all or a subset of the plurality of segmented images, the extracting of the one or more characteristics of the foam includes one or more of the following: extracting one or more dimensions of the foam; and extracting one or more properties of bubbles in the foam.

In some embodiments, each respective segmented image in all or a subset of the plurality of segmented images includes a plurality of first subregion types, each first subregion type in the plurality of first subregion types includes a plurality of contiguous pixels, and each pixel in the plurality of pixels has a pixel value representative of a brightness of the pixel. For the respective segmented image, the extracting of the one or more dimensions of the foam includes: calculating a pixel value variance of each first subregion type in the plurality of first subregion types; determining whether the calculated pixel value variance of each first subregion type in the plurality of first subregion types and cutoff values is between a first cutoff value and a second cutoff value, or between the second and a third cutoff value; identifying one or more boundaries, where the one or more boundaries includes a solution-foam boundary between the respective solution and the foam in the corresponding foaming chamber at the corresponding discrete time point, where first subregion types with the pixel value variances between the first cutoff value and the second cutoff value represent the solution, and first subregion types with the pixel value variances between the second cutoff value and the third cutoff value represent the foam; determining a height of the foam in the corresponding chamber at the corresponding discrete time point by counting the number of first subregion types from the solution-foam boundary to a top of the segmented image; and optionally or additionally, determining a height of the solution in the corresponding chamber at the corresponding discrete time point by counting the number of first subregion types from a bottom of the segmented image to the solution-foam boundary.

In some embodiments, the one or more boundaries further includes a foam-gas boundary between the gas and the foam in the corresponding foaming chamber at the corresponding discrete time point, and a solution-chamber boundary between the solution and the corresponding foaming chamber at the corresponding discrete time point. The first subregion types with the pixel value variances less than the first cutoff value represent the gas. A first subregion type at the foam-gas boundary has the pixel value exceeding the third cutoff value. A first subregion type at the solution-chamber boundary has the pixel value exceeding the third cutoff value. The height of the foam in the corresponding chamber at the corresponding discrete time point is determined by counting the number of first subregion types from the solution-foam boundary to the foam-gas boundary, and the height of the solution in the corresponding chamber at the corresponding discrete time point is determined by counting the number of first subregion types from the solution-chamber boundary to the solution-foam boundary.

In some embodiments, each respective segmented image in all or a subset of the plurality of segmented images includes a plurality of first subregion types, each first subregion type in the plurality of first subregion types includes a plurality of contiguous pixels, and each pixel in the plurality of pixels has a pixel value representative of a brightness of the pixel. For the respective segmented image, the extracting of the one or more dimensions of the foam includes calculating a pixel value variance of each first subregion type in the plurality of first subregion types, generating a graphic with the calculated pixel value variances as a function of the first subregion types of the segmented image, and graphically determining a height of the foam and/or a height of the solution at the corresponding discrete time point, using one or more of first, second and third cutoff values. The one or more of first, second and third cutoff values are determined based on a resolution of segmented images, and depend on, e.g., size of the corresponding foaming chamber. In some embodiments, the first cutoff value is up to 2 or up to 5, the second cutoff value is up to 30, or up to 50, and the third cutoff value is up to 800, or up to 1000.

In some embodiments, each respective segmented image in all or a subset of the plurality of segmented images includes a plurality of first subregion types, each first subregion type in the plurality of first subregion types includes a plurality of contiguous pixels, and each pixel in the plurality of pixels has a pixel value representative of a brightness of the pixel. For the respective segmented image in the plurality of segmented images, the extracting of the one or more dimensions of the foam includes determining an image gradient for the one or more corresponding grayscale images of the partially foamed liquid and determining the number of directional changes for each first subregion type and each second subregion type in the image gradient. The extracting also includes classifying the first subregion types of pixels in the one or more corresponding binary images of the partially foamed liquid as corresponding to a solution phase or a foam, thereby identifying the location of a solution phase and a foam phase of the first material contained within the first chamber. A height of the foam in the corresponding chamber at the corresponding discrete time point is determined by counting the number of first subregion types corresponding to the foam phase. Optionally or additionally, A height of the solution in the corresponding chamber at the corresponding discrete time point is determined by counting the number of first subregion types corresponding to the solution phase.

In some embodiments, the pixel value of each pixel is stored as an 8-bit integer having a value ranging from 0 to 255, where in 0 represents black in the segmented image, and 255 represents white in the segmented image.

In some embodiments, for each respective segmented image in all or a subset of the plurality of segmented images, the extracting of the one or more properties of bubbles in the foam includes cropping the respective segmented image along a height direction of the respective segmented image to remove pixels below the solution-foam boundary and/or above the foam-gas boundary, thereby producing a foam regional image.

In some embodiments, the extracting of the one or more properties of bubbles in the foam further includes converting, if the foam regional image is not a grayscale image, the foam regional image into a grayscale foam regional image, and optionally or additionally, removing noises from the foam regional image or from the grayscale foam regional image. The extracting of the one or more properties of bubbles in the foam further includes creating a binary foam regional image from the foam regional image or from the grayscale foam regional image. The binary foam regional image includes a plurality of blobs, each blob in the plurality of blobs includes one or more pixels, and each pixel in the one or more pixels of each blob has a first pixel value.

In some embodiments, the noises are removed by Gaussian blurring, median blurring, bilateral filtering, box filtering, or any combination thereof. In some embodiments, the Gaussian blurring is performed using a 3×3 kernel, or a 5×5 kernel.

In some embodiments, the binary foam regional image is created by an Otsu's method, an adaptive mean thresholding method, an adaptive Gaussian thresholding method, or a thresholding method with a manually set threshold.

In some embodiments, the extracting of the one or more properties of bubbles in the foam further includes: (i) determining whether a size of a respective blob in the plurality of blobs is smaller than a minimum blob size representative of a minimum bubble size; (ii) discarding the respective blob if it is determined that its size is smaller than the minimum blob size; (iii) repeating (i) and (ii) for each blob in the plurality of blobs, thereby producing a subset of blobs, where each blob in the subset of blobs has the size equal to or larger than the minimum blob size; and (iv) eroding the binary foam regional image to obtain center coordinates of each blob in the subset of blobs.

In some embodiments, the eroding of the binary foam regional image to obtain the center coordinates of each blob in the subset of blobs includes: (i) shrinking the sizes of the blobs in the subset of blobs; (ii) determining whether the size of a respective shrunken blob in the subset of blobs is smaller than the minimum blob size; (iii) recording a position of the respective shrunken blob as its center coordinates, if it is determined that the size of the respective shrunken blob in the subset of blobs is smaller than a minimum blob size; and (iv) repeating steps (i)-(iii) until none of the shrunken blobs in the subset of blobs has the size exceeding the minimum size.

In some embodiments, the eroding of the binary foam regional image to obtain the center coordinates of each blob in the subset of blobs is performed using a 3×3 kernel or a 5×5 kernel.

In some embodiments, the extracting of the one or more properties of bubbles in the foam further includes using a distance transformation to locate a plurality of local maxima, and designating the plurality of local maxima as the center coordinates of the plurality of blobs.

In some embodiments, a center of each respective blob in all or a subset of the plurality of blobs is represented by a circle having a radius up to 3 pixels in radius, up to 5 pixels in radius, or up to 8 pixels in radius.

In some embodiments, the extracting of the one or more properties of bubbles in the foam further includes determining a peripheral boundary of each blob in the plurality of blobs or in the subset of the plurality of blobs, and generating a blob segmentation image in accordance with the determined peripheral boundary of each blob in the plurality of blobs or in the subset of the plurality of blobs.

In some embodiments, the determining of the peripheral boundary of each blob in the plurality of blobs or in the subset of the plurality of blobs includes: (i) calculating a distance of each pixel in the binary foam regional image to its nearest pixel that has a second pixel value, thereby producing a distance transformed image; (ii) using the obtained center coordinates of each blob in the plurality of blobs or in the subset of the plurality of blobs as a starting point to watershed the distance transformed image, thereby producing a plurality of watershed regions, where each watershed region in the plurality of watershed regions has a boundary; (iii) assigning the boundaries of the plurality of watershed regions as ridges of the plurality of watershed regions; and (iv) determining the peripheral boundary of each blob in the plurality of blobs or in the subset of the plurality of blobs in accordance with the ridges of the plurality of watershed regions.

In some embodiments, the extracting of the one or more properties of bubbles in the foam further includes: (i) determining whether two adjacent blobs in the blob segmentation image are overlapped; (ii) merging the two adjacent blobs into a combined blob, if it is determined that the two adjacent blobs in the blob segmentation image are overlapped; and (iii) optionally or additionally, repeating (i) and (ii), thereby producing a modified blob segmentation image.

In some embodiments, the two adjacent blobs in the blob segmentation image are determined to be overlapped, if a criteria of d<min(r1, r2) is met, where r1 and r2 stand for radii of minimum bound circles of the two adjacent blobs, and d stands for a distance between centers of the minimum bound circles of the two adjacent blobs.

In some embodiments, the merging of the two adjacent blobs into the combined blob is conducted by dilating each of the two adjacent blobs.

In some embodiments, where for each respective blob in all or a subset of the blob segmentation image or in all or a subset of the modified blob segmentation image, the extracting of the one or more properties of the bubbles in the foam further includes: calculating one or more of the following: an area A surrounded by the peripheral boundary of the respective blob; an equivalent diameter of the respective blob using a formula of sort $(4 \times A/\pi)$; a perimeter C of the peripheral boundary of the respective blob; a circularity of the respective blob using a formula of $4 \times \pi \times A/C^2$; a solidity of the respective blob using a formula of A/HA, where HA stands for a convex hull area; a first aspect ratio of the respective blob using a formula of min(a1, b1)/max(a1, b1), where a1 and b1 stand for width and height of a bounding rectangle, respectively; a second aspect ratio of the respective blob using a formula of min(a2, b2)/max(a2, b2), where a2 and b2 stand for width and height of a minimum bounding rectangle, respectively; a third aspect ratio of the respective blob using a formula of min(a3, b3)/max(a3, b3), where a3 and b3 stand for lengths of two axes of a fitted ellipse, respectively; a first extent of the respective blob using a formula of A/BRA, where BRA stands for an area of a bounding rectangle; a second extent of the respective blob using a formula of A/mBRA, where mBRA stands for an area of a minimum bounding rectangle; a third extent of the respective blob using a formula of A/mBCA, where mBCA stands for an area of a minimum bounding circle; and a fourth extent of the respective blob using a formula of A/EA, where EA stands for an area of a fitted ellipse.

In some embodiments, the at least one program further includes instructions for clustering the blobs in the blob segmentation image or in the modified blob segmentation image into two or more clusters.

In some embodiments, the blobs are clustered in accordance with one or more properties selected from the circularity, solidity, first aspect ratio, second aspect ratio, third aspect ratio, first extent, second extent, third extent and fourth extent of each blob in the blob segmentation image or in the modified blob segmentation image.

In some embodiments, a principle component analysis is performed to select the one or more properties from the circularity, solidity, first aspect ratio, second aspect ratio, third aspect ratio, first extent, second extent, third extent and fourth extent of each blob in the blob segmentation image or in the modified blob segmentation image.

In some embodiments, the clustering of the blobs is performed using a K-means clustering algorithm to minimize a within-cluster sum of squares, where the K-means clustering algorithm:

$$\underset{s}{\arg\min} \sum_{i=1}^{k} \sum_{x \in S_i} \|x - u_i\|^2$$

where, each $x_i$ in $(x_1, x_2, \ldots, x_n)$ is a blob, k is the number of clusters, each $S_i = \{S_1, S_2, \ldots, S_k\}$ is a set of blobs clustered into each cluster set, and each $u_i$ in $(u_1, u_2, \ldots, u_k)$ is a centroid of a corresponding cluster.

In some embodiments, the method further includes classifying the blobs in the blob segmentation image, the blobs in the modified blob segmentation image, or the blobs in a first cluster that has a larger or a largest number of blobs among the two or more clusters, into bubble blobs and non-bubble blobs, by one or more of the following: classifying the blobs manually, and classifying the blobs using a bubble model. The method also includes generating a final set of blobs including each blob of the subset blobs in the blob segmentation image, the subset blobs in the modified blob segmentation image, or the subset blobs in a first cluster that has a larger or a largest number of blobs among the two or more clusters classified as a bubble blobs.

In some embodiments, the method further includes selecting a first cluster that has a larger or a largest number of blobs from the two or more clusters and designating the blobs in the first cluster as a final set of blobs representative of the bubbles in the foam. The method also includes optionally or additionally, discarding remaining clusters in the two or more clusters.

In some embodiments, the method further includes selecting a first cluster that has a larger or a largest number of blobs from the two or more clusters and comparing the blobs in the first cluster with the bubbles in the foam to identify one or more bubble blobs, and/or one or more non-bubble blobs. Each bubble blob in the one or more bubble blobs corresponds to a bubble in the foam, and each non-bubble blob in the one or more non-bubble blobs has no corresponding bubble in the foam. The method also includes constructing a training set including (i) the identified one or more bubble blobs, (ii) the identified one or more non-bubble blobs, and/or (iii) one or more blobs in a second cluster in the two or more clusters as non-bubble blobs; and deriving, using the training set, a bubble model to classify blobs in accordance with the one or more extracted properties of bubbles.

In some embodiments, the method also includes updating the training set and/or refining the bubble model.

In some embodiments, the method further includes one or more of the following: labeling the blobs in the blob segmentation image, the blobs in the modified blob segmentation image, or the blobs in a first cluster that has a larger or a largest number of blobs among the two or more clusters; drawing contours of the blobs in the blob segmentation image, the blobs in the modified blob segmentation image, or the blobs in a first cluster that has a larger or a largest number of blobs among the two or more clusters; and generating one or more data files. Each data file in the one or more data files includes one or more of the following: the extracted one or more characteristics of the foam in the foaming chamber of each respective foaming unit in all or a subset of the first foaming units; the final set of blobs; images with labeled blobs and/or drawn contours; and the first plurality of frames and/or the second plurality of frames. At least one frame of the first plurality of frames or the second plurality of frames has labeled blobs and/or drawn contours.

In accordance with some embodiments, a foam generation system for high throughput foam analysis includes a plurality of foaming units, each foaming unit in the plurality of foaming units. Each foaming unit in the plurality of foaming units includes a foaming chamber configured to independently accommodate a respective solution in a plurality of solutions, and a gas induction mechanism configured to introduce a gas into the respective solution in the foaming chamber as part of a foaming process that generates a foam in the foaming chamber.

In some embodiments, the foam generation system for high throughput foam analysis includes a plurality of foaming units. Each foaming unit in the plurality of foaming unit includes a foaming chamber configured to independently accommodate a respective solution in a plurality of solutions. Each solution in each foaming unit in the plurality of foaming units undergoes an independent foaming process, thereby generating a respective foam in the foaming chamber of each foaming unit in the plurality of foaming units.

In some embodiments, the foaming chamber of each respective foaming unit in all or a subset of the plurality of foaming units is characterized by a substantially rectangular cross section.

In some embodiments, each respective foaming unit in all or a subset of the first plurality of foaming units includes a porous member that separates the foaming chamber of the respective foaming unit into a first portion and a second portion. The respective solution of the respective foaming unit is received in the second portion of the foaming chamber, and the gas induction mechanism of the respective foaming unit includes a vacuum source in fluid communication with the second portion of the foaming chamber to pull the gas from the first portion to the second portion, thereby introducing the gas into the respective solution and generating the foam in the foaming chamber of the respective foaming unit.

In some embodiments, the gas induction mechanism of each respective foaming unit in all or a subset of the first plurality of foaming units includes a porous sparger disposed in the foaming chamber of the respective foaming unit. The porous sparger is in fluid communication with a gas supply to introduce the gas into the respective solution of the respective foaming unit, thereby generating the foam in the foaming chamber of the respective foaming unit.

In some embodiments, the porous member is a frit, and the frit has a pore size range between 10 µm and 20 µm, between 20 µm and 30 µm, or between 30 µm and 40 µm. In some embodiments, the frit has an average pore size that is between 10 µm and 20 µm, between 20 µm and 30 µm, or between 30 µm and 40 µm.

In some embodiments, each respective porous sparger (i) has an active porous length and a pore size range between 2 µm and 5 µm, between 5 µm and 10 µm, between 10 µm and 15 µm, or between 15 µm and 20 µm. The sparger is configured such that the active porous length of the respective sparger is submerged in the corresponding solution before generating the foam.

In some embodiments, the foaming chamber of each respective foaming unit in all or a subset of the first plurality of foaming units has of foaming units has linear dimensions between 25 mm and 100 mm, between 100 mm and 400 mm, or between 400 mm and 900 mm.

In accordance with some embodiments, an analysis system for high throughput foam analysis includes at least one processor, and a nontransitory memory addressable by the at least one processor and storing at least one program for execution by the at least one processor. The at least one program including instructions for performing any of the methods described herein.

In some embodiments, the program is stored in nontransitory memory addressable by at least one processor, and the program is executed by the at least one processor. The program includes instructions for performing any of the methods described herein.

BRIEF DESCRIPTION OF THE DRAWINGS

FIG. 10A-FIG. 10L provide exemplary images of image processing performed in accordance of the methods disclosed herein in accordance with some embodiments.

Like reference numerals refer to corresponding parts throughout the several views of the drawings. In the figures, optional steps or elements are denoted in dashed line boxes.

DETAILED DESCRIPTION

Systems and methods are provided for high throughput foam analysis. The systems and methods disclosed herein provide for non-invasive, reproducible and precise manners for analyzing a variety of foam samples. In some embodiments, the high throughput systems and methods disclosed herein are applied for surveying a vast space of possible entities from plants, and for identifying desirable entities from such sources for food applications.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and networks have not been described in detail so as not to unnecessarily obscure aspects of the embodiments.

It will also be understood that, although the terms "first", "second", etc. may be used herein to describe various elements, these elements should not be limited by these terms. These terms are only used to distinguish one element from another. For example, a "first subject" could be termed a "second subject", and, similarly, a "second subject" could be termed a "first subject" without departing from the scope of the present disclosure. The first subject and the second subject are both subjects, but they are not the same subject.

The terminology used in the present disclosure is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

System

Figure 1:
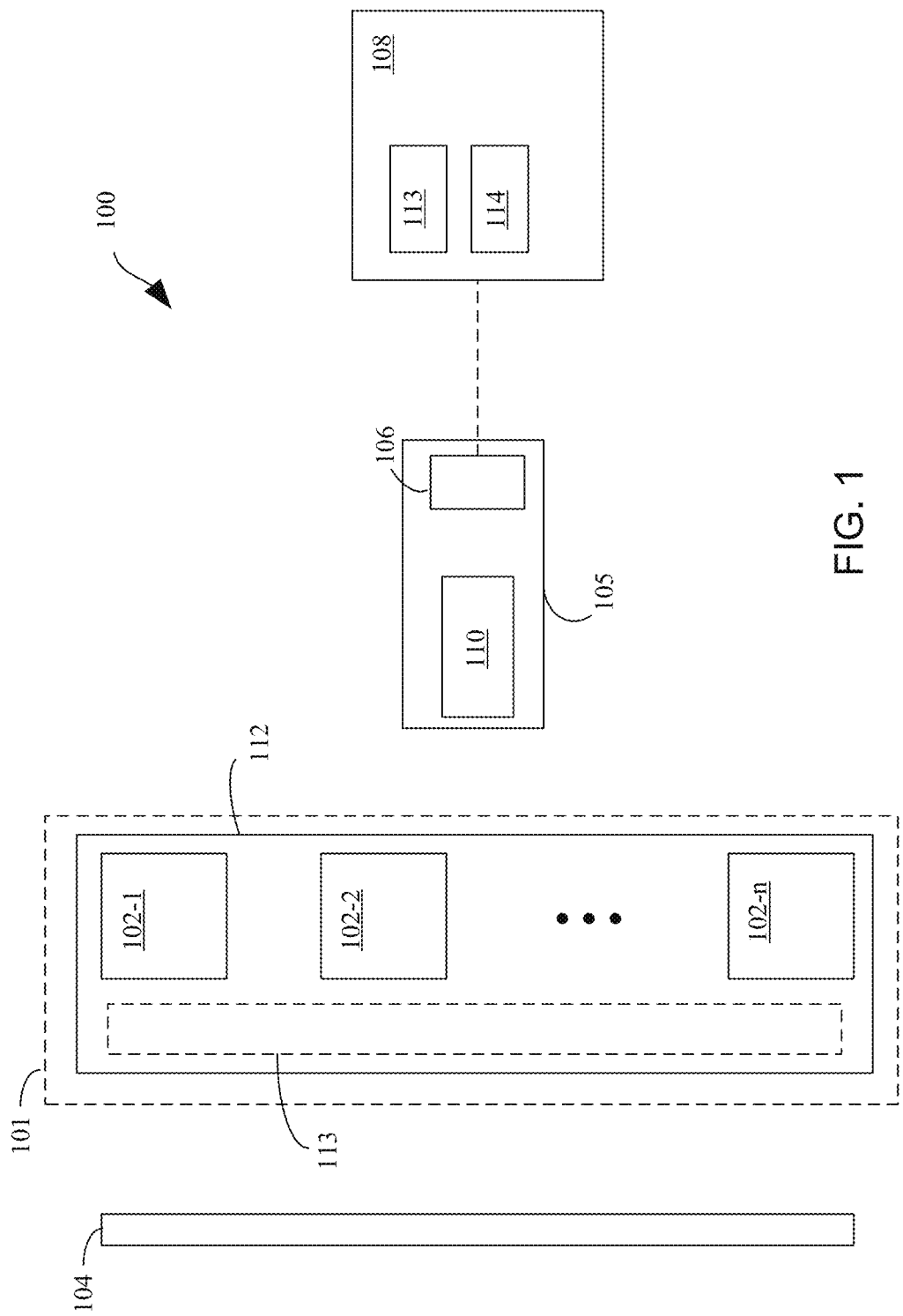
FIG. 1 is a schematic illustration of a system for high throughput foam analysis in accordance with some embodiments.
Figure 2:
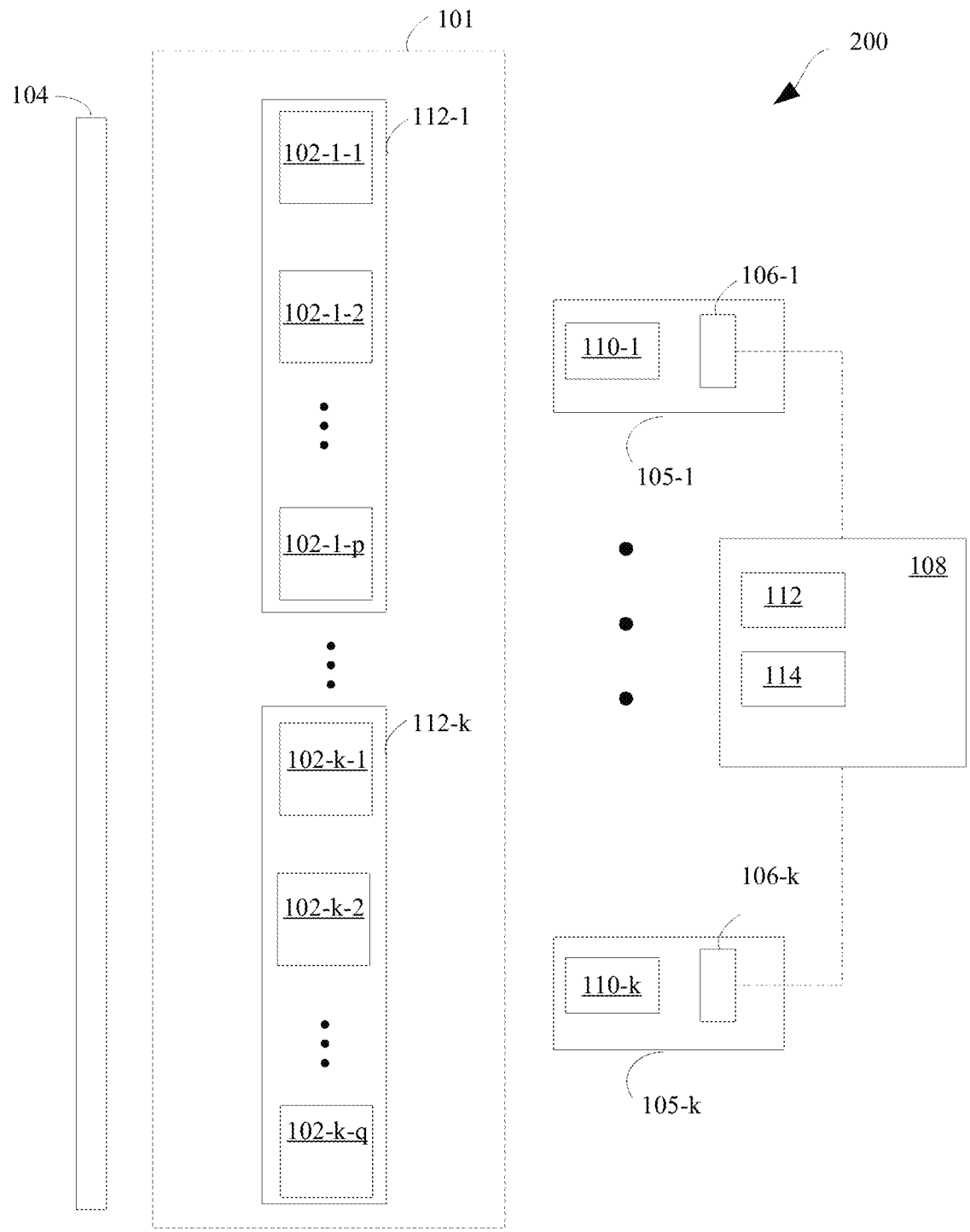
FIG. 2 is a schematic illustration of a system for high throughput foam analysis in accordance with some embodiments.

A detailed description of systems for high throughput foam analysis of samples in accordance with the present disclosure is described in conjunction with FIGS. 1 through 3.

FIG. 1 is a schematic illustration of system 100 for high throughput foam analysis in accordance with some embodiments. System 100 includes foam generation system 101, illumination source 104, detection system 105 and analysis system 108. Throughout the present disclosure, these components of system 100 will be referenced as separate devices solely for purposes of clarity. That is, the disclosed functionality of foam generation system 101, illumination source 104, detection system 105 and analysis system 108 are contained in separate devices as illustrated in FIG. 1. However, it will be appreciated that, in fact, in some embodiments, the disclosed functionality of foam generation system 101, illumination source 104, detection system 105 and analysis system 108 are contained in a single device. Likewise, in some embodiments, some of the components of system 100 are contained in a single device, whereas some components are separated from the single device. For example, in some embodiments, foam generation system 101, illumination source 104 and detection system 105 are contained in one device, and analysis system 108 is contained in another device.

Foam generation system 101 includes one or more foaming units 112. In FIG. 1, only one foaming unit 112 is shown. In some embodiments, foam generation system 101 includes a plurality of foaming units 112 (e.g., the number of foaming units is between 1 and k, where k is a positive integer of 2 or greater). In some embodiments, all or a subset a plurality of foaming units 112 are monolithically made of one unit. As used herein, a subset of a plurality of foaming units includes any number of foaming units between one and k−1. Foaming unit 112 includes one or more foaming chambers (e.g., foaming chambers 102-1, 102-2, . . . , 102-n, where n is a positive integer of 2 or greater). In some embodiments, foaming units 112 are in an integrated block (e.g., a block containing two or more foaming chambers 102-1, 102-2, . . . , 102-n). Each foaming chamber is configured to accommodate a solution for analysis of the solution's foaming properties. Each foaming chamber of foaming chambers 102-1, 102-2, . . . , 102-n is configured to independently accommodate a respective solution in a plurality of solutions.

Foaming unit 112 also includes gas induction mechanism 113, which is configured to introduce a gas into foaming chambers 102-1, 102-2, . . . , 102-n. Gas induction mechanism 113 introduces a gas to the solution as part of a foaming process to generate a foam in foaming chambers 102-1, 102-2, . . . , 102-n. Each solution in respective foaming chambers 102 undergoes an independent foaming process, thereby generating a respective foam in the respective foaming chambers. In some embodiments, foam generation system 101 further includes one or more sample racks to hold the one or more foaming units 112. For example, foam generation system 101 includes two foaming units 112, and two sample racks to hold each of the foaming units 112. In another example, foam generation system 101 includes four foaming units 112, and two sample racks so that each sample rack holds two foaming units 112.

Illumination source 104 provides illumination to foaming chambers **102-1, 102-2, . . . , 102-*n* of foaming unit 112. In some embodiments, illumination source 112 includes one or more light-emitting diode (LED) panels (e.g., one or more Thin LED Backlights "Green", item number MB-TBL 4×5 by Metaphase Lighting Technologies.). The one or more LED panels are configured to emit light of a particular color (e.g., green, red, blue or white light). In some embodiments, illumination source 104** is configured to emit a green light with a wavelength of approximately 530 nm.

In some embodiments, foaming chambers **102-1, 102-2, . . . , 102-*n* of foaming unit 112 are arranged in a line parallel to illumination source 104. In some embodiments, foaming chambers 102-1, 102-2, . . . , 102-*n* of foaming unit 112 are arranged equidistant to, or somewhat equidistant to illumination source 104. Illumination source 104 is positioned in system 100 so that illumination source 104 emits light toward detection system 105 via foam generation system 101, i.e. illumination source 104 and detection system 105 are on opposite sides of foam generation system 101. Foam generation system 101 including foaming unit 112 is disposed between illumination source 104 and detection system 105. System 100 can also have alternative configurations for illuminating foaming chambers 102-1, 102-2, . . . , 102-*n* by illumination source 104. In some embodiments, illumination source 104 is disposed on the right or the left side of foam generation system 101, and/or illumination source 104 is disposed above or below foam generation system 101. In some embodiments, illumination source 104 is disposed on the same side of foam generation system 101 as detection system 105**.

Detection system 105 includes camera 106. In some embodiments, camera 106 is a still camera, or a video camera (e.g., High Resolution Gig E Vision Camera, part number GT2750 by Allied Vision Technologies). Camera 106 is configured to temporally record the foaming process in foaming chambers **102-1, 102-2, . . . , 102-*n* of foaming unit 112. In some embodiments, detection system 105 further includes telecentric lens 110 (e.g., Large Format Telecentric Lens 0.104×Mag, part number TC2MHR120-C by Opto Engineering). Telecentric lens 110 is disposed between foaming unit 112 and camera 106. In some embodiments, telecentric lens 110 is optically coupled with camera 106. In some embodiments, camera 106 includes a built-in telecentric lens (e.g., telecentric lens 110**).

Telecentric lens 110 produces an orthogonal projection of foaming unit 112 to camera 106, thereby reducing distortion and improving resolution of each respective frame in the first plurality of frames. Telecentric lens refers to a compound lens with at least one pupil set at a large enough distance from an optical surface to be comparable to an effect of having the at least one pupil set at infinity. An entrance pupil at "infinity" causes principal rays to be parallel to the optical axis in object space. Object-space telecentric lenses provide an orthogonal projection of an object. Object-space telecentric lenses have a constant, non-angular field of view, and provide a constant magnification regardless of the distance between the object and the lens. Such property is beneficial when recording frames of foam for analysis, as the constant magnification provides the same magnification for bubbles of the foam regardless of their distance from the lens and therefore leads to more accurate size analysis. The constant magnification also reduces distortion and improves resolution of images. Furthermore, the blurring of an image due to movement of an object in and out of focus is symmetrical, as telecentric lens does not have angular component to the field of view. Therefore, an accurate analysis of an image can be made even when the object is not at the best focus, as long as the image has a high enough contrast for an algorithm to recognize features of the image.

Analysis system 108 is in electronic communication with detection system 105. Analysis system 108 includes at least one processor 115 and nontransitory memory 114, which is addressable. Memory 114 stores at least one program for execution by processor 115. The at least one program includes instructions for performing any one of the methods described herein.

In some embodiments, a program is disclosed. The program is stored in nontransitory memory 114 addressable by at least one processor. The program is executed by the at least one processor 115. The program includes instructions for performing any one of the methods described herein.

System 100 performs high throughput foam analysis. System 100 facilitates non-invasive and fast detection of foaming in a large quantity of solutions by recording a plurality of frames. The imaging by detection system 105, including camera 106 and telecentric lens 110, provides high resolution frames and/or videos that enable extraction of foam characteristics by image processing. The methods of extracting foaming characteristics (e.g., a height of the foam, bubble sizes, a distribution of bubble sizes, and bubble shapes), are described below with respect to FIGS. 4-9.

FIG. 2 is a schematic illustration of system 200 for high throughput foam analysis in accordance with some embodiments. System 200 corresponds to system 100 described above with respect to FIG. 1, except that in system 200, foam generation system 101 has a plurality of foaming units, including foaming units **112-1, . . . , 112-*k*, where k is equal to 2 or greater. Foaming units 112-1, . . . , 112-*k* correspond to foaming unit 112 described above with respect to FIG. 1. Each foaming unit includes a plurality of foaming chambers, such as foaming chambers 102-1-1, . . . , 102-1-*p* of foaming unit 112-1 and foaming chambers 102-*k*-1, . . . , 102-*k*-*q* of foaming unit 112-*k*, where p, q≥2. System 200 also includes a plurality of detection systems, including detection systems 105-1, . . . , 105-*k*. Detection system 105-1 includes camera 106-1 and telecentric lens 110-1. Detection system 105-*k* includes camera 106-*k* and telecentric lens 110-*k*. Detection systems 105-1, . . . , 105-*k* correspond to detection system 105 described above with respect to FIG. 1. In some embodiments, each detection system of detection systems 105-1, . . . , 105-*k* captures frames of corresponding individual foaming units 112-1, . . . , 112-*k*. In some embodiments, a detection system of detection systems 105-1, . . . , 105-*k* captures frames of two or more foaming units 112-1, . . . , 112-*k***.

In some embodiments, detection systems **105-1, . . . , 105-*k* are configured to capture one or more frames (e.g., a video) concurrently. For example, detection system 105-1 captures a first frame of foaming unit 112-1, and detection system 105-*k* captures a second frame of foaming unit 112-*k* concurrently. In some embodiments, detection systems 105-1, . . . , 105-*k* are configured to capture frames sequentially. For example, detection system 105-1 captures a first frame of foaming unit 112-1, and detection system 105-*k* captures a second frame of foaming unit 112-*k* after the first frame has been captured. In some embodiments, a portion of detection systems 105-1, . . . , 105-*k* captures frames concurrently while another portion of detection systems 105-1, . . . , 105-*k*** does not capture frames at that time. In some embodiments, illumination source 104 illuminates all foaming chambers of foaming units 112-1, . . . , 112-k concurrently.

Figure 3B:
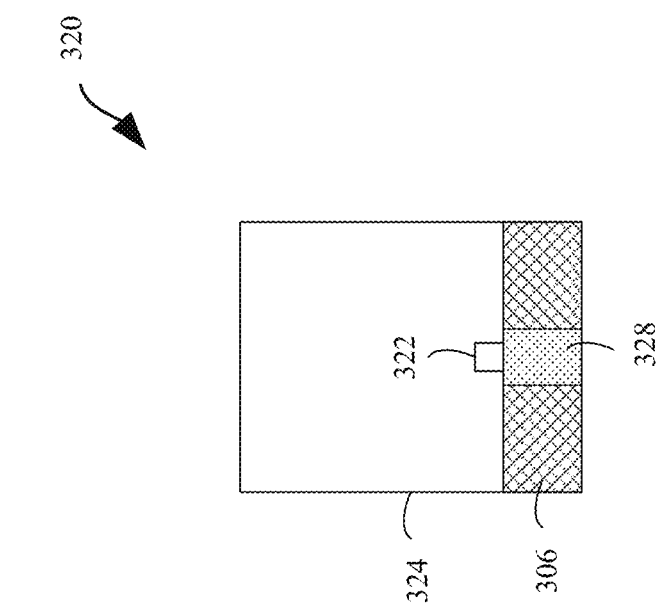
FIG. 3B is a schematic cross-sectional illustration of a sparger foaming chamber in accordance with some embodiments.
Figure 3A:
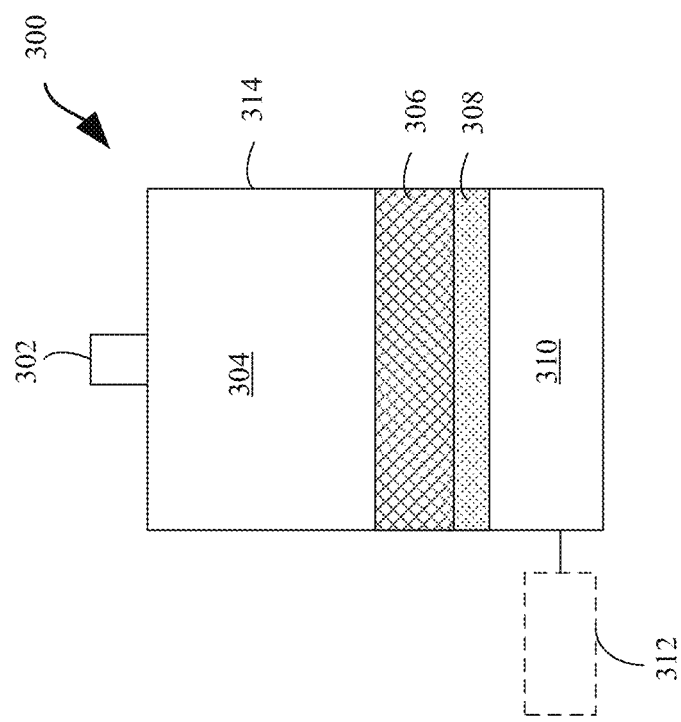
FIG. 3A is a schematic cross-sectional illustration of a vacuum foaming chamber in accordance with some embodiments.

FIG. 3A is a schematic cross-sectional illustration of a vacuum foaming chamber 300 in accordance with some embodiments. Vacuum foaming chamber 300 corresponds to foaming chambers 102-1, 102-2, . . . , 102-n described above with respect to FIG. 1. Vacuum foaming chamber 300 includes enclosure 314 (e.g., a cuvette) and porous member 308, which separates vacuum foaming chamber 300 into first portion 310 and second portion 304. In some embodiments, solution 306, which is a solution to be analyzed for its foaming properties and includes an entity, is received in second portion 304 of vacuum foaming chamber 300. In some embodiments, porous member 308 is a frit (e.g., vacuum foaming chamber 300 is a fritted column provided by Ace Glass, Inc.) with a pore size range between 10 µm and 20 µm, between 20 µm and 30 µm, or between 30 µm and 40 µm. In some embodiments, the frit has an average pore size that is between 10 µm and 20 µm, between 20 µm and 30 µm, or between 30 µm and 40 µm. Foaming chamber 300 is attached to vacuum source 213, which is included in (or alternatively is coupled with) gas induction mechanism 113 described above with respect to FIG. 1. Vacuum source 302 is in fluid communication with second portion 304 of vacuum foaming chamber 300, and is configured to pull gas from first portion 310 through porous member 308 to second portion 304, thereby introducing the gas into solution 306 and generating foam in foaming chamber 300. In some embodiments, the introduction of the gas is enabled by creating a pressure difference across porous member 308. For example, a volume of gas is introduced to first portion 310, or first portion 310 is exposed to air (e.g., by tubing or through an opening) so that first portion 310 is at ambient pressure. In some embodiments, first portion 310 is connected to a gas supply 312 for introducing volume of gas to first portion 310.

The pressure difference is what matters either with the vacuum or the sparging such that there is flow of the air.

FIG. 3B is a schematic cross-sectional illustration of sparging foaming chamber 320 in accordance with some embodiments. Sparging foaming chamber 320 corresponds to foaming chambers 102-1, 102-2, . . . , 102-n and 102-1-1 described above with respect to FIG. 1. Sparging foaming chamber 320 includes enclosure 324 (e.g., a cuvette) and porous sparger 328 disposed in solution 306 in foaming chamber 320 (e.g., sparging foaming chamber 320 is a sintered sparger provided by Mott Corporation). Porous sparger 328 is in fluid communication with gas supply 322, and is configured to introduce gas into solution 306 of foaming chamber 320, thereby generating a foam in foaming chamber 320. Porous sparger 328 has an active porous length and a pore size range between 2 µm and 5 µm, between 5 µm and 10 µm, between 10 µm and 15 µm, or between 15 µm and 20 µm. In some embodiments, porous sparger 328 is configured such that the active porous length of the respective sparger is submerged in the corresponding solution before generating the foam.

Vacuum foaming chamber 300 and sparging foaming chamber 320 are characterized by a substantially rectangular cross-section. The linear dimensions of vacuum foaming chamber 300 and sparging foaming chamber 320 range between 25 mm and 100 mm, between 100 mm and 400 mm, or between 400 mm and 900 mm. In some embodiments, all foaming chambers 102-1, 102-2, . . . , 102-n of foaming unit 112 are characterized by a substantially rectangular cross-section. In some embodiments, a subset of foaming chambers 102-1, 102-2, . . . , 102-n is characterized by a substantially rectangular cross-section (e.g., a subset including 1, 2, 3, . . . , n–1 foaming chambers). In some embodiments, foaming chamber 300 is characterized by substantially round, elliptical, triangular, or other polygonal shape. In some embodiments, foaming chamber 300 is characterized by a closed form shape.

In some embodiments, all foaming chambers 102-1, 102-2, . . . , 102-n of foaming unit 112 are vacuum foaming chambers 300. In some embodiments, all foaming chambers 102-1, 102-2, . . . , 102-n are sparging foaming chambers 320. In some embodiments, a first subset (e.g., 1, 2, 3, . . . , n–1 foaming chambers) includes vacuum foaming chambers 300 and a second subset (e.g., 1, 2, 3, . . . , n–1 foaming chambers) includes sparging foaming chambers 320.

In some embodiments, foaming chambers foaming chambers 102-1, 102-2, . . . , 102-n described above with respect to FIG. 1 are configured to generate foam by other means known in the art. In some embodiments, foaming chambers 102-1, 102-2, . . . , 102-n are configured to be coupled with means for other gas induction mechanisms such as beating and/or shaking.

High Throughput Foam Analysis

Figure 4:
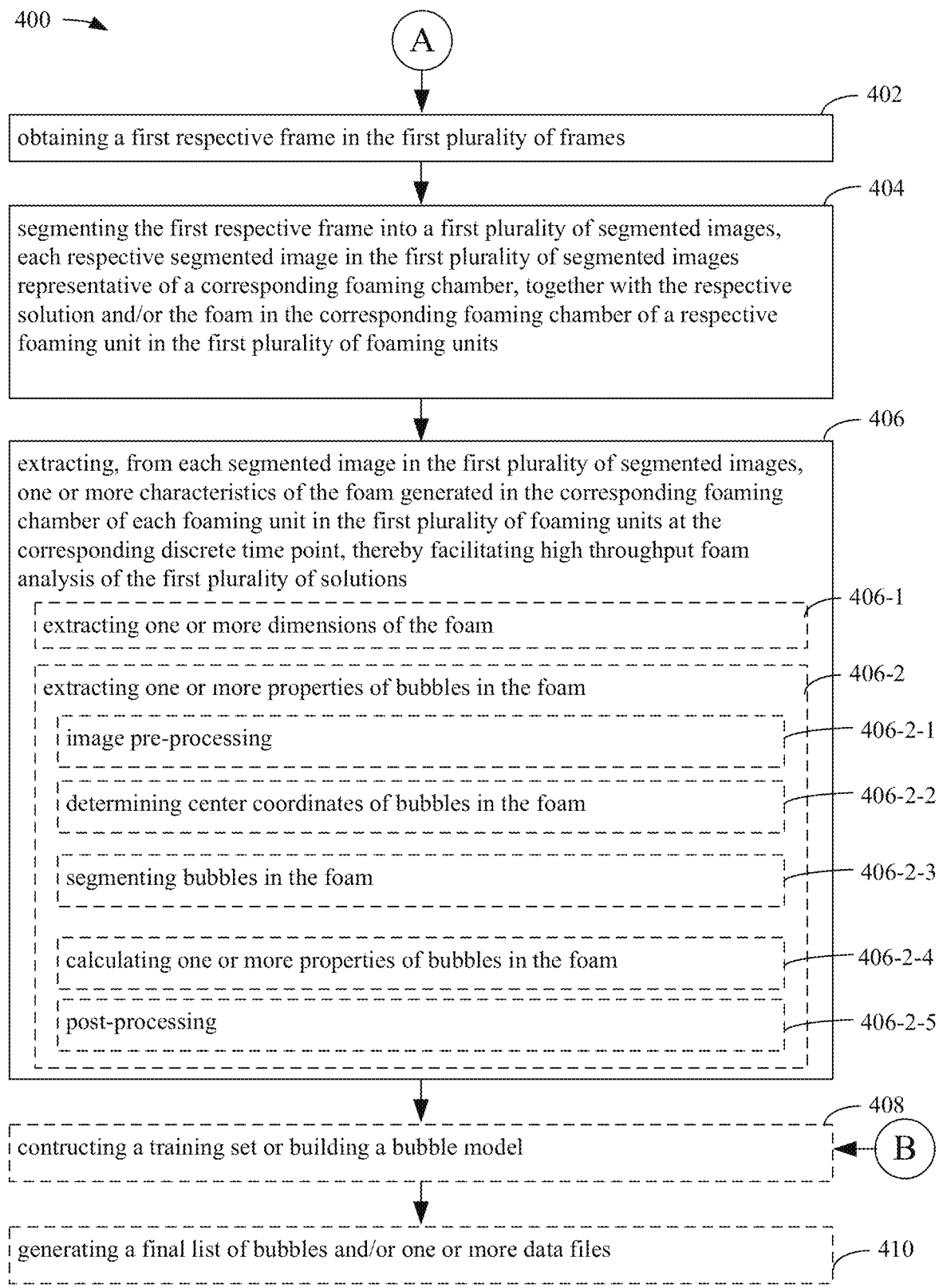
FIG. 4 provides a flowchart for high throughput foam analysis of test entities in accordance with some embodiments.

Now that details of systems 100 and 200 for high throughput foam analysis of test entity have been disclosed, details regarding a flowchart processes and features of the system, in accordance with an embodiment of the present disclosure, are disclosed with a reference to FIG. 4. FIG. 4 provides a flowchart for high throughput foam analysis of test entities in accordance with some embodiments. In some embodiments, such processes and features of the system are carried out by systems 100 and 200 as described with respect to FIGS. 1 and 2.

Block 402. With reference to block 402 of FIG. 4, a first respective frame in the first plurality of frames is obtained by using system 100. The first respective frame is obtained by system 100 (or alternatively by system 200 of FIG. 2), as described above with respect to FIG. 1, which includes foam generation system 101, illumination source 104, detection system 105 and analysis system 108. Analysis system 108 is in communication with detection system 105. Analysis system 108 includes at least one processor 115 and memory 114, which is addressable processor 115. Memory stores at least one program for execution by processor 115. Prior to obtaining the first respective frame, a foaming process is carried out, which will be described in detail below with respect to FIG. 5.

Block 404. With reference to block 404 of FIG. 4, the first respective frame is segmented into a first plurality of segmented images. Each respective segmented image in the first plurality of segmented images is representative of a corresponding foaming chamber (e.g., foaming chamber 102-1), together with the respective solution 306 and/or the foam in the corresponding foaming chamber of foaming unit 112 in the first plurality of foaming units. The method of segmenting will be described in detail below with respect to FIG. 6.

Block 406. With reference to block 406 of FIG. 4, from each segmented image in the first plurality of segmented images, one or more characteristics of the foam generated in the corresponding foaming chamber of each foaming unit in the first plurality of foaming units at the corresponding discrete time point are extracted, thereby facilitating high throughput foam analysis of the first plurality of solutions. The extracting of one or more characteristics include extracting one or more dimensions (e.g., height, width, depth) of the foam (block 406-1) and/or extracting one or more properties of bubbles in the foam (block 406-2). The extracted one or more characteristics of the foam includes one or more of the following: a height of the foam, bubble sizes, a distribution of bubble sizes, bubble shapes, bubble center coordinates, a bubble area, equivalent diameters of bubbles, perimeters of bubbles, a bubble circularity, a bubble solidity, a first bubble aspect ratio, a second bubble aspect ratio, a third bubble aspect ratio, a first bubble extent, a second bubble extent, a third bubble extent and a fourth bubble extent. The method of extracting the one or more properties of bubbles includes image pre-processing (block 406-2-1), determining center coordinates of bubbles in the foam (block 406-2-2), segmenting bubbles in the foam (block 406-2-3), calculating one or more properties of bubbles in the foam (block 406-2-4) and post-processing (block 406-2-5). The method of extracting foaming characteristics is described in detail herein below with respect to FIGS. 7A-7G.

Block 408. With reference to block 408 of FIG. 4, in some embodiments the method of high throughput foam analysis includes constructing a training set and/or building a bubble. A training set including a plurality of reference entities is trained using feature measurement data measured from the reference entities of the training set. This training set is limited in size and thus a number of foaming analyzes can be run on each reference entity in the training set in order to obtain values for a number of foaming properties of the reference entities of the training set. The measured values provide a basis for determining whether the particular reference entity of the training set has the target foaming properties in some embodiments. The trained model can be used to rapidly test for the presence, absence and/or extent to which a test entity has the target foaming properties. That is, a test entity can be rapidly screened for the presence, absence and/or the extent to which it possesses the target foaming property. The method of constructing a training set or building a bubble model is described in detail herein below with respect to FIG. 9A.

Block 410. With reference to block 410 of FIG. 4, in some embodiments the method of high throughput foam analysis includes generating a final list of bubbles and/or one or more data files. The methods of generating a final list of bubbles and/or one or more data files is described in detail herein below with respect to FIG. 9B-9C. FIGS. 10A-10L provide exemplary images of image processing performed in accordance of the methods disclosed herein in accordance with some embodiments.

Solution Preparation and Foaming Process

Figure 5:
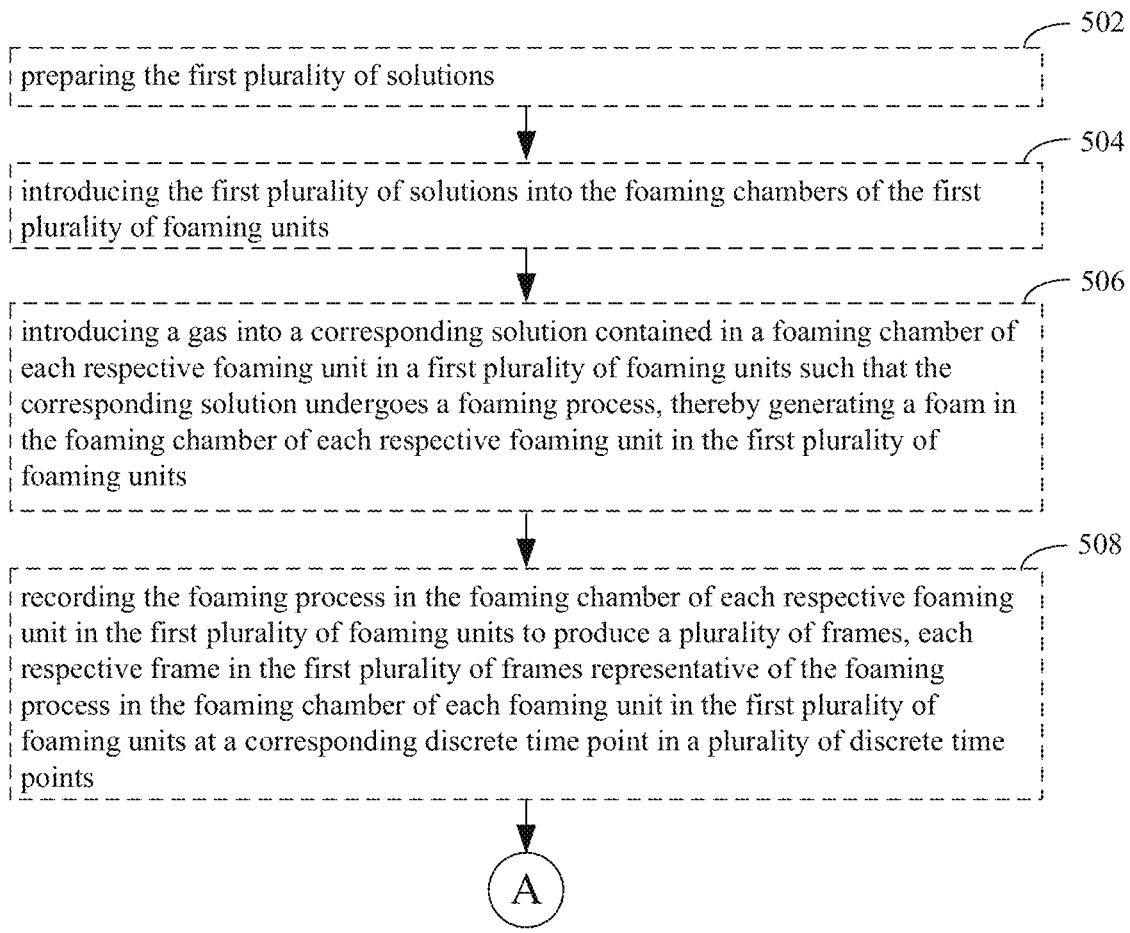
FIG. 5 provides a flowchart for a method of preparing a plurality of solutions and recording images of a foaming process in accordance with some embodiments.

FIG. 5 provides a flowchart for a method of preparing a plurality of solutions and recording images of a foaming process in accordance with some embodiments.

Block 502. With reference to block 502 of FIG. 5, a first plurality of solutions is prepared. Typical measurement includes a plurality of solutions, each contained in a respective foaming chamber (e.g., foaming chambers 102-1, 102-2, . . . , 102-n described with respect to FIG. 1). In typical embodiments, the solution (e.g., solution 306) contains a test entity. The test entity includes one or more foaming agents. As used herein, the term foaming agent refers to any material that facilitates formation of foam (e.g., a surfactant, or a protein). In some embodiments, the one or more foaming agents are amphipathic.

In some embodiments, the test entity includes a protein, a fragment thereof, or a mixture of the protein with one or more other proteins. However, the present disclosure is not so limited, and in some embodiments the test entity alternatively comprises one or more different organic molecules derived from living organisms such as protein (e.g., unmodified protein, sulfated, acylated or glycosylated protein, non-ribosomal peptide), amino acids, one or more different oils (e.g., triglyceride, sterols and other neutral lipids), one or more different polar lipids (e.g., phospholipids, glycolipids, sphingolipids), one or more different carbohydrates (e.g., polysaccharide, oligosaccharide, disaccharide, monosaccharide, etc.), one or more different sugar alcohols, one or more different phenols, one or more different polyphenols, one or more different nucleic acids, one or more different polynucleic acids, one or more different polyketides, one or more different xenobiotic compounds, combinations and covalently-bound combinations thereof (e.g., glycosidic protein or protein-bound lipid), and/or mixtures thereof (e.g., an oil and a phospholipid, etc.). In some embodiments, the test entity comprises two or more different organic molecules derived from living organisms such as protein (e.g., unmodified protein, sulfated, acylated or glycosylated protein, non-ribosomal peptide), two or more different amino acids, two or more different oils (e.g., triglyceride, sterols and other neutral lipids), two or more different polar lipids (e.g., phospholipids, glycolipids, sphingolipids), two or more different carbohydrates (e.g., polysaccharide, oligosaccharide, disaccharide, monosaccharide), two or more different sugar alcohols, two or more different phenols, two or more different polyphenols, two or more different nucleic acids, two or more different polynucleic acids, two or more different polyketides, two or more different xenobiotic compounds, two or more different combinations and covalently-bound combinations thereof (e.g., glycosidic protein or protein-bound lipid), and/or two or more different mixtures thereof (e.g., an oil and a phospholipid, etc.).

In some embodiments, the preparing a solution of the first plurality of solutions includes mixing of a test entity with one or more additives (e.g., water, salts, buffers and/or other suitable additives). In some embodiments, the preparing includes adjusting and/or controlling parameters of the solution (e.g., temperature, pH, concentration, volume, etc.). The concentration of a test entity in a solution ranges between 1% and 9%, or between 1% and 15%. Solution 306 has a volume ranging between 1 ml and 2.5 ml, between 2.5 ml and 10 ml, or between 10 ml and 20 ml. In some embodiments, each solution 306 in foaming chambers 102-1, 102-2, . . . , 102-n has volume ranging between 1 ml and 2.5 ml, between 2.5 ml and 10 ml, or between 10 ml and 20 ml. In some embodiments, a subset of solutions 306 in foaming chambers 102-1, 102-2, . . . , 102-n has volume ranging between 1 ml and 2.5 ml, between 2.5 ml and 10 ml, or between 10 ml and 20 ml (e.g., a subset including 1, 2, 3, . . . , n−1 foaming chambers).

Block 504. With reference to block 404 of FIG. 5, the first plurality of solutions (e.g., solution 306) is introduced into foaming chambers 102-1, 102-2, . . . , 102-n of foaming unit 112 described with respect to FIG. 1. In the first plurality of solutions, at least two solutions are different from each other. In some embodiments, the at least two solutions are different in terms of a test entity included. For example, solution A contains protein P1 and solution B contains protein P2. As another example, solution A contains protein P1 and solution C contains a mixture of protein P1 and P2. In some embodiments, the at least two solutions are different in terms of concentration (e.g., two solutions containing protein P1 with two different concentrations). In some embodiments, the at least two solutions are different in terms of their volume (e.g., two solutions containing protein P1 with two different volumes). In some embodiments, the at least two solutions are different in terms of other parameters (e.g., pH, volume, temperature, types of additives, etc.)

Block 506. With reference to block 506 of FIG. 5, a gas is introduced into a corresponding solution 306 contained in a foaming chamber (e.g., foaming chamber 102-1) of each respective foaming unit 112 in a first plurality of foaming units. The gas is introduced such that the corresponding solution 306 undergoes a foaming process, thereby generating a foam in the foaming chamber 102-1 of each respective foaming unit 112 in the first plurality of foaming units. The gas is introduced by gas induction mechanism 113, which is configured to introduce a gas into foaming chambers 102-1, 102-2, . . . , 102-*n*. In some embodiments, the introducing the gas into a corresponding solution contained in a foaming chamber is done for a period of time (e.g., up to 1 min, 5 min, 10 min, 15 min, etc.).

Mechanisms for introducing the gas are described with respect to FIGS. 3A and 3B, illustrating vacuum foaming chamber 300 and sparging foaming chamber 320, respectively. Vacuum foaming chamber 300 and sparging foaming chamber 320 are configured to introduce a gas into solution 306 so that the gas introduced is approximately 1 times, 1.5 times, 2 times, 2.5 times, or 3 times that of the volume of solution in the foaming chamber of the respective foaming unit. In some embodiments, the gas introduced to each solution 306 in foaming chambers 102-1, 102-2, . . . , 102-*n* is approximately 1 times, 1.5 times, 2 times, 2.5 times, or 3 times that of the volume of the respective solution. In some embodiments, the gas introduced to a subset of solutions 306 in foaming chambers 102-1, 102-2, . . . , 102-*n* is approximately 1 times, 1.5 times, 2 times, 2.5 times, or 3 times that of the volume of the respective solution. As used herein, a subset of foaming chambers includes 1, 2, 3, . . . , or n−1 foaming chambers. The gas is introduced into solution 306 at a flow rate lower than 200 ml/sec, lower than 150 ml/sec, lower than 100 ml/sec, or lower than 50 ml/sec. In some embodiments, the gas is introduced to each solution 306 in foaming chambers 102-1, 102-2, . . . , 102—at a flow rate lower than 200 ml/sec, lower than 150 ml/sec, lower than 100 ml/sec, or lower than 50 ml/sec. In some embodiments, the gas is introduced to a subset of solutions 306 in foaming chambers 102-1, 102-2, . . . , 102-*n* at a flow rate lower than 200 ml/sec, lower than 150 ml/sec, lower than 100 ml/sec, or lower than 50 ml/sec. In some embodiments, vacuum foaming chamber 300 and sparging foaming chamber 320 additionally include a meter to control a flow rate of the gas or a total amount of the gas introduced into the respective solution. In some embodiments, each foaming chamber 102-1, 102-2, . . . , 102-*n* includes such a meter. In some embodiments, a subset of foaming chambers 102-1, 102-2, . . . , 102-*n* includes such meters.

In some embodiments, the gas introduced into solution 306 is air, nitrogen, carbon dioxide, noble gas or any other inert gas suitable for analyzing foaming properties of solution 306, or any mixture of gases thereof. In some embodiments, the same gas is introduced to all foaming chambers 102-1, 102-2, . . . , 102-*n*. In some embodiments, different gases are introduced to subsets of foaming chambers 102-1, 102-2, . . . , 102-*n*. For example, nitrogen is introduced to a first subset of foaming chambers, and air is introduced to a second subset of foaming chambers, where the foaming chambers of the second subset are different from the foaming chambers of the first subset.

In some embodiments, the method of introducing the gas, including a type of the gas, a flow rate, amount of gas, etc., is the same for all solutions at respective foaming units 112-1, . . . , 112-*k*, as described above with respect to FIG. 2. In some embodiments, the gas introduced is the same for a first subset of foaming units (e.g., 1, 2, 3, . . . , or k−1 foaming units), and the gas introduced is different for a second subset of foaming units (e.g., 1, 2, 3, . . . , or k−1 foaming units). For example, the gas introduced to solutions of foaming units 112-1, . . . , 112-3 has one set of parameters (the gas type, gas flow rate, amount of gas, etc.) and, the gas introduced to solutions of foaming units 112-4, . . . , 112-*k* has second set of parameters (the gas type, gas flow rate, amount of gas, etc.).

Block 508. With reference to block 508 of FIG. 5, a plurality of frames is produced by recording the foaming process in the foaming chamber of each respective foaming unit 112 in the first plurality of foaming units. The recording is performed by detection system 105, which includes camera 106 and telecentric lens 110. The recording includes producing a first plurality of frames, where each respective frame in the first plurality of frames is representative of the foaming process in each foaming chamber of foaming chambers 102-1, 102-2, . . . , 102-*n* of foaming unit 112 at a corresponding discrete time point in a plurality of discrete time points. The first plurality of frames includes two or more frames (e.g., 2, 5, 10, 25, 50, 100, etc.). The time interval between two adjacent time points is predetermined (e.g., the time interval between two adjacent time points is 5 seconds, 6 seconds, 7 seconds, 8 seconds, 9 seconds, 10 seconds, 12 seconds, 15 seconds, or 20 seconds). For example, a first plurality of frames includes a set of frames representative of the foaming process recorded every 10 seconds, for a period of time (e.g., 1, 2, 5, 10, 20 min, etc.). In some embodiments, the first plurality of frames is a first video. In some embodiments, the first video has a duration that is up to 5 minutes, 10 minutes, 15 minutes, or 20 minutes, or longer.

During the recording, illumination source 104 illuminates foaming chambers 102-1, 102-2, . . . , 102-*n* of foaming unit 112. In some embodiments, illumination source 106 emits emit a green light with a wavelength of approximately 530 nm.

Figure 10A:
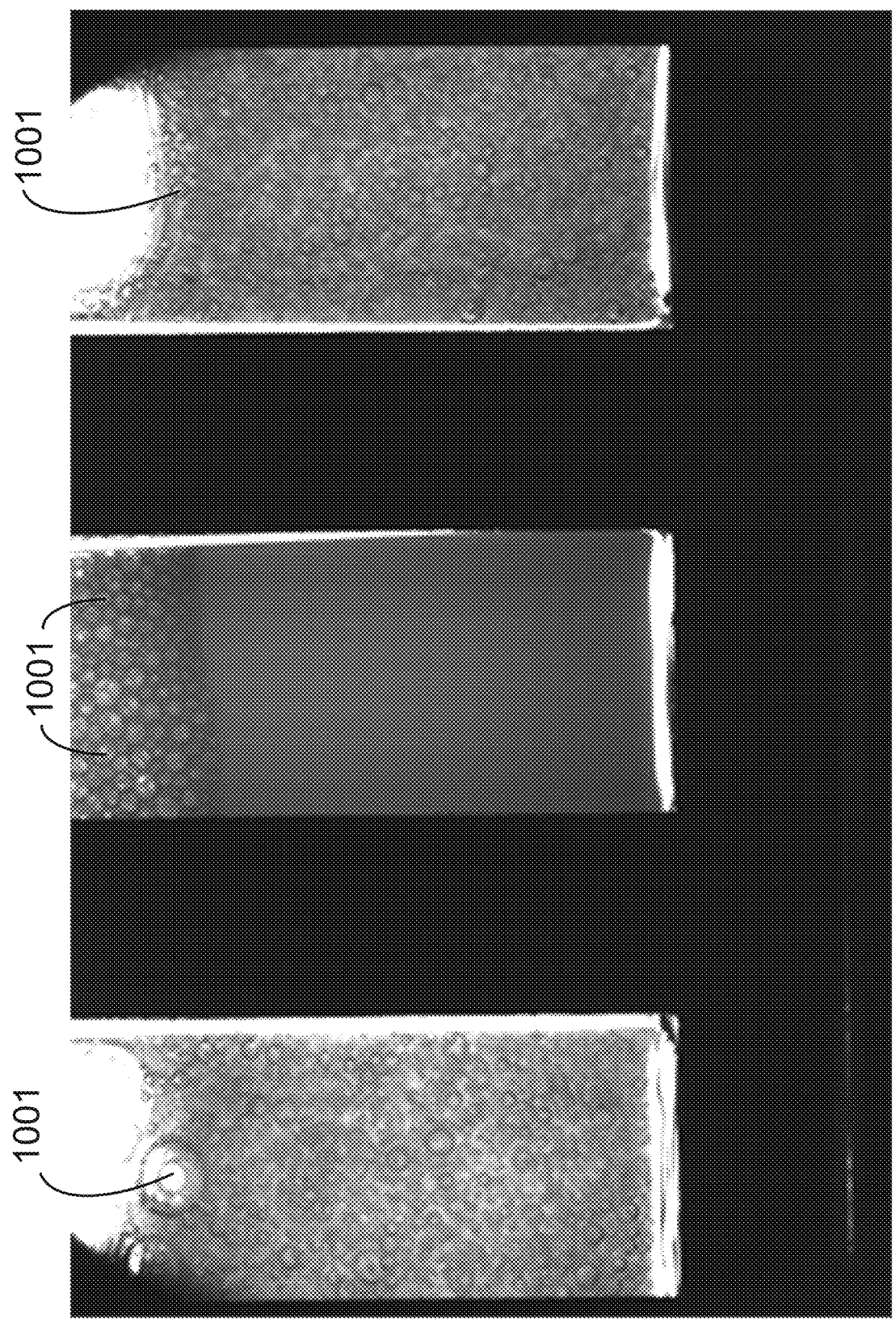

A representative example of a first respective frame is illustrated in FIG. 10A. FIG. 10A illustrates a frame of three foaming chambers (e.g., foaming chambers 102-1, 102-2, 102-3) recorded by detection system 105. Each foaming chamber contains a respective solution and has gone through an individual foaming, as described above. The respective foams of each solution contain a plurality of bubbles (e.g., bubbles 1001).

Segmenting Frames

Figure 6:
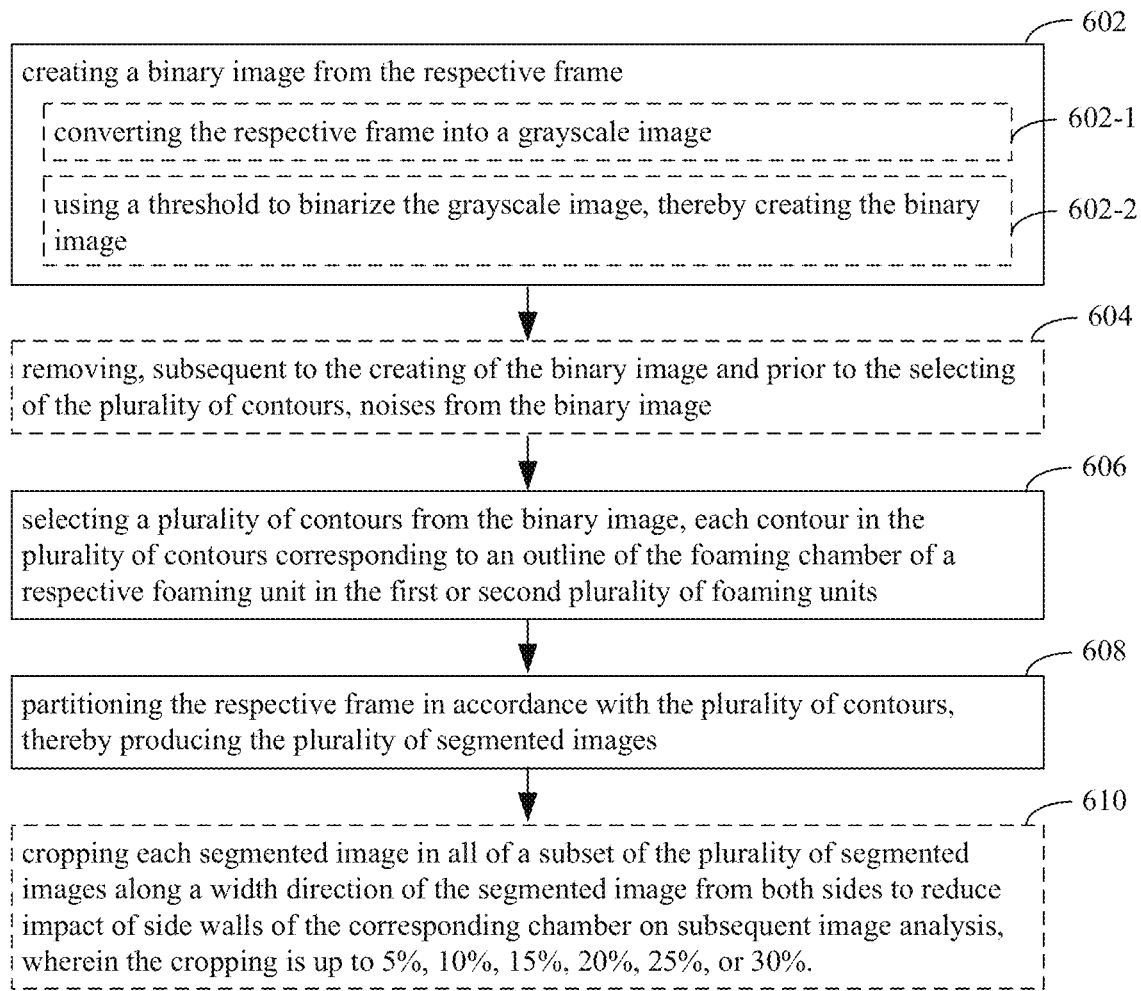
FIG. 6 provides a flowchart for a method to produce a plurality of segmented images in accordance with some embodiments.

FIG. 6 provides a flowchart for a method to produce a plurality of segmented images in accordance with some embodiments.

Figure 10B:
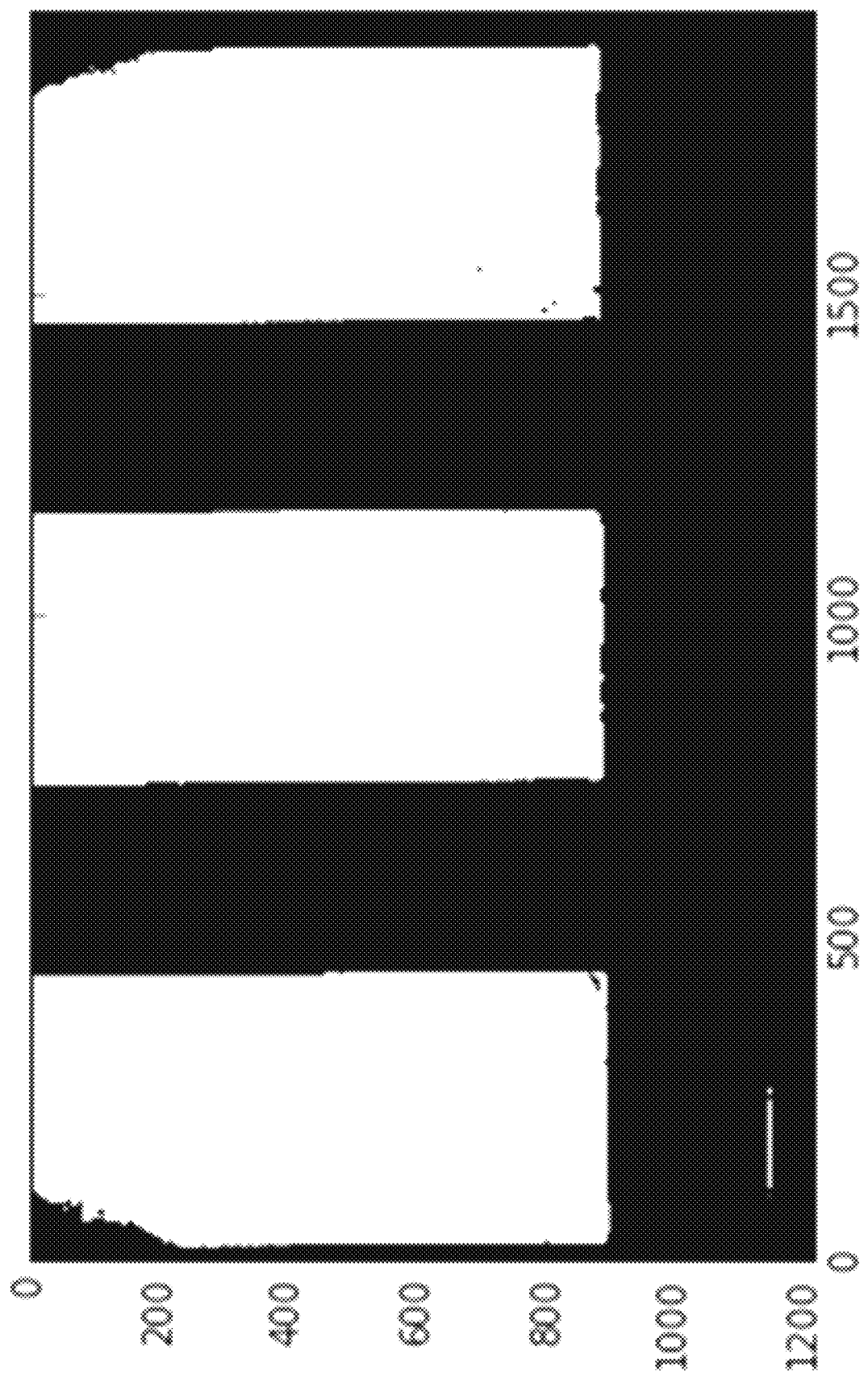
Figure 10C:
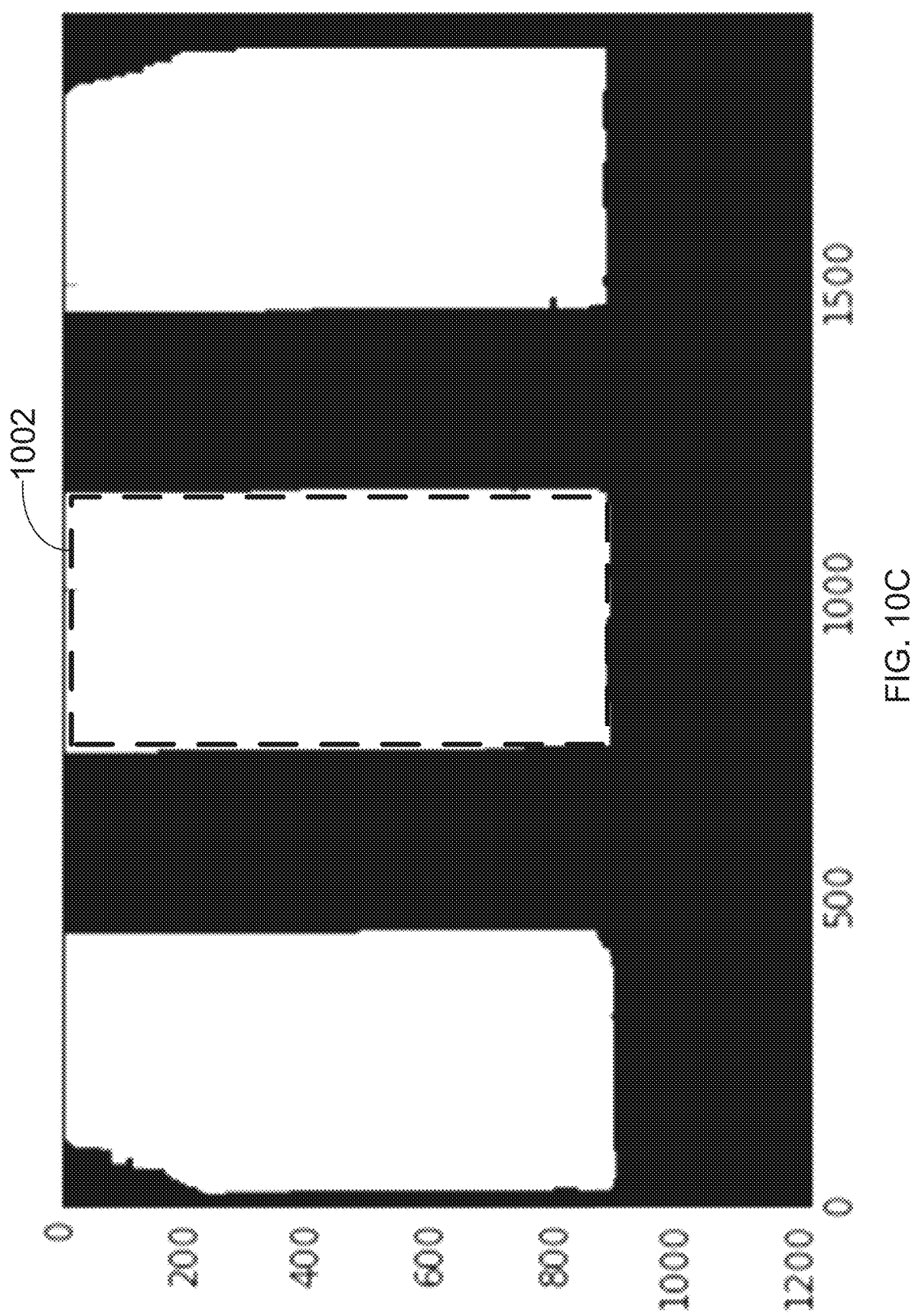

Block 602. With reference to block 602 of FIG. 6, the segmenting of the first respective frame into the first segmented images includes creating a binary image from the first respective frame. In some embodiments, the creating of binary image (i.e. a black and white image) includes converting the respective first frame into a grayscale image (block 602-1). In some embodiments, the creating of binary image further includes using a threshold to binarize the grayscale image (block 602-2). In some embodiments, the image is taken as a black and white image and so it is not necessary to form a grayscale image from the original image. FIG. 10B illustrates a binary image of the first respective frame of FIG. 10A binarized using a threshold close to 0 (black). In some embodiments, subsequent to the creating of the binary image and prior to the selecting of the plurality of contours, noises are removed from the binary image (block 604). In some embodiments, the noise removal is performed by Gaussian blurring, median blurring, bilateral filtering, box filtering, averaging or any combination thereof. FIG. 10C illustrates the binary image of FIG. 10B after noise removal.

Block 606. With reference to block 606 of FIG. 6, a plurality of contours is selected from the binary image, each contour in the plurality of contours corresponding to an outline of the foaming chamber of the foaming unit corresponding to the first frame. In FIG. 10C, contours corresponding to the outlines of the three foaming chambers are illustrated.

Block 608. With reference to block 608 of FIG. 6, each respective frame is partitioned in accordance with the plurality of contours, thereby producing the plurality of segmented images. FIG. 10D illustrates a segmented image, which is partitioned from the first respective frame of FIG. 10C. The segmented image of FIG. 10D corresponds to foaming chamber 1002 of FIG. 10A, and is partitioned in accordance with the contours corresponding to the outlines of the foaming chamber 1002.

Block 610. With reference to block 610 of FIG. 6, each respective segmented image in all or a subset of the plurality of segmented images is cropped along a width direction (a first direction) of the respective segmented image from a first side and a second side of the respective segmented image. The cropping reduces an impact of a first side wall and a second side wall of the corresponding chamber on subsequent image analysis. In some embodiments, the cropping is up to 5%, 10%, 15%, 20%, 25%, or 30% (e.g., 25%). For example, FIG. 10D is cropped so as to exclude the side walls of the corresponding chamber.

Extracting Foaming Characteristics

FIGS. 7A-7G provide flowcharts for methods of extracting one or more dimensions of a foam and extracting one or more properties of bubbles in a foam in accordance with some embodiments.

Figure 7A:
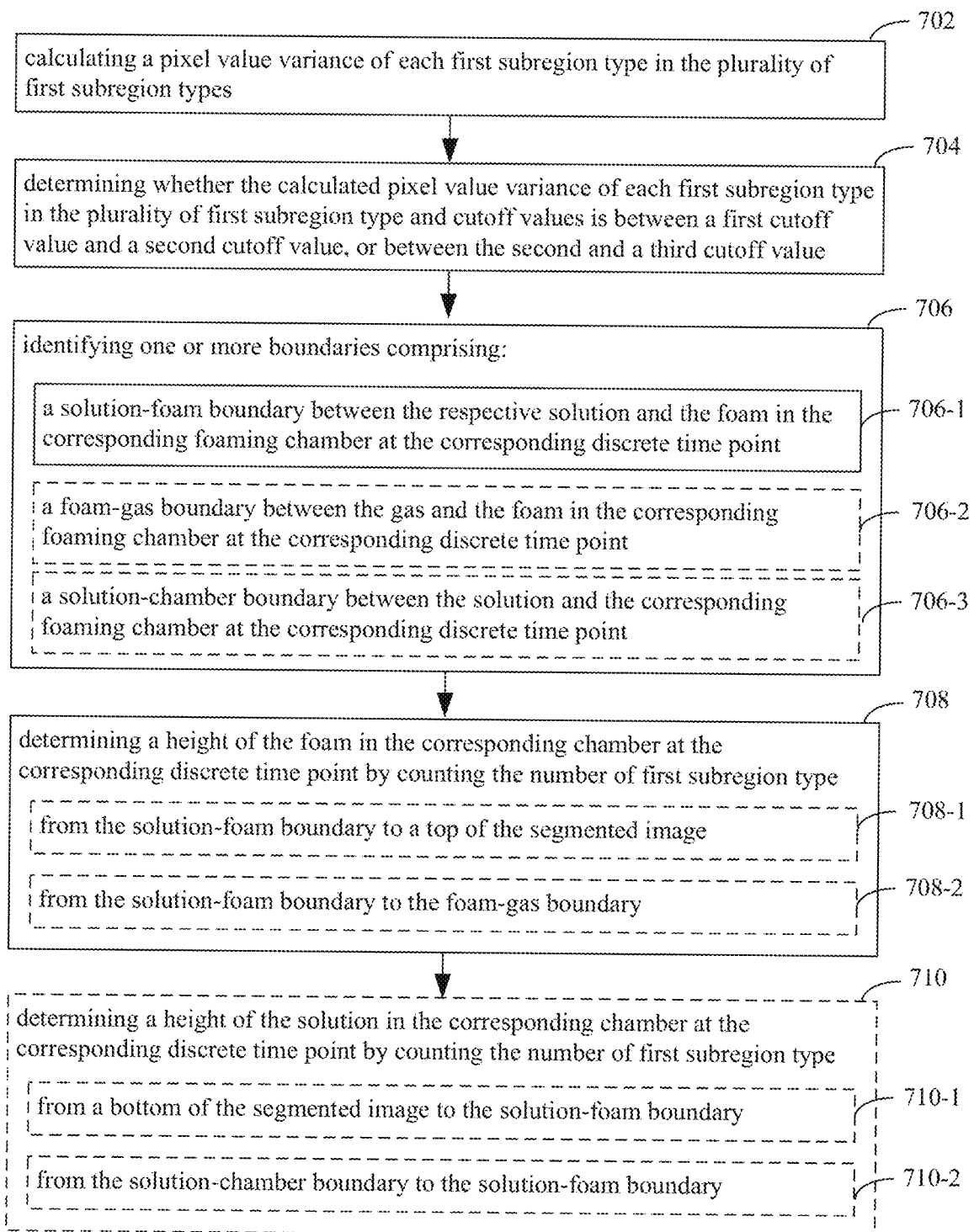
FIG. 7A-FIG. 7G provide flowcharts for methods of extracting one or more dimensions of a foam and extracting one or more properties of bubbles in a foam in accordance with some embodiments.

FIG. 7A illustrates a flowchart for a method to extract a dimension (e.g., height, or other form of linear measurement) of the foam for the one or each segmented image in the plurality of segmented images. Each respective segmented image in all or a subset of the plurality of segmented images includes a plurality of first subregion types, each first subregion type in the plurality of first subregion types includes a plurality of contiguous pixels. In some embodiments, the first subregion type is a row, or a portion of a row (e.g., a portion of a row including at least 10 pixels, at least 15 pixels, at least 20 pixels, or at least 25 pixels). In some embodiments, the first subregion region is a combination of two or more contiguous rows or a combination of two or more portions of contiguous rows. In some embodiments, first subregion type is a column, or a portion of a column (e.g., a portion of a column including at least 10 pixels, at least 15 pixels, at least 20 pixels, or at least 25 pixels). In some embodiments, the first subregion type is a combination of two or more contiguous columns or a combination of two or more portions of contiguous columns. In some embodiments, the first subregion type (e.g., a row or a column) is aligned parallel to a solution—foam boundary between a respective solution and foam in the foaming chamber. Each pixel in the plurality of pixels has a pixel value representative of a brightness of the pixel. In some embodiments, the pixel value of each pixel is stored as an 8-bit integer having a value ranging from 0 to 255, where in 0 represents black in the segmented image, and 255 represents white in the segmented image, in grayscale frames. A pixel value variance of each first subregion type in the plurality of first subregion types is calculated (block 702). A determination is made whether the calculated pixel value variance of each first subregion type in the plurality of first subregion types and cutoff values is between a first cutoff value and a second cutoff value, or between the second and a third cutoff value (block 704). In some embodiments, the first cutoff value is up to 2 or up to 5, the second cutoff value is up to 30, or up to 50, and the third cutoff value is up to 800, or up to 1000. In some embodiments, the first cutoff value is up to 0, the second cutoff value is up to 20 and the third cutoff value is up to 600.

One or more boundaries are identified (block 706). A method for identifying the one or more boundaries includes identifying a solution-foam boundary between the respective solution and the foam in the corresponding foaming chamber at the corresponding discrete time point (block 706-1). First subregion types with pixel value variances between the first cutoff value and the second cutoff value represent the solution, and first subregion types with the pixel value variances between the second cutoff value and the third cutoff value represent the foam. A foam-gas boundary between the gas and the foam in the corresponding foaming chamber at the corresponding discrete time point (block 706-2), and a solution-chamber boundary between the solution and the corresponding foaming chamber at the corresponding discrete time point is identified (block 706-3).

A height of the foam in the corresponding chamber at the corresponding discrete time point is determined by counting the number of first subregion types from the solution-foam boundary to a top of the segmented image (block 708). The height is determined from the solution-foam boundary to a top of the segmented image (block 708-1) and/or from the solution-foam boundary to the foam-gas boundary (708-2). Here an assumption is made that the top of the segmented image corresponds to the top of the foam.

Optionally, or additionally, a height of the solution in the corresponding chamber at the corresponding discrete time point is determined (block 710) by counting the number of first subregion types from a bottom of the segmented image to the solution-foam boundary (block 710-1) and/or from the solution-chamber boundary to the solution-foam boundary (block 710-2). Herein, an assumption is made that the bottom of the segmented image corresponds to the bottom of the solution. The one or more boundaries further include a foam-gas boundary between the gas and the foam in the corresponding foaming chamber at the corresponding discrete time point, and a solution-chamber boundary between the solution and the corresponding foaming chamber at the corresponding discrete time point. First subregion types with the pixel value variances less than the first cutoff value represent the gas. A first subregion type at the foam-gas boundary has the pixel value exceeding the third cutoff value. A first subregion type at the solution-chamber boundary has the pixel value exceeding the third cutoff value. The height of the foam in the corresponding chamber at the corresponding discrete time point is determined by counting the number of first subregion types from the solution-foam boundary to the foam-gas boundary. The height of the solution in the corresponding chamber at the corresponding discrete time point is determined by counting the number of first subregion types from the solution-chamber boundary to the solution-foam boundary.

Figure 7B:
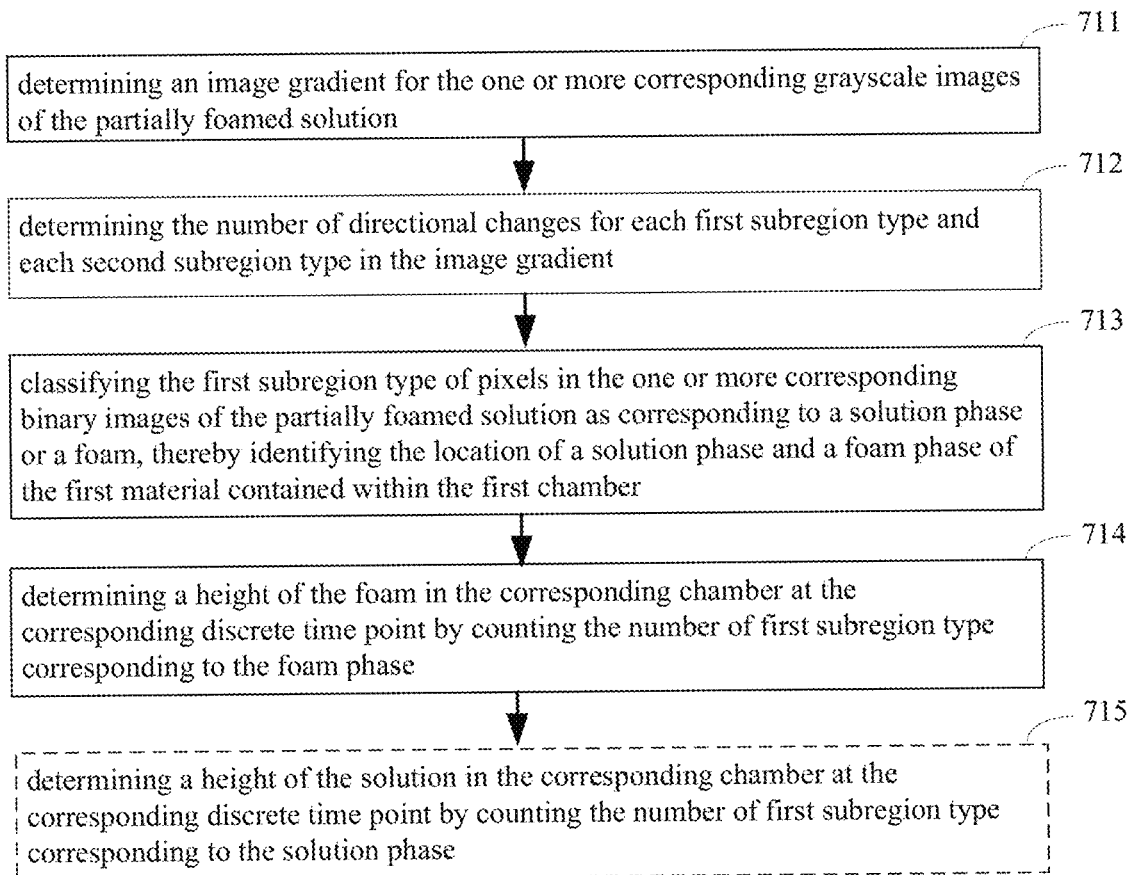
Figure 7C:
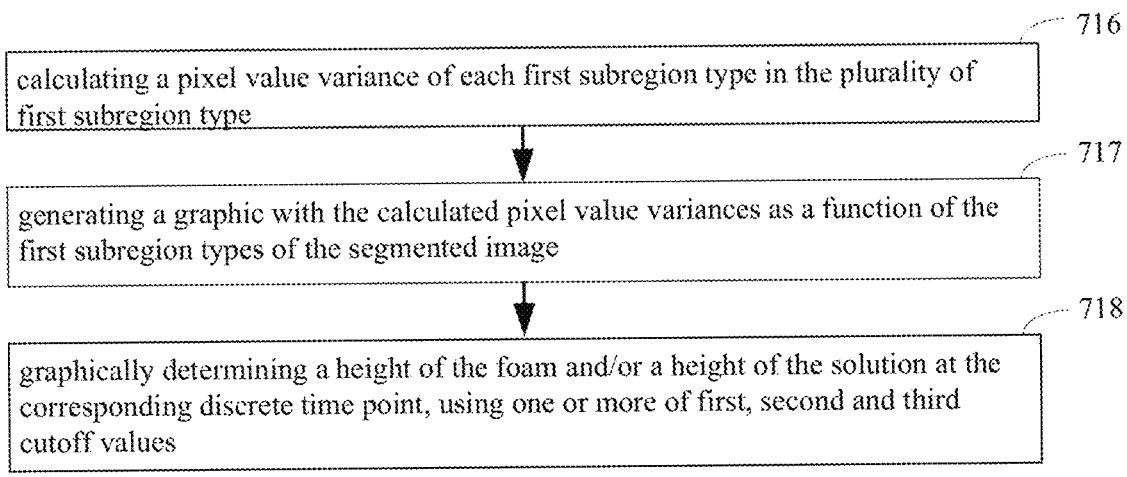

FIGS. 7B-7C illustrates flowcharts for alternative methods to extract a dimension (e.g., height) of the foam and/or solution for the one or each segmented image in the plurality of segmented images. Each respective segmented image in all or a subset of the plurality of segmented images includes a plurality of first subregion types, each first subregion type in the plurality of first subregion types includes a plurality of contiguous pixels, and each pixel in the plurality of pixels has a pixel value representative of a brightness of the pixel. Flowchart of FIG. 7B illustrates a method including determining an image gradient (i.e., 1st derivative) for the one or more corresponding grayscale images of the partially foamed solution (block 711), and determining the number of directional changes for each first subregion type and each second subregion type in the image gradient (block 712). The first subregion type is described above with respect to FIG. 7A. The second subregion type corresponds to the first subregion type except that the second subregion type is perpendicular to the first subregion type (e.g., columns and rows). In some embodiments, the first subregion is a row and the second subregion is a column. The first subregion types in the one or more corresponding binary images of the partially foamed solution are then classified as corresponding to a solution phase or a foam, thereby identifying the location of a solution phase and a foam phase of the first material contained within the first chamber (block 713). For example, the first subregion types identified with a higher number of directional changes are classified to correspond a foam phase, whereas first subregion types identified with a lower number of directional changes are classified to correspond a solution phase. A height of the foam in the corresponding chamber at the corresponding discrete time point is determined by counting the number of first subregion types corresponding to the foam phase (block 714). Optionally and additionally, a height of the solution in the corresponding chamber at the corresponding discrete time point is determined by counting the number of first subregion types corresponding to the solution phase (715). Flowchart of FIG. 7C illustrates a method including calculating a pixel value variance of each first subregion type in the plurality of first subregion types (block 716). A graphic with the calculated pixel value variances as a function of the first subregion types of the segmented image is generated (block 717). A height of the foam and/or a height of the solution at the corresponding discrete time point is graphically determined using one or more of first, second and third cutoff values (block 718). FIG. 10E illustrates a graphic of the calculated pixel value variances as a function of the first subregion types of the segmented image illustrated in FIG. 10D. The height of the foam and the height of the solution can be graphically determined from FIG. 10D. For example, the height of the foam in FIG. 10E is from 0 to 200 first subregion types and the height of the solution is approximately 650 first subregion types (i.e. approximately from first subregion type 200 to first subregion type 850).

Figure 7D:
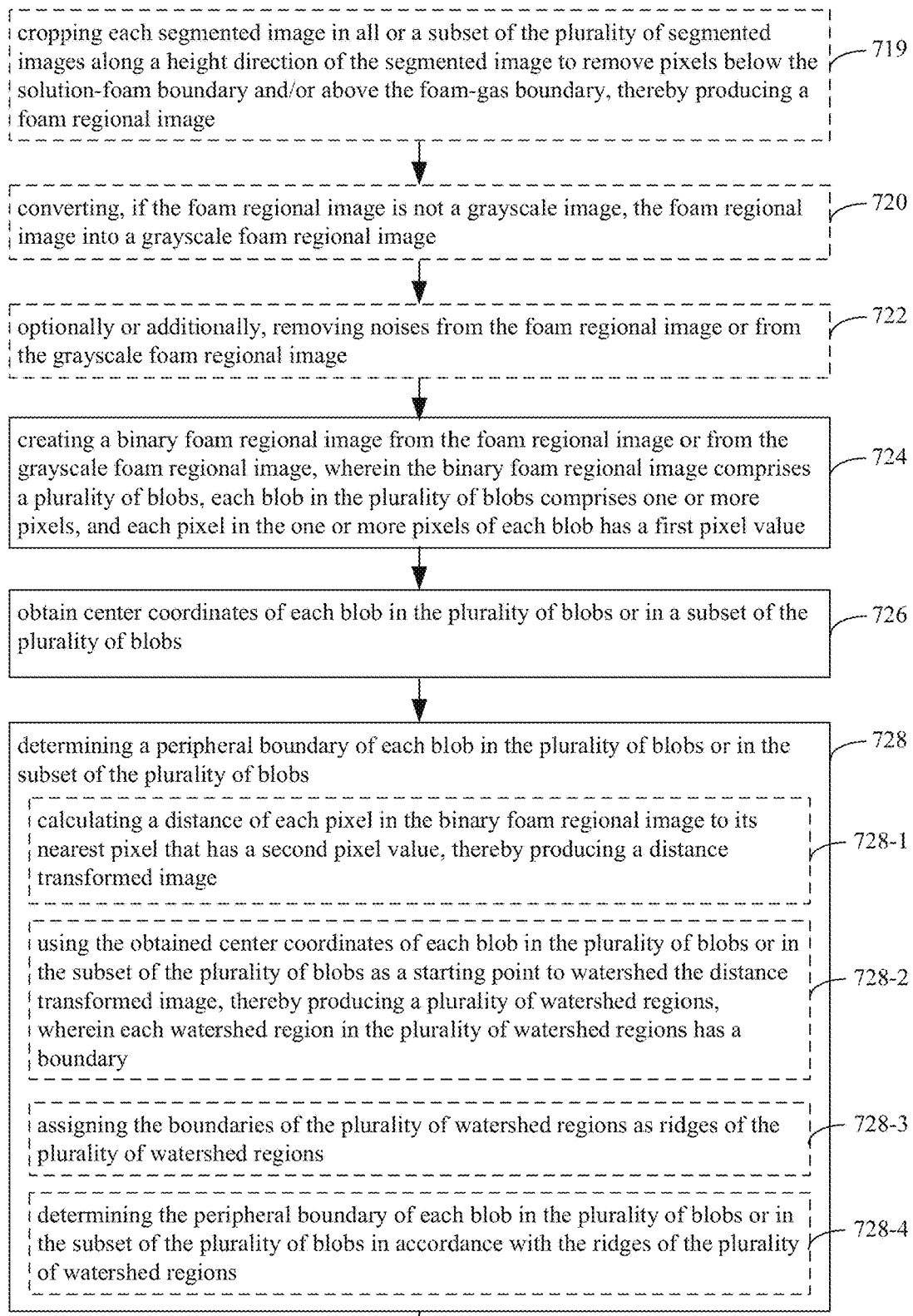
Figure 10F:
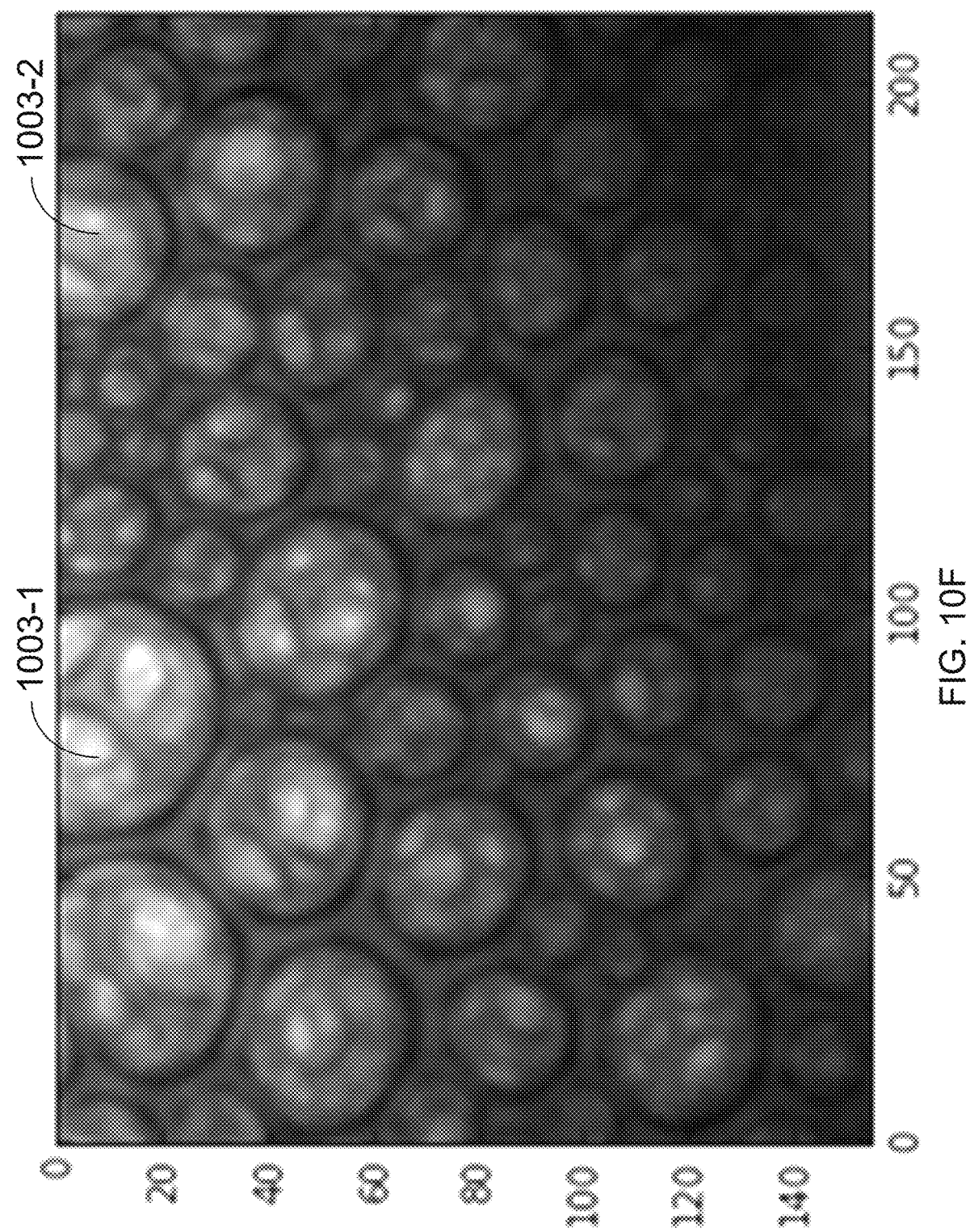
Figure 10G:
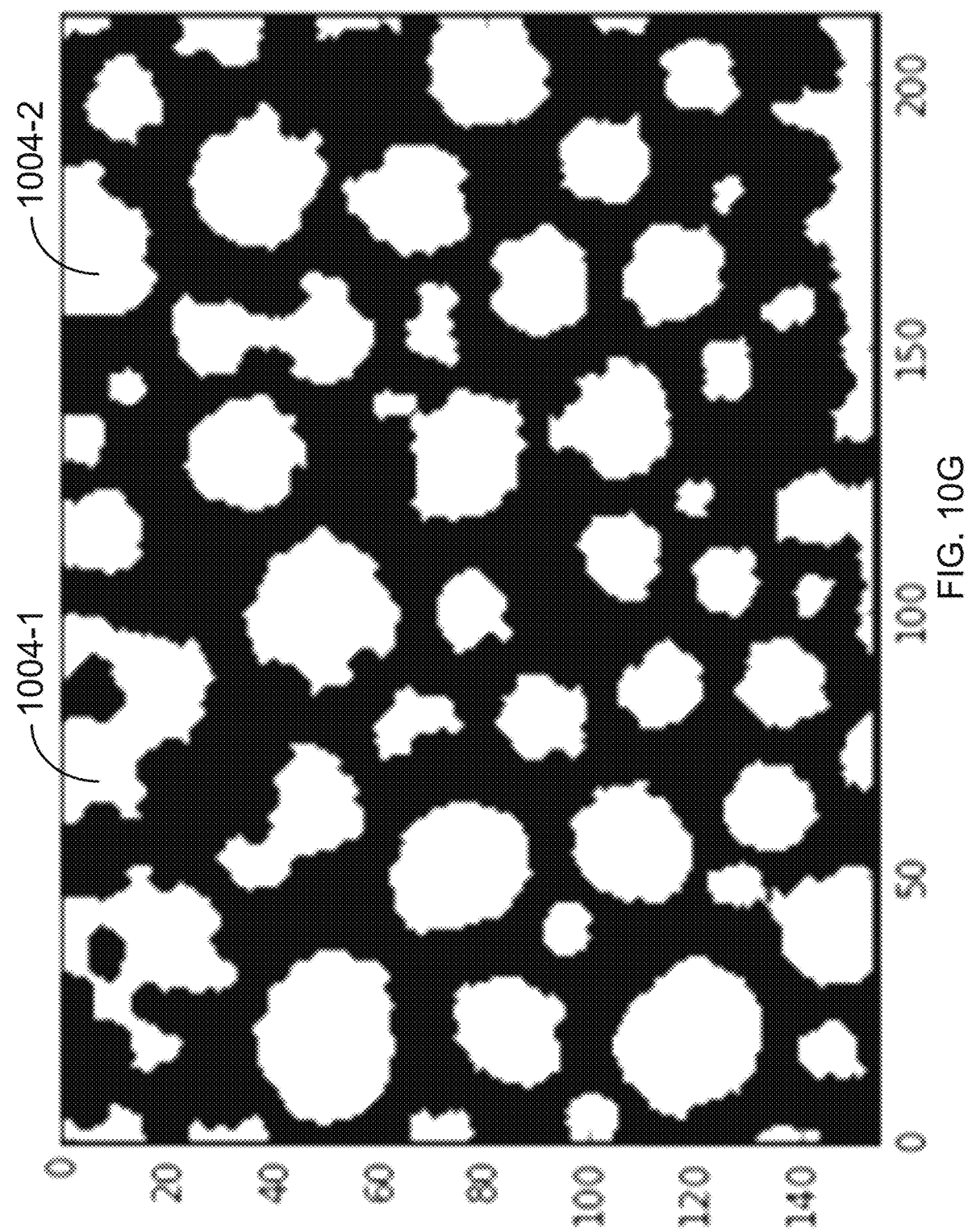

FIG. 7D illustrates a flowchart for a method of extracting one or more properties of bubbles in the foam. Pre-processing of segmented images includes cropping each segmented image in all or a subset of the plurality of segmented images along a height direction of the segmented image to remove pixels below the solution-foam boundary and/or above the foam-gas boundary, thereby producing a foam regional image (block 719). FIG. 10F illustrates a foam regional image produced by cropping the segmented image of FIG. 10D. The foam regional image of FIG. 10F includes a plurality of bubbles and/or clusters of two or more bubbles (e.g., items 1003-1 and 1003-2) The height direction herein corresponds to the height of the chamber. Then, if the regional image is not a grayscale image, the foam regional image is converted into a grayscale foam regional image (block 720). Optionally, or additionally, the pre-processing also includes removing noise from each foam regional image or from the grayscale foam regional image (block 722). In some embodiments, the noise removal includes Gaussian blurring, median blurring, bilateral filtering, box filtering, any other noise removal technique known in the art, or any combination thereof. In some embodiments, the noise removal is performed by Gaussian blurring. In some embodiments, the Gaussian blurring is performed using a 3×3 kernel, or a 5×5 kernel. The pre-processing of segmented images further includes creating a binary foam regional image from the foam regional image or from the grayscale foam regional image (block 724). The binary foam regional image includes a plurality of blobs, each blob in the plurality of blobs including one or more pixels, and each pixel in the one or more pixels of each blob has a first pixel value. In some embodiments, the binary foam regional image is created by Otsu's method, an adaptive mean thresholding method, an adaptive Gaussian thresholding method, or a thresholding method with a manually set threshold. FIG. 10G illustrates a binary foam regional image created from the foam regional image of FIG. 10F. The binary foam regional image includes a plurality of (white) blobs, each blob (e.g., blobs 1004-1 and 1004-2 of FIG. 10F) having a first pixel value (e.g., pixel value 1 for white). Each blob (e.g., blobs 1004-1 and 1004-2) is an area in the image defined by the method described in the flowchart of FIG. 7D. Each blob represents a feature in the image, where the feature can include a bubble, a cluster of two or more bubbles, or any other features.

The method illustrated in FIG. 7D further includes obtaining center coordinates of each blob in the plurality of blobs or in a subset of the plurality of blobs (block 726). Detailed methods for obtaining center coordinates for each blob will be provided in flowcharts of FIGS. 7F-7G.

With reference to block 728 of FIG. 7D, the segmenting of bubbles in the foam includes determining a peripheral boundary of each blob in the plurality of blobs or in the subset of the plurality of blobs. The method of segmenting the bubbles in the foam includes calculating a distance of each pixel in the binary foam regional image to its nearest pixel that has a second pixel value, thereby producing a distance transformed image (block 728-1). In the case of non-eroded image, the calculating a distance of each pixel is to its nearest black pixel. The obtained center coordinates of each blob in the plurality of blobs or in the subset of the plurality of blobs are used as a starting point to watershed the distance transformed image, thereby producing a plurality of watershed regions (block 728-2). Each watershed region in the plurality of watershed regions has a boundary, and the boundaries of the plurality of watershed regions are assigned as ridges of the plurality of watershed regions (block 728-3). The peripheral boundary of each blob in the plurality of blobs or in the subset of the plurality of blob is determined in accordance with the ridges of the plurality of watershed regions (block 728-4).

Figure 7E:
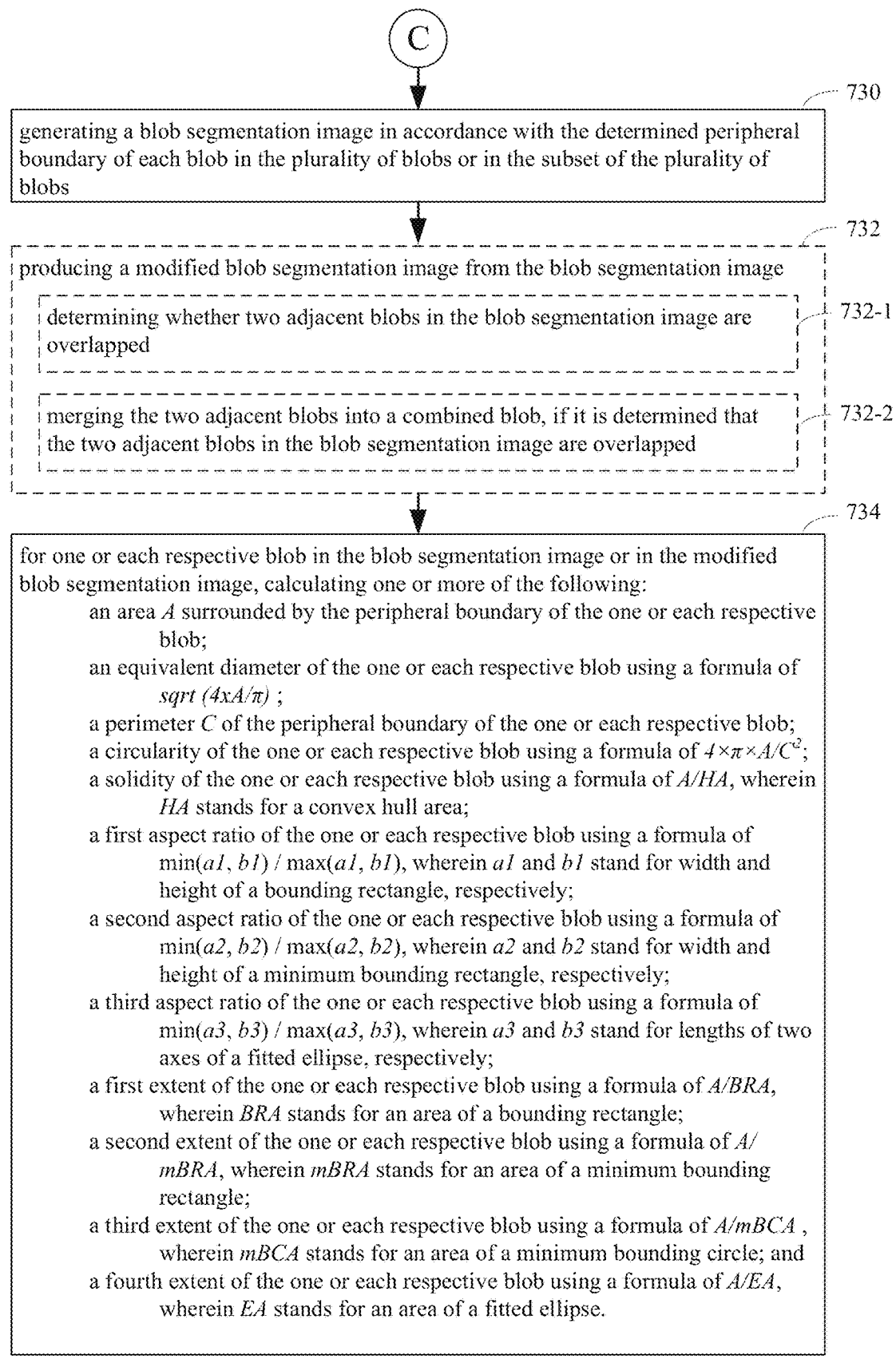

FIG. 7E illustrates a flowchart for a further method of extracting one or more properties of bubbles in the foam.

Block 730. With reference to block 730 of FIG. 7E, the segmenting of bubbles in the foam further includes, in accordance with the determined peripheral boundary of each blob in the plurality of blobs or in the subset of the plurality of blobs, generating a blob segmentation image. In some embodiments, the blob segmentation image includes a physical image. In some embodiments, the blob segmentation image includes a set of pixel data.

Block 732. With reference to block 732 of FIG. 7E, the segmenting of bubbles in the foam further includes merging overlapping bubbles by producing a modified blob segmentation image from the blob segmentation image (block 732). The method of merging overlapping bubbles includes determining whether two adjacent blobs in the blob segmentation image are overlapped (block 732-1). In some embodiments, the two adjacent blobs in the blob segmentation image are determined to be overlap if a criteria of d<min($r_1$, $r_2$) is met, where $r_1$ and $r_2$ stand for radii of minimum bound circles of the two adjacent blobs, and d stands for a distance between centers of the minimum bound circles of the two adjacent blobs. In accordance with determination that the two adjacent blobs in the blob segmentation image are overlap, the segmentation image is further post-processed. The post-processing includes merging the two adjacent blobs into one blob (block 732-2). In some embodiments, the merging the two adjacent blobs into one blob is conducted by dilating each of the two adjacent blobs. In some embodiments, optionally or additionally, the steps of block 732-1 and block 732-2 are repeated thereby producing a modified blob segmentation image.

With reference to block 734 of FIG. 7E, calculating one or more properties of bubbles in the foam for one or each respective blob in the blob segmentation image or in the modified blob segmentation image includes calculating one or more of the following:

(i) An area A surrounded by the peripheral boundary of the one or each respective blob;

(ii) An equivalent diameter of the one or each respective blob using a formula of sort (4×A/π);

(iii) A perimeter C of the peripheral boundary of the one or each respective blob;

(iv) A circularity of the one or each respective blob using a formula of $4 \times \pi \times A/C^2$;

(v) A solidity of the one or each respective blob using a formula of A/HA, where HA stands for a convex hull area (the term "hull convex," also referred to as convex envelope, of a set X of points in the Euclidean plane or in an Euclidean space or, more generally, in an affine space over the reals), is defined as the smallest convex set that contains X;

(vi) A first aspect ratio of the one or each respective blob using a formula of min($a_i$, $b_i$)/max($a_i$, $b_i$), wherein $a_1$ and $b_1$ stand for width and height of a bounding rectangle, respectively;

(vii) A second aspect ratio of the one or each respective blob using a formula of min($a_2$, $b_2$)/max($a_2$, $b_2$), wherein $a_2$ and $b_2$ stand for width and height of a minimum bounding rectangle, respectively;

(viii) A third aspect ratio of the one or each respective blob using a formula of min($a_3$, $b_3$)/max($a_3$, $b_3$), wherein $a_3$ and $b_3$ stand for lengths of two axes of a fitted ellipse, respectively;

(ix) A first extent of the one or each respective blob using a formula of A/BRA, where mBRA stands for an area of a bounding rectangle;

(x) A second extent of the one or each respective blob using a formula of A/mBRA, where mBRA stands for an area of a minimum bounding rectangle;

(xi) A third extent of the one or each respective blob using a formula of A/mBCA, where mBCA stands for an area of a minimum bounding circle; and (xii) A fourth extent of the one or each respective blob using a formula of A/EA, wherein EA stands for an area of a fitted ellipse.

Figure 7F:
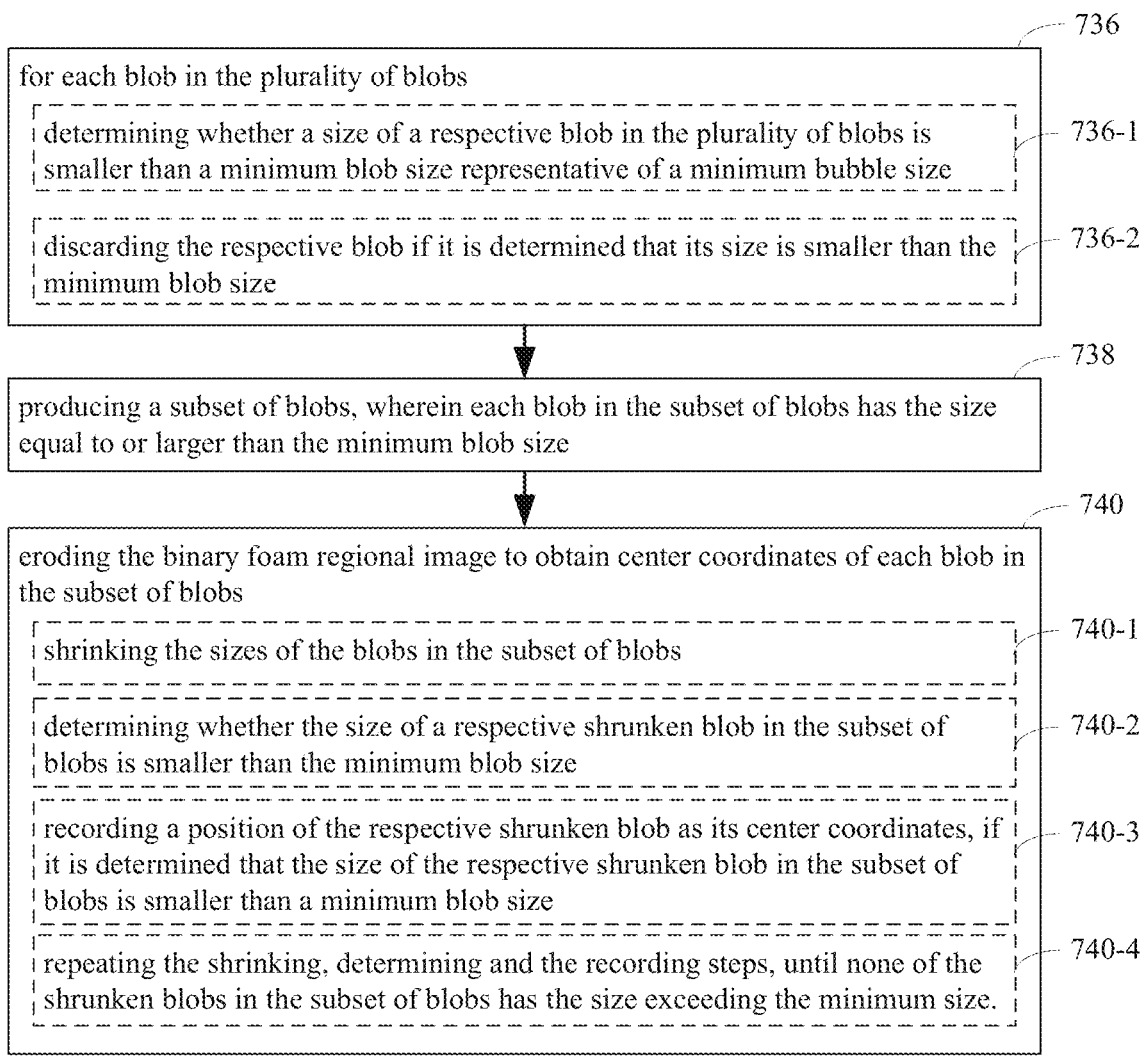
Figure 7G:
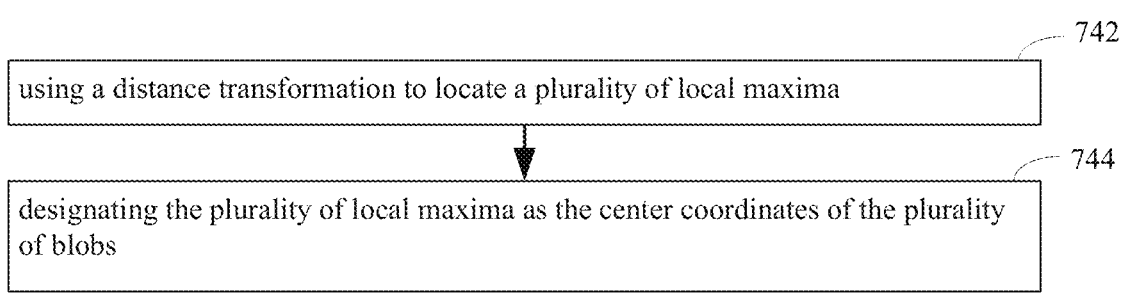

FIGS. 7F-7G illustrate two methods for obtaining center coordinates of blobs in detail. In the first method, as illustrated in FIG. 7F, for each blob in the plurality of blobs (block 736), a determination of the center coordinates of each blob in the plurality of blobs includes determining whether a size of a respective blob in the plurality of blobs is smaller than a minimum blob size representative of a minimum bubble size (block 736-1). The minimum blob size is up to 8 pixels in radius, up to 10 pixels in radius, up to 15 pixels in radius, up to 20 pixels in radius, up to 25 pixels in radius, up to 30 pixels in radius, up to 40 pixels in radius, up to 50 pixels in radius, or more. In some embodiments, the minimum blob size is up to 10 pixels in radius. In accordance with the determination that the respective blob is smaller than the minimum blob size, discarding the respective blob (block 736-2). The steps of determining whether a size of a respective blob in the plurality of blobs is smaller than a minimum blob size representative of a minimum bubble size, and discarding the respective blob in accordance with a determination that its size is smaller than the minimum blob size are repeated for each blob in the plurality of blobs. Thereby a subset of blobs, where each blob in the subset of blobs has the size equal or larger than the minimum blob size, is produced (block 738). Each blob in the subset of blobs has the size equal to or larger than the minimum blob size. Then, the binary foam regional image is eroded to obtain center coordinates of each blob in the subset of blobs (block 740). The eroding includes (1) shrinking the sizes of the blobs in the subset of blobs (block 740-1); (2) determining whether the size of a respective shrunken blob in the subset of blobs is smaller than the minimum blob size (block 740-2); (3) recording a position of the respective shrunken blob as its center coordinates, if it is determined that the size of the respective shrunken blob in the subset of blobs is smaller than a minimum blob size (block 740-3); and repeating the shrinking, determining and the recording steps, until none of the shrunken blobs in the subset of blobs has the size exceeding the minimum size (block 740-4). In some embodiments, the eroding of the binary foam regional image to obtain the center coordinates of each blob in the subset of blobs is performed using a 3×3 kernel or a 5×5 kernel.

FIG. 7G illustrates an alternative method for determining the center coordinates bubbles in the foam. The method of FIG. 7G involves using a distance transformation to locate a plurality of local maxima (block 724) and designating the plurality of local maxima as the center coordinates of the plurality of blobs (block 726).

After either of methods provided in FIG. 7F or 7G, a center of each respective blob in all or a subset of the plurality of blobs is represented by a circle having up to 3 pixels in radius, up to 5 pixels in radius, or up to 8 pixels in radius. To avoid over-splitting bubbles, a larger circle can be used to include neighbor centers. In some embodiments, the circle has a radius of 5 pixels.

Figure 10H:
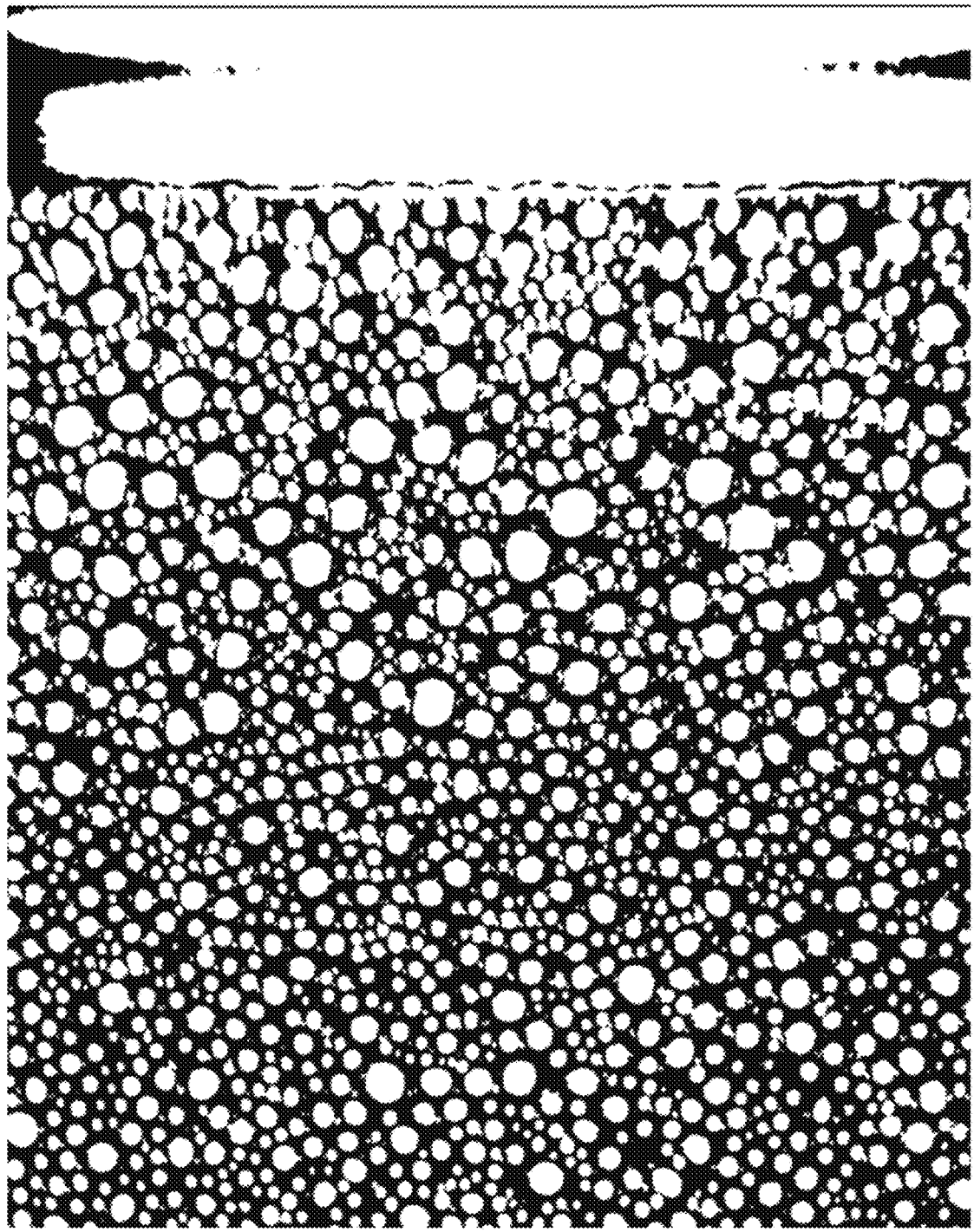
Figure 10I:
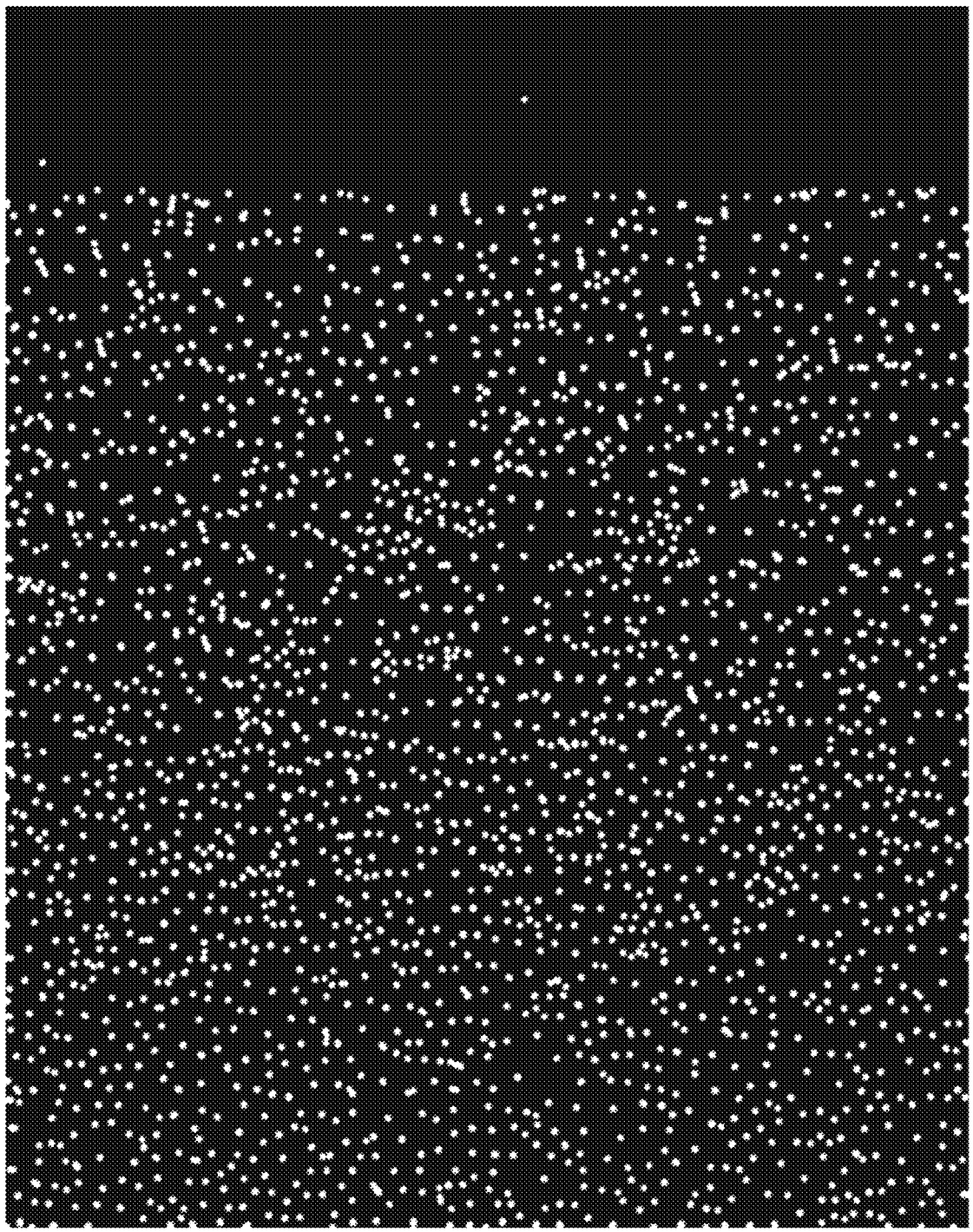
Figure 10J:
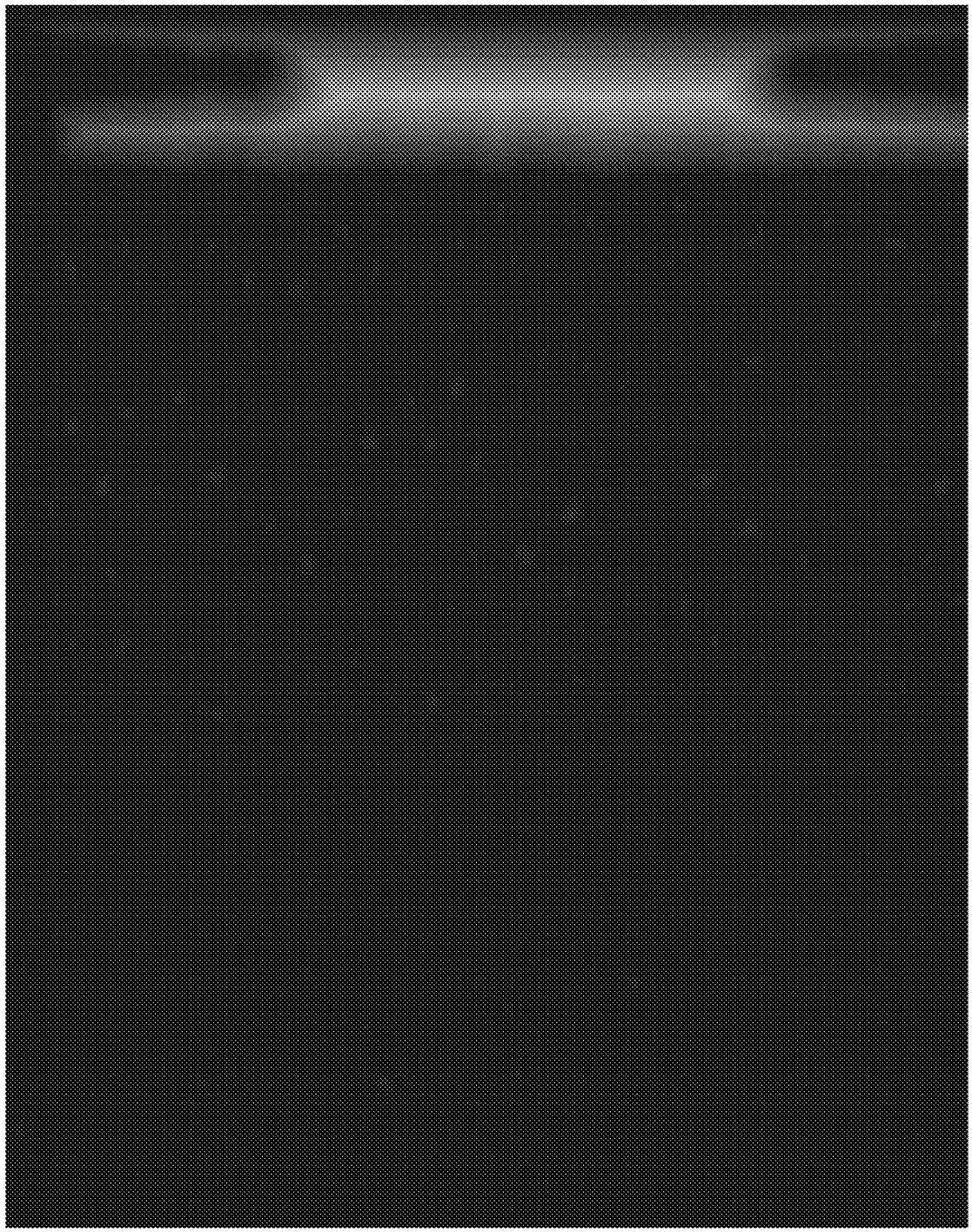
Figure 10K:
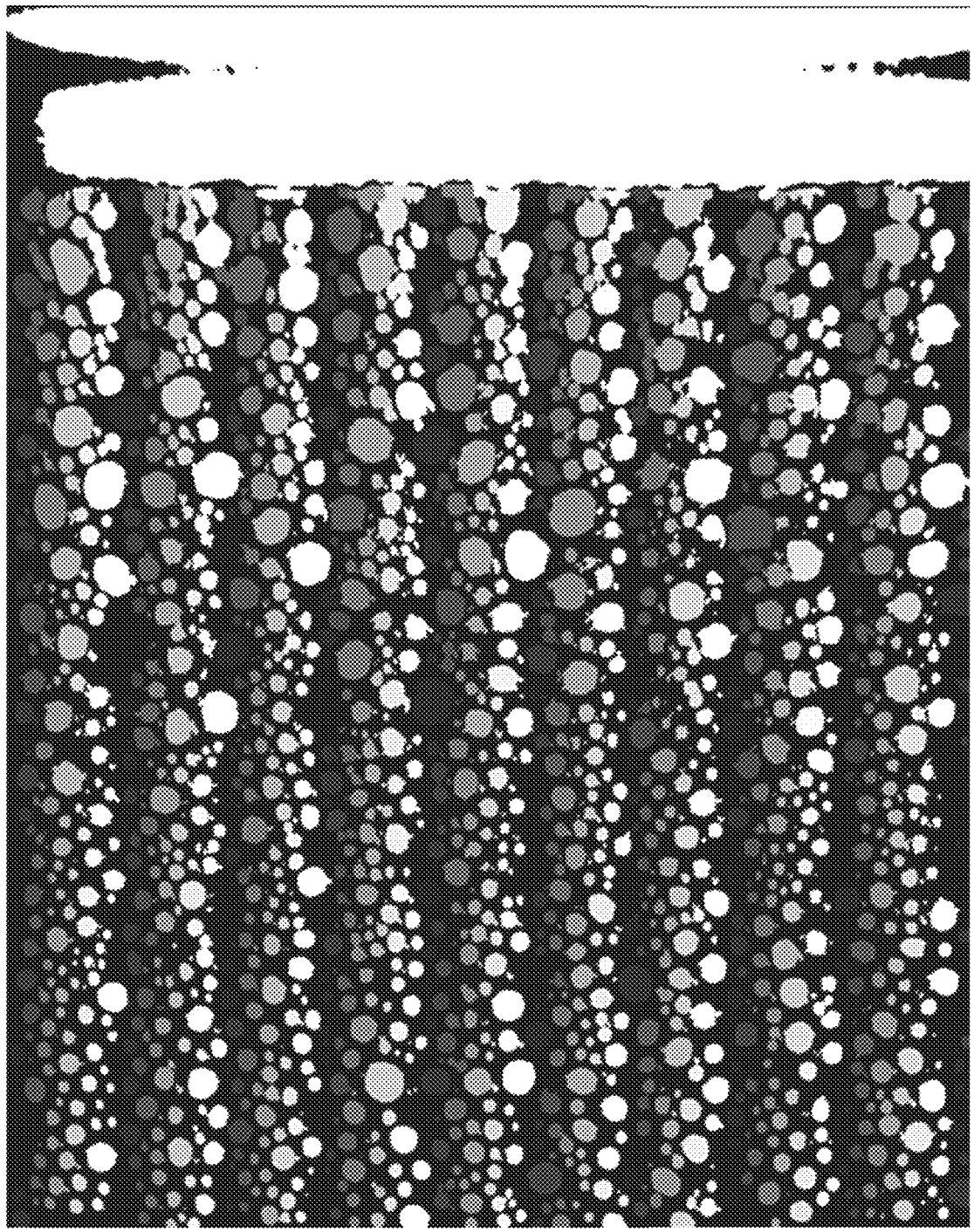

FIGS. 10H-10K illustrate the image processing performed on a binary foam regional image according to process described above. FIG. 10H illustrates a binary foam regional image. The binary foam regional image has been produced by converting a respective foam regional image to grayscale and applying a Gaussian blur method to remove noise. The image is then thresholded into a binary image (a black and white image) by using Otsu's method. FIG. 10I illustrates an image including bubble centers produced from the binary foam regional image of FIG. 10H. The bubble centers are found by iteratively eroding the binary foam regional image so that each white blob is shrinking until disappeared. Each blob position was recorded while the radius of each bubble is smaller than 10 pixels, and before the bubble disappears. The minimum bubble size was set to 10 pixels. Blobs smaller than 10 pixels prior to the eroding were discarded. The bubble centers were drawn as white dots of radius of 5 pixels so that blobs that were positioned close to each other got merged to avoid over-splitting. FIG. 10J illustrates a distance transformed image. The distance transformed image is produced by calculating a distance of each pixel with a first pixel value (i.e. each white pixel) in the binary foam regional image to its nearest pixel that has a second pixel value (i.e. a black pixel). FIG. 10K illustrates a bubble segmented image produced by using the obtained center coordinates of each blob in the plurality of blobs or in the subset of the plurality of blobs as a starting point to watershed the distance transformed image. The bubble segmented image contains a plurality of watershed regions, where each watershed region in the plurality of watershed regions has a boundary.

Training Set

Figure 8:
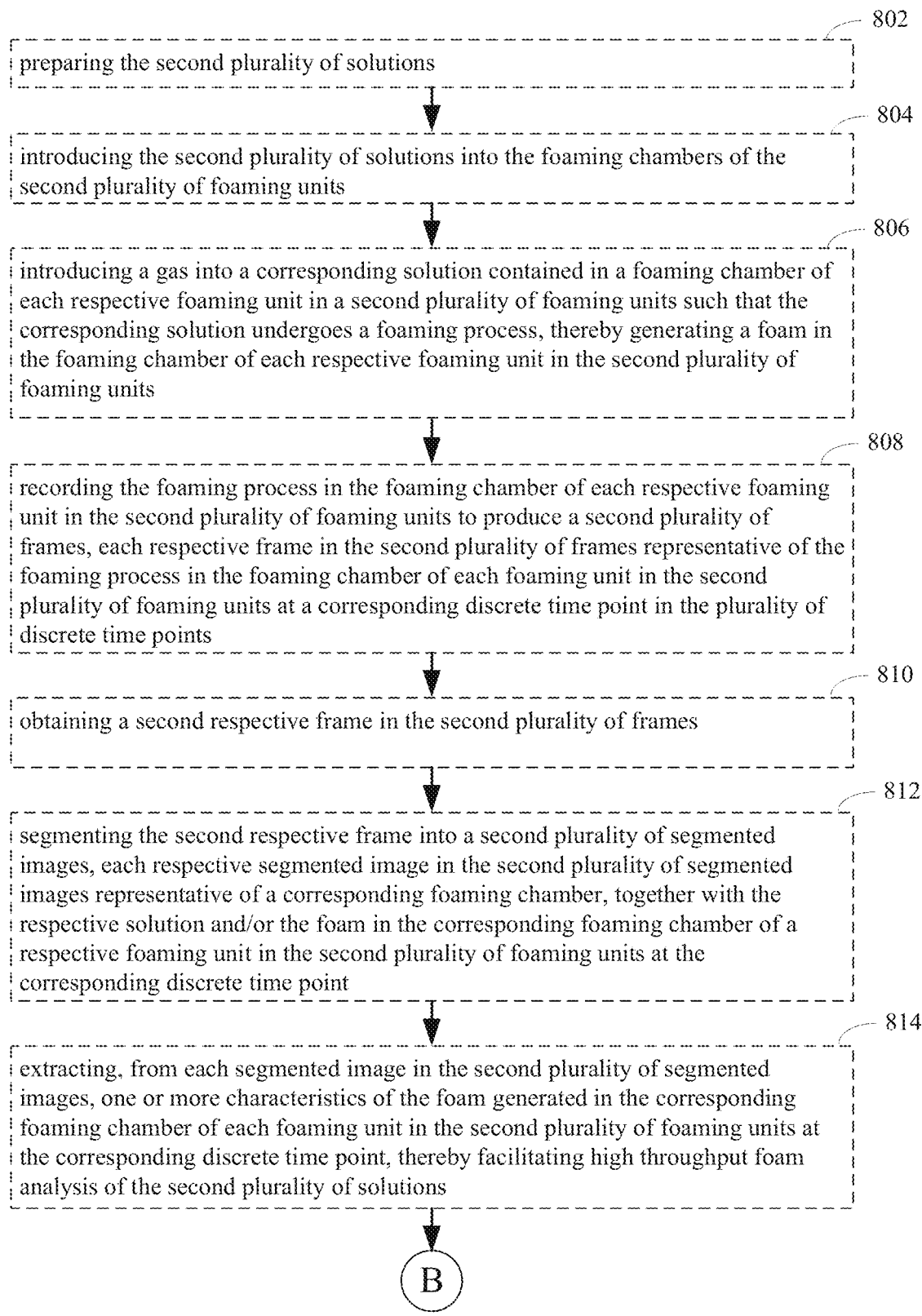
FIG. 8 provides a flowchart for high throughput foam analysis of test entities in accordance with some embodiments.

In order to construct a training set, the methods for high throughput foam analysis described above are performed for a second plurality of solutions. Such method is illustrated in a flowchart in FIG. 8. The steps described in reference to FIG. 8 correspond to steps described with respect to FIG. 5, except that they are performed for a second plurality of solutions. The method of FIG. 8 is performed by system 100 or system 200, as described above with respect to FIGS. 1 and 2, respectively. First a second plurality of solutions is prepared (block 802). The second plurality of solutions is introduced into the foaming chambers (e.g., foaming chambers 102-$k$-1, 102-$k$-2, . . . , 102-$k$-$q$) of the second plurality of foaming units (e.g., foaming unit 112-$k$) (block 704). A gas is introduced into a corresponding solution contained in a foaming chamber of each respective foaming unit in a second plurality of foaming units such that the corresponding solution undergoes a foaming process, thereby generating a foam in the foaming chamber of each respective foaming unit in the second plurality of foaming units (block 806). In some embodiments, the introducing of the gas into the corresponding solution contained in the foaming chamber of each respective foaming unit in the first plurality of foaming units and the introducing of the gas into the corresponding solution contained in the foaming chamber of each respective foaming unit in the second plurality of foaming units are conducted simultaneously. In some embodiments, the gas is introduced sequentially. For example, the gas can be introduced simultaneously or sequentially to all solutions contained in foaming chambers 102-1-1, 102-1-2, . . . , 102-1-$p$ and foaming chambers 102-$k$-1, 102-$k$-2, . . . , 102-$k$-$q$ in FIG. 2).

The foaming process in the foaming chamber of each respective foaming unit in the second plurality of foaming units is recorded to produce a second plurality of frames (block 808). Each respective frame in the second plurality of frames representative of the foaming process in the foaming chamber of each foaming unit in the second plurality of foaming units at a corresponding discrete time point in the plurality of discrete time points. In some embodiments, the recording of the foaming process in the foaming chamber of each respective foaming unit in the first plurality of foaming units and the recording of the foaming process in the foaming chamber of each respective foaming unit in the second plurality of foaming units are conducted simultaneously. In some embodiments, the recordings are conducted sequentially. For example, system 200 includes a plurality of detection systems 105-1, . . . , 105-$k$ which can record the foaming process in the respective foaming chambers simultaneously or sequentially. Each respective frame in the second plurality of frames is representative of the foaming process in the foaming chamber of each foaming unit in the second plurality of foaming units at a corresponding discrete time point in the plurality of discrete time points.

A second respective frame in the second plurality of frames is obtained (block 810). The second respected framed is segmented into a second plurality of segmented images (block 812). Each respective segmented image in the second plurality of segmented images is representative of a corresponding foaming chamber, together with the respective solution and/or the foam in the corresponding foaming chamber of a respective foaming unit in the second plurality of foaming units at the corresponding discrete time point. From each segmented image in the second plurality of segmented images, one or more characteristics of the foam generated in the corresponding foaming chamber of each foaming unit in the second plurality of foaming units at the corresponding discrete time point are extracted, thereby facilitating high throughput foam analysis of the second plurality of solutions (block 814).

In some embodiments, the method of high throughput foam analysis described with respect to FIG. 4, further includes performing the steps for a third plurality of solutions, a fourth plurality of solution, etc. In some embodiments, the method of high throughput foam analysis further includes obtaining a third respective frame in the plurality of frames and segmenting the third respective frame into a third plurality of segmented images. Each respective segmented image in the third plurality of segmented images is representative of a corresponding foaming chamber, together with the respective solution and/or the foam in the corresponding foaming chamber of a respective foaming unit in the first plurality of foaming units. The method also includes extracting, from each segmented image in the third plurality of segmented images, one or more characteristics of the foam generated in the corresponding foaming chamber of each foaming unit in the first plurality of foaming units, thereby facilitating high throughput foam analysis of the first plurality of solutions.

In some embodiments, the method of high throughput foam analysis further includes obtaining a fourth respective frame in the plurality of frames and segmenting the fourth respective frame into a fourth plurality of segmented images. Each respective segmented image in the fourth plurality of segmented images is representative of a corresponding foaming chamber, together with the respective solution and/or the foam in the corresponding foaming chamber of a respective foaming unit in the first plurality of foaming units. The method also includes extracting, from each segmented image in the fourth plurality of segmented images, one or more characteristics of the foam generated in the corresponding foaming chamber of each foaming unit in the first plurality of foaming units, thereby facilitating high throughput foam analysis of the first plurality of solutions.

Figure 9A:
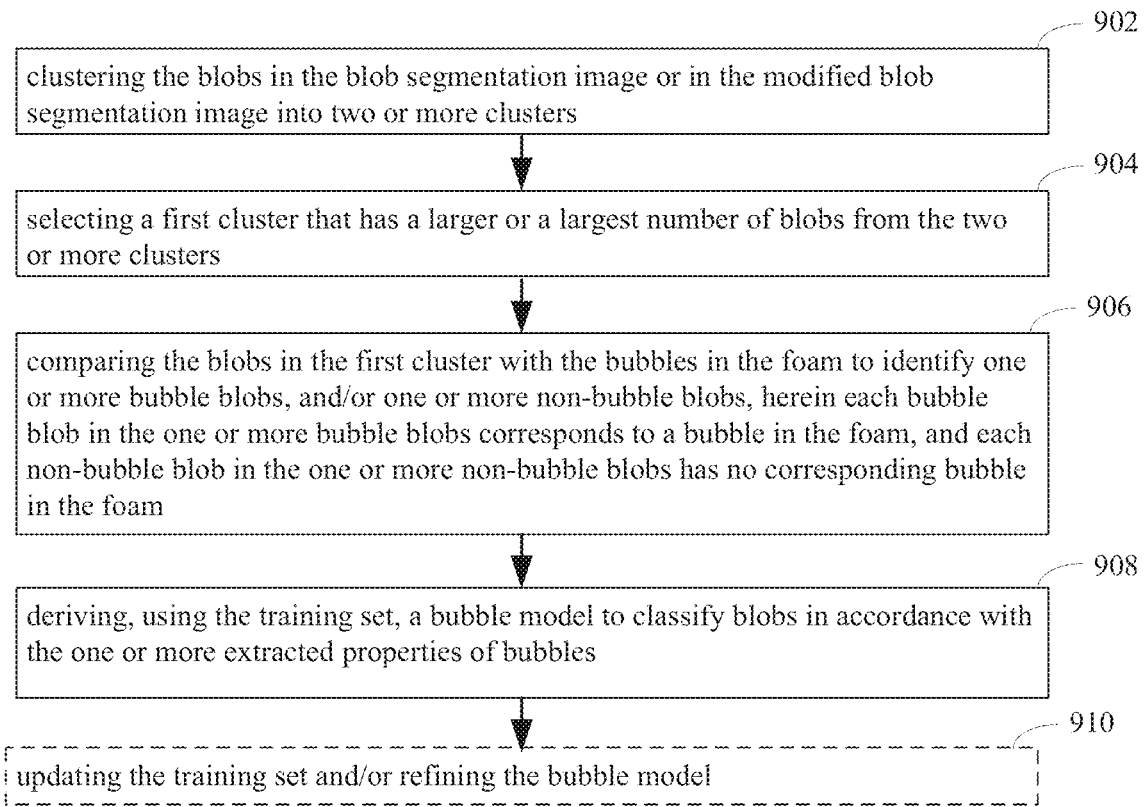
FIG. 9A provides a flowchart for constructing a training set and building a model for foam analysis in accordance with some embodiments.

FIG. 9A illustrates a method of constructing a training set in accordance with some embodiments.

Block 902. With reference to block 902 of FIG. 9A, the constructing a training set includes clustering the blobs in the blob segmentation image or in the modified blob segmentation image into two or more clusters (block 902). The blobs are clustered in accordance with one or more properties selected from the circularity, solidity, first aspect ratio, second aspect ratio, third aspect ratio, first extent, second extent, third extent and fourth extent of each blob in the blob segmentation image or in the modified blob segmentation image. The selection of the one or more properties is performed by principle component analysis. In some embodiments, the clustering of the blobs is performed using a K-means clustering algorithm to minimize a within-cluster sum of squares by using the following formula:

$$\underset{s}{\arg\min} \sum_{i=1}^{k} \sum_{x \in S_i} \|x - u_i\|^2$$

where,
each $x_i$ in $(x_1, x_2, \ldots, x_n)$ is a blob,
k is the number of clusters,
each $S_i = \{S_1, S_2, \ldots, S_k\}$ is a set of blobs clustered into each cluster set, and
each $u_i$ in $(u_1, u_2, \ldots u_k)$ is a centroid of a corresponding cluster.

With reference to block 904 of FIG. 9A, a first cluster that has a larger or a largest number of blobs from the two or more clusters is selected. The blobs in the first cluster with the bubbles in the foam are compared to identify one or more bubble blobs, and/or one or more non-bubble blobs (block 906). Each bubble blob in the one or more bubble blobs corresponds to a bubble in the form, and each non-bubble blob in the one or more non-bubble blobs has no corresponding bubble in the foam. A bubble model to classify blobs in accordance with the one or more extracted properties of bubbles is derived, using the training set (block 708). The training set is updated and/or the bubble model is refined (block 910) in accordance with performing the method described herein in FIG. 9A.

Generating a Final List of Bubbles

Figure 9B:
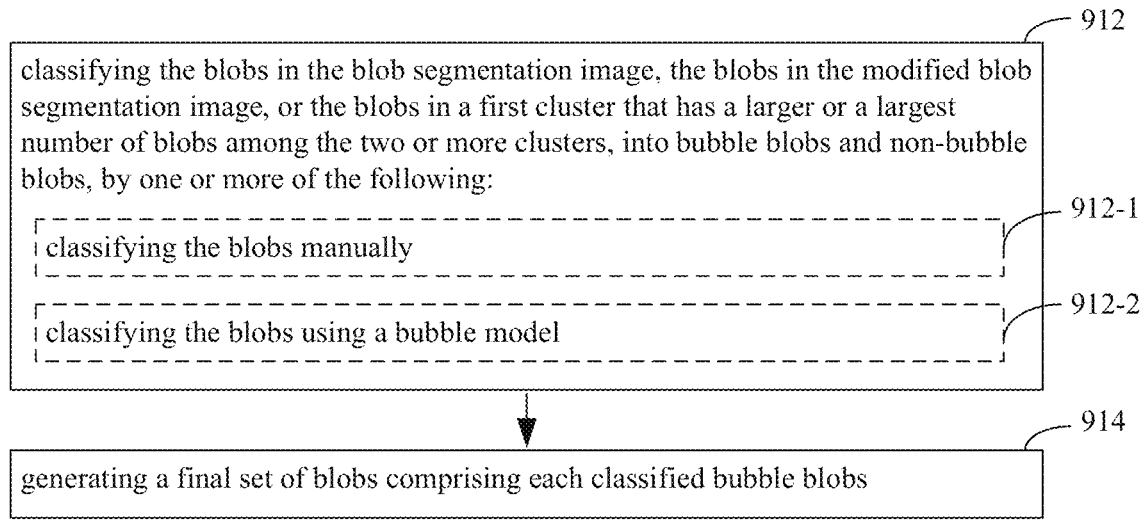
FIG. 9B-FIG. 9D provide flowcharts for generating final lists and data files from the analyzed data in accordance with some embodiments.
Figure 9C:
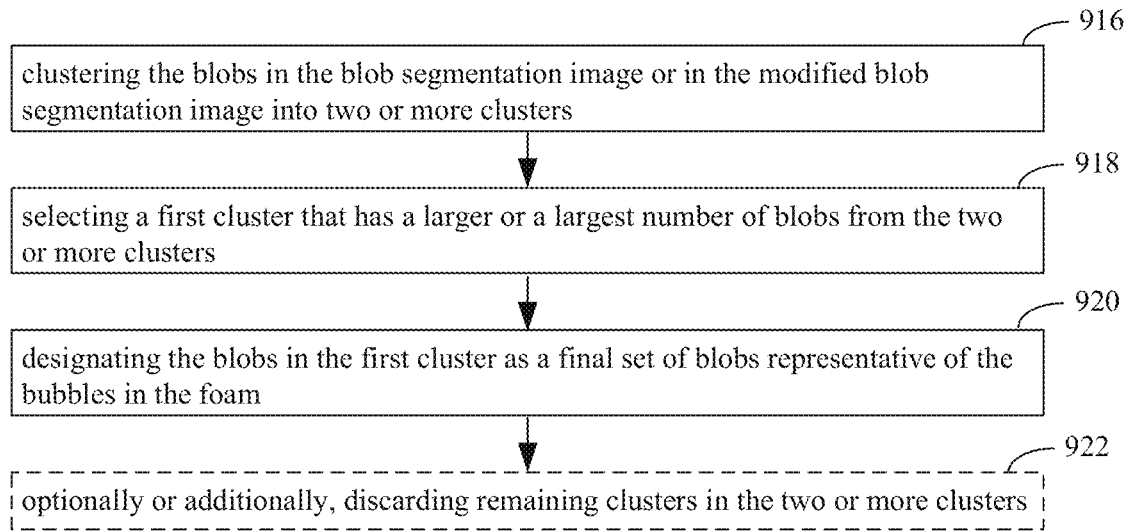
Figure 9D:
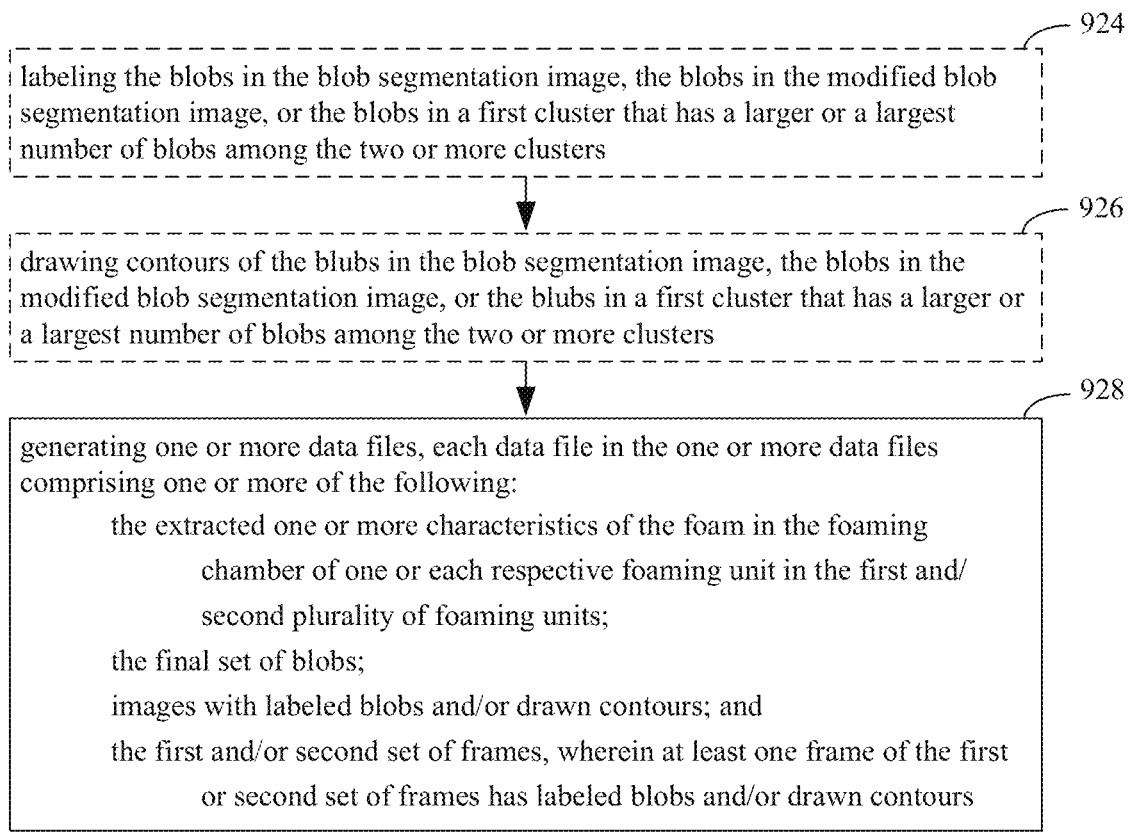

Methods for generating a final list of bubbles are illustrated in FIGS. 9B-9D.

With reference to FIG. 9B, a method for generating a final list of bubbles includes classifying the blobs in the blob segmentation image, the blobs in the modified blob segmentation image, or the blobs in a first cluster that has a larger or a largest number of blobs among the two or more clusters, into bubble blobs and non-bubble blobs (block 912). The classifying the blobs is performed by one or more of the following: classifying the blobs manually (block 912-1), and classifying the blobs using a bubble model (automatically) (block 912-2). In some embodiments, the classifying the blobs manually includes comparing the blobs in the blob segmentation image (e.g., blobs 1004-1 and 1004-2 of FIG. 10G), the blobs in the modified blob segmentation image, or the blobs in a first cluster that has a larger or a largest number of blobs among the two or more clusters with bubbles and/or clusters of two or more bubbles (e.g., items 1003-1 and 1003-2 of FIG. 10F) visually, and, based on the visual comparison, determining whether a respective blob is a bubble or a non-bubble. A final set of blobs including each classified bubble blob is generated in accordance with classifying the blobs (block 914).

With reference to FIG. 9C, an alternative method for generating a final list of bubbles includes clustering the blobs in the blob segmentation image or in the modified blob segmentation image into two or more clusters (block 916). A first cluster that has a larger or a largest number of blobs from the two or more cluster is selected (block 918). The blobs in the first cluster are designated as a final set of blobs reprehensive of the bubbles in the foam (block 920). Optionally or additionally, the remaining clusters in the two or more clusters are discarded (block 922).

Figure 10L:
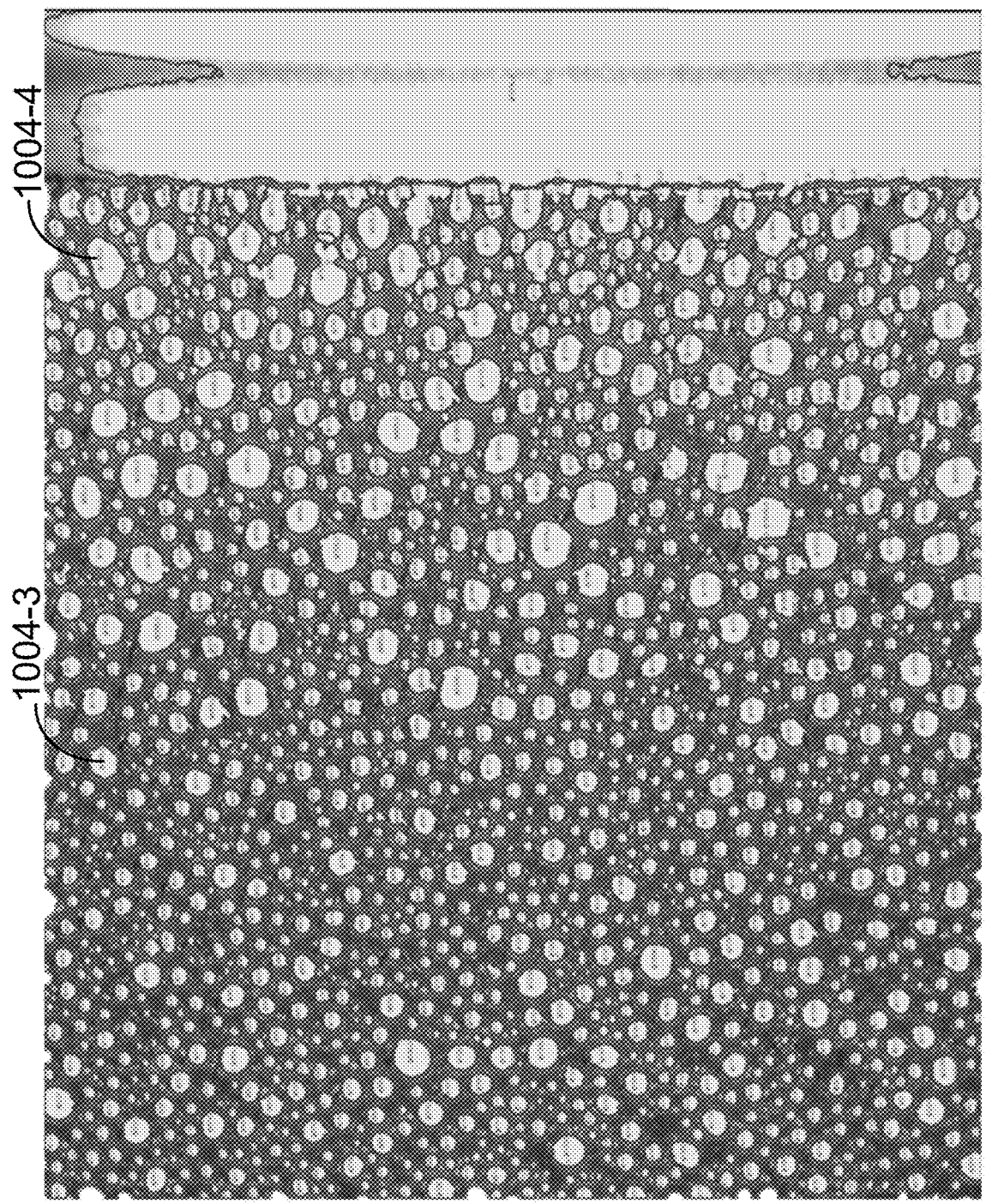

With reference to FIG. 9D, in some embodiments the method of constructing a training set to classify blobs includes one or more of steps illustrated in the flowchart. In some embodiments, the constructing a training set includes labeling the blobs in the blob segmentation image, the blobs in the modified blob segmentation image, or the blobs in a first cluster that has a larger or a largest number of blobs among the two or more clusters (block 924) and drawing contours of the blobs in the blob segmentation image, the blobs in the modified blob segmentation image, or the blobs in a first cluster that has a larger or a largest number of blobs among the two or more clusters (block 926). In some embodiments, the method of constructing a training set to classify blobs also includes generating one or more data files (block 928). Each data file in the one or more data files comprising one or more of the following: the extracted one or more characteristics of the foam in the foaming chamber of one or each respective foaming unit in the first and/second plurality of foaming units; the final set of blobs; images with labeled blobs and/or drawn contours; and the first and/or second set of frames. At least one frame of the first or second set of frames has labeled blobs and/or drawn contours. FIG. 10L illustrates an image with labeled blobs, and drawn contours. In some embodiments, each blob is numbered. For instance, in FIG. 10L, blobs 1004-3 and 1004-4 are denoted.

REFERENCES CITED AND ALTERNATIVE EMBODIMENTS

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that comprises a computer program mechanism embedded in a nontransitory computer readable storage medium. For instance, the computer program product could contain the program modules shown in any combination of FIGS. 4-9. These program modules can be stored on a CD-ROM, DVD, magnetic disk storage product, USB key, or any other non-transitory computer readable data or program storage product.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed is:

1. A system for high throughput foam analysis, comprising:
   a foam generation system comprising a first plurality of foaming units, each foaming unit in the first plurality of foaming units comprising:
      a foaming chamber configured to independently accommodate a respective solution in a first plurality of solutions; and
      a gas induction mechanism configured to introduce a gas into the respective solution in the foaming chamber as part of a foaming process that generates a foam in the foaming chamber;
   an illumination source providing an illumination to the foaming chamber of each foaming unit in the first plurality of foaming units;
   a detection system comprising a first camera configured to temporally record the foaming process in the foaming chamber of each foaming unit in the first plurality of foaming units, thereby producing a first plurality of frames, each respective frame in the first plurality of frames representative of the foaming process in the foaming chamber of each foaming unit in the first plurality of foaming units at a corresponding discrete time point in a plurality of discrete time points; and an analysis system in communication with the detection system, the analysis system comprising:
at least one processor; and
a memory addressable by the at least one processor and storing at least one program for execution by the at least one processor, the at least one program comprising instructions for:
  (i) obtaining a first respective frame in the first plurality of frames,
  (ii) segmenting the first respective frame into a first plurality of segmented images, each respective segmented image in the first plurality of segmented images representative of a corresponding foaming chamber, together with the respective solution and/or the foam in the corresponding foaming chamber of a respective foaming unit in the first plurality of foaming units, and
  (iii) extracting, from each segmented image in the first plurality of segmented images, one or more characteristics of the foam generated in the corresponding foaming chamber of each foaming unit in the first plurality of foaming units, thereby facilitating high throughput foam analysis of the first plurality of solutions.

2. The system of claim 1, wherein:
the foam generation system further comprises a second plurality of foaming units, each foaming unit in the second plurality of foaming units comprising:
  a foaming chamber configured to independently accommodate a respective solution in a second plurality of solutions; and
  a gas induction mechanism configured to introduce a gas into the respective solution in the foaming chamber as part of a foaming process that generates a foam in the foaming chamber;
the illumination source provides an illumination to the foaming chamber of each foaming unit in the second plurality of foaming units;
the detection system further comprises a second camera configured to temporally record the foaming process in the foaming chamber of each foaming unit in the second plurality of foaming units, thereby producing a second plurality of frames, each respective frame in the second plurality of frame representative of the foaming process in the foaming chamber of each foaming unit in the second plurality of foaming units at a corresponding discrete time point in the plurality of discrete time points; and
the at least one program of the analysis system further comprises instructions for:
  (i) obtaining a second respective frame in the second plurality of frames,
  (ii) segmenting the second respective frame into a second plurality of segmented images, each respective segmented image in the second plurality of segmented images representative of a corresponding foaming chamber, together with the respective solution and/or the foam in the corresponding foaming chamber of a respective foaming unit in the second plurality of foaming units, and
  (iii) extracting from each segmented image in the second plurality of segmented images, one or more characteristics of the foam generated in the corresponding foaming chamber of each foaming unit in the second plurality of foaming units, thereby facilitating high throughput foam analysis of the second plurality of solutions.

3. The system of claim 1, wherein the at least one program of the analysis system further comprises instructions for:
  (i) obtaining a third respective frame in the first plurality of frames;
  (ii) segmenting the third respective frame into a third plurality of segmented images, each respective segmented image in the third plurality of segmented images representative of a corresponding foaming chamber, together with the respective solution and/or the foam in the corresponding foaming chamber of a respective foaming unit in the first plurality of foaming units; and
  (iii) extracting, from each segmented image in the third plurality of segmented images, one or more characteristics of the foam generated in the corresponding foaming chamber of each foaming unit in the first plurality of foaming units, thereby facilitating high throughput foam analysis of the first plurality of solutions.

4. The system of claim 1, wherein the at least one program of the analysis system further comprises instructions for:
  (i) obtaining a fourth respective frame in the second plurality of frames;
  (ii) segmenting the fourth respective frame into a fourth plurality of segmented images, each respective segmented image in the fourth plurality of segmented images representative of a corresponding foaming chamber, together with the respective solution and/or the foam in the corresponding foaming chamber of a respective foaming unit in the second plurality of foaming units; and
  (iii) extracting from each segmented image in the fourth plurality of segmented images, one or more characteristics of the foam generated in the corresponding foaming chamber of each foaming unit in the second plurality of foaming units, thereby facilitating high throughput foam analysis of the second plurality of solutions.

5. The system of claim 1, wherein the foaming chamber of each foaming unit in all or a subset of the first plurality of foaming units is characterized by a substantially rectangular cross section.

6. The system of claim 1, wherein the first plurality of foaming units are in an integrated block.

7. The system of claim 1, wherein each respective foaming unit in all or a subset of the first plurality of foaming units comprises a porous member that separates the foaming chamber of the respective foaming unit into a first portion and a second portion, wherein:
  the respective solution of the respective foaming unit is received in the second portion of the foaming chamber; and
  the gas induction mechanism of the respective foaming unit comprises a vacuum source in fluid communication with the second portion of the foaming chamber to pull the gas from the first portion to the second portion, thereby introducing the gas into the respective solution and generating the foam in the foaming chamber of the respective foaming unit.

8. The system of claim 1, wherein the gas induction mechanism of each respective foaming unit in all or a subset of the first plurality of foaming units comprises a porous sparger disposed in the foaming chamber of the respective foaming unit, and the porous sparger is in fluid communication with a gas supply to introduce the gas into the respective solution of the respective foaming unit, thereby generating the foam in the foaming chamber of the respective foaming unit.

9. The system of claim 1, wherein:
each respective foaming unit in a first subset of the first plurality of foaming units comprises a porous member that separates the foaming chamber of the respective foaming unit into a first portion and a second portion, wherein
the respective solution of the respective foaming unit is received in the second portion of the foaming chamber; and
the gas induction mechanism of the respective foaming unit comprises a vacuum source in fluid communication with the second portion of the foaming chamber to pull the gas from the first portion to the second portion, thereby introducing the gas into the respective solution and generating the foam in the foaming chamber of the respective foaming unit in the first subset of the first plurality of foaming units; and
the gas induction mechanism of each respective foaming unit in a second subset of the first plurality of foaming units comprises a porous sparger disposed in the foaming chamber of the respective foaming unit, and the porous sparger is in fluid communication with a gas supply to introduce the gas into the respective solution of the respective foaming unit, thereby generating the foam in the foaming chamber of the respective foaming unit in the second subset of the first plurality of foaming units.

10. The system of claim 1, wherein the porous member is a frit, and the frit has a pore size range between 10 μm and 20 μm, between 20 μm and 30 μm, or between 30 μm and 40 μm.

11. The system of claim 1, wherein the porous member is a frit, and the frit has an average pore size that is between 10 μm and 20 μm, between 20 μm and 30 μm, or between 30 μm and 40 μm.

12. The system of claim 1, wherein each respective porous sparger (i) has an active porous length and a pore size range between 2 μm and 5 μm, between 5 μm and 10 μm, between 10 μm and 15 μm, or between 15 μm and 20 μm, and (ii) is configured such that the active porous length of the respective sparger is submerged in the corresponding solution before generating the foam.

13. The system of claim 1, wherein the foaming chamber of each respective foaming unit in all or a subset of the first plurality of foaming units has linear dimensions between 25 mm and 100 mm, between 100 mm and 400 mm, or between 400 mm and 900 mm.

14. The system of claim 1, wherein the corresponding solution for each respective foaming unit in all or a subset of the first plurality of foaming units has a volume ranging between 1 ml and 2.5 ml, between 2.5 ml and 10 ml, or between 10 ml and 20 ml.

15. The system of claim 1, wherein at each respective foaming unit in all or a subset of the first plurality of foaming units, the gas introduced into the respective solution is approximately 1 times, 1.5 times, 2 times, 2.5 times, or 3 times that of the volume of solution in the foaming chamber of the respective foaming unit.

16. The system of claim 1, wherein at each respective foaming unit in all or a subset of the first plurality of foaming units, the gas is introduced into the solution at a flow rate lower than 200 ml/sec, lower than 150 ml/sec, lower than 100 ml/sec, or lower than 50 ml/sec.

17. A system for high throughput foam analysis, comprising:
a foam generation system comprising a first plurality of foaming units, each foaming unit in the first plurality of foaming unit comprising a foaming chamber configured to independently accommodate a respective solution in a first plurality of solutions, wherein each solution in each foaming unit in the first plurality of foaming units undergoes an independent foaming process, thereby generating a respective foam in the foaming chamber of each foaming unit in the first plurality of foaming units;
an illumination source providing an illumination to the foaming chamber of each foaming unit in the first plurality of foaming units;
a detection system comprising a first camera configured to temporally record the foaming process in the foaming chamber of each foaming unit in the first plurality of foaming units, thereby producing a first plurality of frames, each respective frame in the first plurality of frames representative of the foaming process in the foaming chamber of each foaming unit in the first plurality of foaming units at a corresponding discrete time point in a plurality of discrete time points; and
an analysis system in communication with the detection system, the analysis system comprising:
at least one processor; and
a memory addressable by the at least one processor and storing at least one program for execution by the at least one processor, the at least one program comprising instructions for:
(i) obtaining a first respective frame in the first plurality of frames,
(ii) segmenting the first respective frame into a first plurality of segmented images, each respective segmented image in the first plurality of segmented images representative of a corresponding foaming chamber, together with the respective solution and/or the foam in the corresponding foaming chamber of a respective foaming unit in the first plurality of foaming units, and
(iii) extracting, from each segmented image in the first plurality of segmented images, one or more characteristics of the foam generated in the corresponding foaming chamber of each foaming unit in the first plurality of foaming units, thereby facilitating high throughput foam analysis of the first plurality of solutions.

18. The system of claim 17, wherein:
the foam generation system further comprises a second plurality of foaming units, each foaming unit in the second plurality of foaming units comprising a foaming chamber configured to independently accommodate a respective solution in a second plurality of solutions, wherein each solution in each foaming unit in the second plurality of foaming units undergoes an independent foaming process, thereby generating a respective foam in the foaming chamber of each foaming unit in the second plurality of foaming units;
the detection system further comprises a second camera configured to temporally record the foaming process in the foaming chamber of each foaming unit in the second plurality of foaming units, thereby producing a second plurality of frames, each respective frame in the second plurality of frame representative of the foaming process in the foaming chamber of each foaming unit in the second plurality of foaming units at a corresponding discrete time point in the plurality of discrete time points; and the at least one program of the analysis system further comprises instructions for:
(i) obtaining a second respective frame in the second plurality,
(ii) segmenting the second respective frame into a second plurality of segmented images, each respective segmented image in the second plurality of segmented images representative of a corresponding foaming chamber, together with the respective solution and/or the foam in the corresponding foaming chamber of a respective foaming unit in the second plurality of foaming units, and
(iii) extracting from each segmented image in the second plurality of segmented images, one or more characteristics of the foam generated in the corresponding foaming chamber of each foaming unit in the second plurality of foaming units, thereby facilitating high throughput foam analysis of the second plurality of solutions.

* * * * *